(12) United States Patent
Hashimoto et al.

(10) Patent No.: US 8,193,676 B2
(45) Date of Patent: Jun. 5, 2012

(54) COIL MANUFACTURING METHOD AND COIL MANUFACTURING APPARATUS

(75) Inventors: Shingo Hashimoto, Okazaki (JP);
Masaki Saito, Okazaki (JP); Hideki Mukaizaka, Chiryu (JP); Shinichi Kikuchi, Nagoya (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 276 days.

(21) Appl. No.: 12/720,442

(22) Filed: Mar. 9, 2010

(65) Prior Publication Data
US 2010/0231083 A1    Sep. 16, 2010

(30) Foreign Application Priority Data
Mar. 13, 2009  (JP) .................. 2009-061745

(51) Int. Cl.
*H02K 3/04* (2006.01)
(52) U.S. Cl. ..................... 310/207; 310/208
(58) Field of Classification Search .......... 310/201–208; 29/596–598
See application file for complete search history.

(56) References Cited

U.S. PATENT DOCUMENTS

| | | | | |
|---|---|---|---|---|
| 3,028,266 A * | 4/1962 | Larsh | ............ | 427/104 |
| 3,453,468 A * | 7/1969 | Lund | ............ | 310/180 |
| 3,662,199 A * | 5/1972 | Anderson et al. | ............ | 310/208 |
| 5,097,167 A * | 3/1992 | Kanayama et al. | ............ | 310/201 |
| 6,049,154 A * | 4/2000 | Asao et al. | ............ | 310/201 |
| 6,424,071 B1 * | 7/2002 | Oohashi et al. | ............ | 310/180 |
| 6,806,611 B2 * | 10/2004 | Bharaj et al. | ............ | 310/208 |
| 7,132,775 B2 | 11/2006 | Oohashi et al. | | |
| 2001/0011851 A1 * | 8/2001 | Asao et al. | ............ | 310/179 |
| 2002/0047450 A1 * | 4/2002 | Asao et al. | ............ | 310/184 |
| 2004/0061401 A1 * | 4/2004 | Gorohata et al. | ............ | 310/208 |
| 2007/0114871 A1 * | 5/2007 | Imai et al. | ............ | 310/206 |
| 2008/0093948 A1 | 4/2008 | Naganawa | | |
| 2008/0174199 A1 * | 7/2008 | Ishigami et al. | ............ | 310/199 |
| 2009/0001841 A1 | 1/2009 | Naganawa et al. | | |
| 2009/0260219 A1 | 10/2009 | Takada et al. | | |

FOREIGN PATENT DOCUMENTS

| | | |
|---|---|---|
| JP | 2008-104293 A | 5/2008 |
| JP | 2008-253063 A | 10/2008 |
| JP | 2009-011116 A | 1/2009 |
| JP | 2009-011152 A | 1/2009 |
| JP | 2009-284754 A | 12/2009 |
| WO | 2004/062065 A1 | 7/2004 |

* cited by examiner

*Primary Examiner* — Thanh Lam
(74) *Attorney, Agent, or Firm* — Sughrue Mion, PLLC

(57) ABSTRACT

A coil manufacturing method for manufacturing a wave wound coil in a substantially cylindrical shape by shaping a linear conductor with a cross-sectional shape having directionality, including: transferring a linear waver conductor shaped in a substantially rectangular waveform, and having straight side portions extending in a wave width direction, one-side connecting portions sequentially connecting every other pair of adjacent side portions at ends on a one wave width direction side, and other-side connecting portions sequentially connecting pairs of adjacent side portions that are not connected by the one-side connecting portions at ends on an other wave width direction side; bending a target connecting portion, which is at least one of the one-side connecting portions and the other-side connecting portions of the wave conductor, at one position thereof to shape the target connecting portion into a substantially V shape so that the side portions are arranged along a coil circumferential direction and directions of cross-sectional shapes of the side portions are in a constant direction with respect to a coil radial direction; and winding the bent wave conductor on a bobbin.

22 Claims, 28 Drawing Sheets

F I G. 5
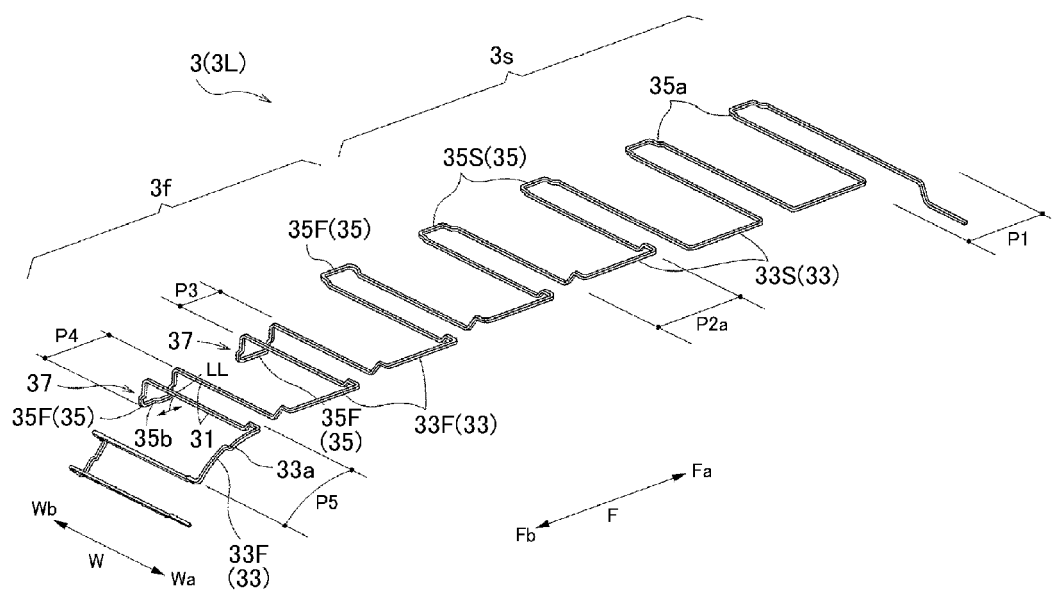

F I G . 13
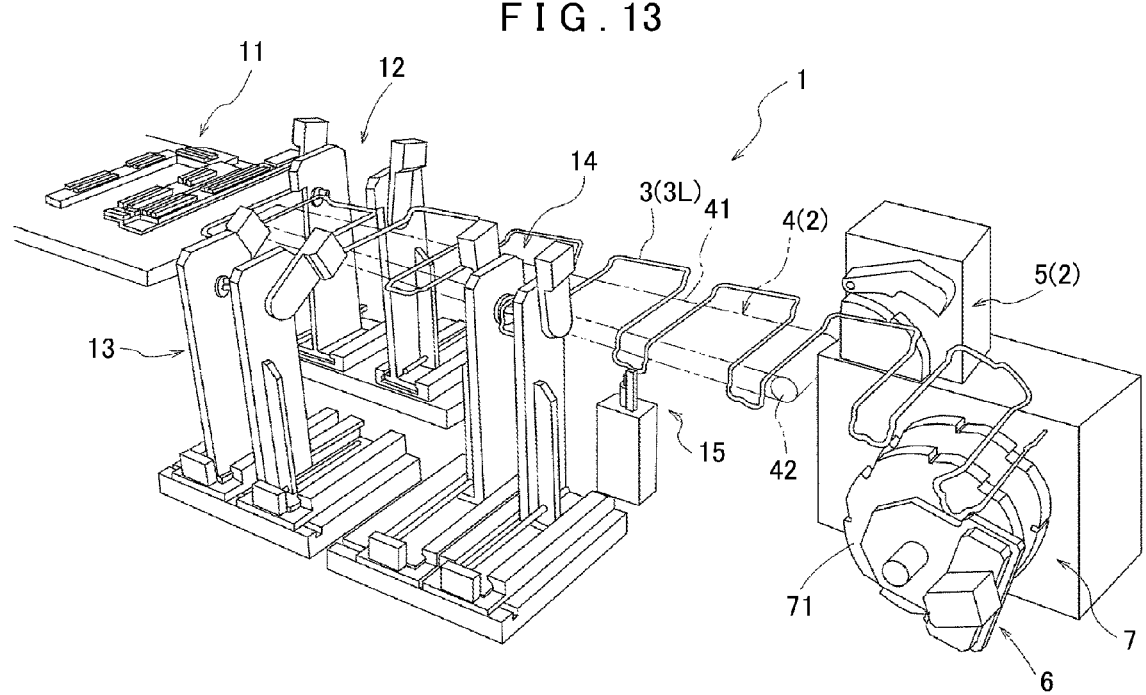

F I G. 16
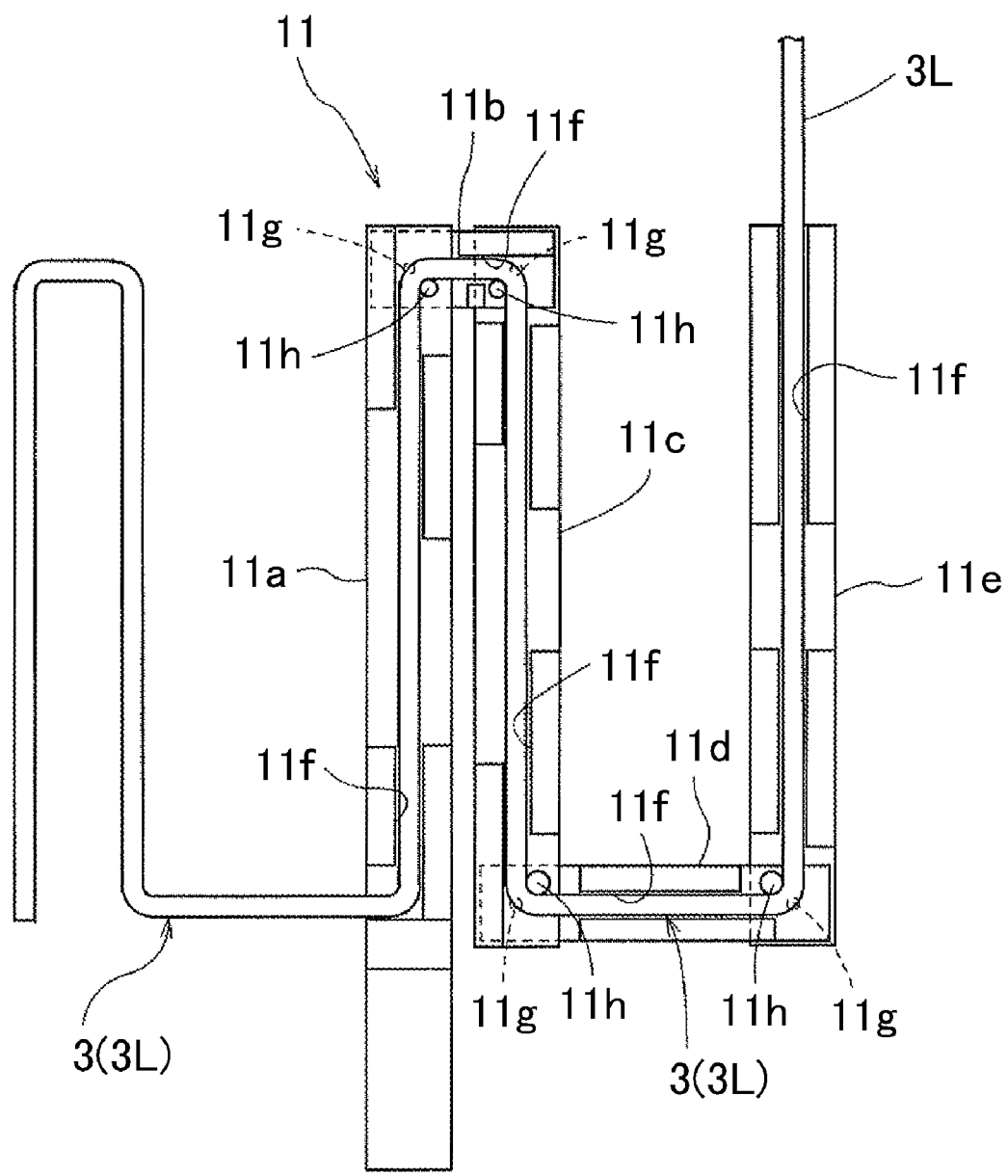

COIL MANUFACTURING METHOD AND COIL MANUFACTURING APPARATUS

The disclosure of Japanese Patent Application No. 2009-061745 filed on Mar. 13, 2009 including the specification, drawings and abstract is incorporated herein by reference in its entirety.

BACKGROUND OF THE INVENTION

The present invention relates to a coil manufacturing method and a coil manufacturing apparatus for manufacturing a substantially cylindrical wave wound coil by shaping a linear conductor with a cross-sectional shape having directionality, and to a coil manufactured by the method and the apparatus.

DESCRIPTION OF THE RELATED ART

Regarding a coil manufacturing method for manufacturing a substantially cylindrical wave wound coil, a technique is known in which a wave wound coil is shaped by bundling up a plurality of windings of a linear conductor with a circular cross section having no directionality in a ring shape, bending the windings of the linear conductor to make a predetermined star-shaped winding unit, and shaping this star-shaped winding unit into a cylindrical shape (see, for example, WO 2004/062065 Pamphlet listed below). Here, the star-shaped winding unit is a planar winding unit formed by stacking a plurality of star-shaped patterns, which are each structured such that ends of adjacent straight slot-housed portions are linked alternately on an inner peripheral side and an outer peripheral side by C-shaped coil end portions. In this technique, a cross section flattening process is performed in which each of the linear conductors forming the slot-housed portions of the star-shaped winding unit is set in a press forming machine, and each of the linear conductors having a circular cross section is deformed so as to have a racetrack-shaped cross section. After this cross section flattening process, the star-shaped winding unit is formed into a cylindrical shape to complete a wave wound coil.

Regarding the manufacturing method for manufacturing a lap winding coil, a technique is known by which an annular formed coil having a substantially hexagonal shape is formed by winding a rectangular conductor on a bobbin for a plurality of windings, and a plurality of formed coils are attached to a cylindrical stator core while displacing the position in a circumferential direction (see, for example, Japanese Patent Application Publication No. JP-A-2008-104293 listed below). Here, the formed coils have a coil end portion which is bend shaped into a predetermined crank shape, so as to allow that the plurality of formed coils are arranged appropriately along the cylindrical stator core. At this time, the coil end portion is shaped into a predetermined shape by pressing a plurality of windings of a linear conductor with a mold at once.

SUMMARY OF THE INVENTION

When bending the star-shaped winding unit formed by aligning and positioning a plurality of windings of a linear conductor so as to form a cylindrical shape, the above-described coil manufacturing method described in above WO 2004/062065 Pamphlet requires a process to bend a bundle of the plurality of windings of the linear conductor while twisting the bundle. Such a manufacturing process has poor workability, and it is also difficult to align and position the plurality of windings of the linear conductor in a state of being shaped into a cylindrical shape. Particularly, when using a linear conductor with a cross-sectional shape having directionality across the entire linear material length direction, part of the linear conductor having directionality is brought into a twisted state. Thus, it becomes more difficult to align and position the linear conductor forming the substantially cylindrical wave wound coil. Therefore, the above-described coil manufacturing method is not suitable as a method for manufacturing the substantially cylindrical wave wound coil by shaping the linear conductor with a cross-sectional shape having directionality, and it is difficult to mass-produce substantially cylindrical wave wound coils by such a method.

Further, in order to shape a winding unit, which is formed by aligning and positioning such a plurality of windings of a linear conductor, into a predetermined shape, when the plurality of windings of a linear conductor are shaped by pressing with a metal mold at once similarly to the technique described in Japanese Patent Application Publication No. JP-A-2008-104293, the force required for pressing with the metal mold increases as the number of windings increases. During press forming with a metal mold, different windings of the linear conductor move relatively. Thus, when an insulating film is formed on the surface of the linear conductor, portions of this insulating film rub against each other and get damaged, which may deteriorate the electrical insulation performance of the insulating film. Moreover, the insulating film formed on the surface of the linear conductor contacting the metal mold may be damaged by a large load.

The present invention is made in view of the above-described problems, and it is an object of the present invention to provide a coil manufacturing method and a coil manufacturing apparatus capable of sequentially shaping a linear conductor with a cross-sectional shape having directionality to appropriately manufacture a substantially cylindrical wave wound coil in which a linear conductor is aligned and positioned, and further capable of manufacturing such a wave wound coil by appropriately bending the linear conductor, and a coil manufactured by the method and the apparatus.

To achieve the above-described object, a coil manufacturing method for manufacturing a wave wound coil in a substantially cylindrical shape by shaping a linear conductor with a cross-sectional shape having directionality according to a first aspect of the present invention has a characteristic structure including: transferring a wave conductor that is a linear conductor shaped in a substantially rectangular waveform, and has a plurality of straight side portions extending in a wave width direction, one-side connecting portions sequentially connecting every other pair of adjacent side portions at ends on a one wave width direction side, and other-side connecting portions sequentially connecting pairs of adjacent side portions that are not connected by the one-side connecting portions at ends on an other wave width direction side; bending a target connecting portion, which is at least one of the one-side connecting portions and the other-side connecting portions of the wave conductor, at one position thereof to shape the target connecting portion into a substantially V shape so that the plurality of side portions are arranged along a coil circumferential direction and directions of cross-sectional shapes of the side portions are in a constant direction with respect to a coil radial direction; and winding on a bobbin the wave conductor that is bent in the bending.

Note that in this application, the "wave width direction" refers to a wave amplitude direction of the wave conductor in a substantially rectangular waveform, which is in a direction substantially in parallel with the coil axis direction in a state that the wave conductor is finally shaped into the substantially cylindrical wave wound coil. Further, in this application, the "coil circumferential direction" means a circumferential direction of the substantially cylindrical wave wound coil, and the "coil radial direction means a radial direction of the substantially cylindrical wave wound coil.

With this characteristic structure, with respect to a wave conductor which is a linear conductor with a cross-sectional shape having directionality and is shaped into a substantially rectangular waveform, at least either of the one-side connecting portions and the other-side connecting portions constituting the wave conductor is a target connecting portion, and by appropriately bending the target connecting portion and performing winding, a substantially cylindrical wave wound coil in which a plurality of side portions are aligned and positioned at appropriate positions and in appropriate directions can be manufactured. At this time, one sequential linear conductor can be shaped sequentially from one end side to form the substantially cylindrical wave wound coil. Further, with this characteristic structure, appropriate bending can be performed by a simple process of bending the target connecting portion at one position into a substantially V shape. Such bending of the target connecting portion can be performed with a relatively small shaping load, and a space required for bending can be suppressed relatively small. Accordingly, bending can be performed appropriately when a linear material length of the target connecting portion is relatively short and a large space for bending is difficult to be secured, such as when the target connecting portion is located more inside in the coil radial direction than the side portions, for example. Therefore, this coil manufacturing method has excellent workability and is suitable for mass production.

Here, in the bending, an inner peripheral die having an arc face on a portion contacting the target connecting portion may be used to bend the target connecting portion at one position along the inner peripheral die to shape a portion of the target connecting portion in a linear material length direction into a substantially arc shape, so as to shape the entire target connecting portion into a substantially V shape.

With this structure, by a simple process of bending and shaping one position of the target connecting portion into a substantially arc shape along an inner peripheral die, the target connecting portion can be appropriately shaped entirely into a substantially V shape. At this time, since the target connecting portion is bent and shaped along the arc face which the inner peripheral die has, an excessive load can be suppressed from acting on a bent portion of the target connecting portion. Therefore, also when an insulating film is formed on the surface of the linear conductor, damage to the insulating film can be suppressed.

Further, in the bending, an outer peripheral die having an arc face on the portion contacting the target connecting portion may further be used, and the outer peripheral die arranged to face the inner peripheral die across the target connecting portion may be swung about an arc center of the arc face of the inner peripheral die so as to bend the target connecting portion.

With this structure, by a further simple process of just swinging the outer peripheral die arranged to face the inner peripheral die across the target connecting portion about an arc center of the arc face of the inner peripheral die, the target connecting portion can be appropriately shaped entirely into a substantially V shape. Thus, the unit performing the bending of the target connecting portion can be simplified, and the space needed for the bending can be suppressed relatively small. Further, by bending using such an inner peripheral die and an outer peripheral die, the target connecting portion can be shaped with a smaller shaping load compared to the case where bending is performed by pressing a substantially V shaped mold against a linear conductor.

Further, in the bending, in a state that a portion of the target connecting portion on one side in the linear material length direction with respect to the outer peripheral die is supported to inhibit movement of the portion toward at least the outer peripheral die side in a linear material width direction, the outer peripheral die may be swung toward the other side in the linear material length direction of the target connecting portion.

With this structure, when the outer peripheral die is swung toward the other side in the linear material length direction of the target connecting portion to bend the target connecting portion, this bending can be performed while supporting the target connecting portion so as not to rotate due to a rotation moment that acts on the target connecting portion. Therefore, the target connecting portion can be bent and shaped into a substantially V shape appropriately by swinging the outer peripheral die.

Further, the bending, a bend tool including the inner peripheral die and the outer peripheral die may be used, the bend tool being structured to be movable in a direction to approach or depart from the bobbin, and structured such that the target connecting portion is inserted between the inner peripheral die and the outer peripheral die in a state of being moved toward the bobbin side, and the bend tool may be moved toward the bobbin side when bending the target connecting portion.

With this structure, while allowing bending of the target connecting portion by moving the bend tool toward the side to approach the bobbin when bending the target connecting portion, transfer of the wave conductor including the target connecting portion can be facilitated by moving the bend tool toward the side to depart from the bobbin when bending of the target connecting portion is not performed.

Further, in the winding, the bobbin may be rotated and moved in synchronization with the bending so as to wind the wave conductor on the bobbin.

With this structure, since the bobbin is rotated and moved when the wave conductor is wound on the bobbin in synchronization with the bending, the wave conductor can be prevented from being deformed plastically by a large stress acting on the wave conductor, and the wave conductor can be wound appropriately on the bobbin. Further, since the winding is performed in synchronization with the bending, a time required for manufacturing the wave wound coil can be reduced.

Further, on an outer peripheral face of the bobbin, a plurality of side portion retaining units structured to retain the side portions of the wave conductor may be provided along a circumferential direction of the bobbin, the bending may be performed in a state that the side portion located on one side in the linear material length direction of the target connecting portion is retained in the side portion retaining units, and in the winding, the side portion located on the other side in the linear material length direction of the target connecting portion may be retained in the side portion retaining units by rotating and moving the bobbin in synchronization with the bending.

With this structure, when the wave conductor that is bent by the bending is wound on the bobbin, the wound wave conductor can be retained securely so as not to disengage from the bobbin due to springback or the like. Then the bending is performed in a state that the side portion located on one side in the linear material length direction of the target connecting portion is retained, and the side portion on the other side in the linear material length direction of the target connecting portion is retained in the side portion retaining units. Thus, the wave conductor that is bent by the bending can be wound on the bobbin sequentially.

Further, in the winding, the wave conductor may be wound on the bobbin for a plurality of windings, and after the plurality of windings are wound, the target connecting portions of different windings of the wave conductor be plurally arranged in the coil radial direction.

With this structure, the wave wound coil in which the target connecting portions are plurally arranged in the coil radial direction can be manufactured appropriately. At this time, the wave conductor that is bent by the bending is wound on the bobbin sequentially, and thus the wave wound coil can be manufactured appropriately by an almost similar method even when the number of windings is increased.

Further, in the bending, the inner peripheral die and the outer peripheral die which each have the arc face on the portion contacting the target connecting portion and are arranged to face each other may be used, and when bending the target connecting portion of a second winding and thereafter, the outer peripheral die arranged to face the inner peripheral die across the target connecting portion of a plurality of windings may be swung about an arc center of the arc face of the inner peripheral die so as to bend the target connecting portion of a succeeding winding at one position along the target connecting portion of a preceding winding which is already bent.

With this structure, also when bending the target connecting portion of the second winding and thereafter, by a further simple process of swinging the outer peripheral die arranged to face the inner peripheral die across the target connecting portion about the arc center of the arc face of the inner peripheral die, the target connecting portion can be appropriately shaped entirely into a substantially V shape. Thus, the unit performing the bending of the target connecting portion can be simplified, and the space needed for the bending can be suppressed relatively small. At this point, since one position of the target connecting portion of the succeeding winding is bent along the target connecting portion of the preceding winding which is already bent, the target connecting portion of the succeeding winding can be bent appropriately to be arranged in parallel along the target connecting portion of the preceding winding.

Further, a direction substantially orthogonal to a face of the wave conductor before shaped into a substantially cylindrical shape may be taken as a reference direction related to a direction of cross-sectional shapes of the side portions, and in the bending, the target connecting portion may be bent so that the reference direction is in a direction along the coil radial direction.

With this structure, when a linear conductor with a cross-sectional shape having directionality is used, with a direction substantially orthogonal to a face of the wave conductor before shaped into a substantially cylindrical shape being a reference, bending can be performed appropriately so that all of the side portions to be plurally arranged in a coil circumferential direction are in the same direction with respect to the coil radial direction after the substantially cylindrical wave wound coil is shaped.

Further, as the linear conductor with a cross-sectional shape having directionality, for example a linear conductor with a rectangular cross-sectional shape is used. Such a linear conductor is advantageous because, for example, gap portions in slots are reduced when the linear conductor is aligned and positioned in slots formed in an armature core, thereby improving a coil occupancy ratio of the coil.

A coil manufacturing apparatus for manufacturing a wave wound coil in a substantially cylindrical shape by shaping a linear conductor with a cross-sectional shape having directionality according to a second aspect of the present invention has a characteristic structure including: a transfer unit transferring a wave conductor that is a linear conductor shaped in a substantially rectangular waveform, and has a plurality of straight side portions extending in a wave width direction, one-side connecting portions sequentially connecting every other pair of adjacent side portions at ends on a one wave width direction side, and other-side connecting portions sequentially connecting pairs of adjacent side portions that are not connected by the one-side connecting portions at ends on an other wave width direction side; a connecting portion bending unit bending a target connecting portion, which is at least one of the one-side connecting portions and the other-side connecting portions of the wave conductor, at one position thereof to shape the target connecting portion into a substantially V shape so that the plurality of side portions are arranged along a coil circumferential direction and directions of cross-sectional shapes of the side portions are in a constant direction with respect to a coil radial direction; a bobbin winding the wave conductor that is bent by the connecting portion bending unit; and a bobbin rotation unit capable of rotating the bobbin about a center axis.

With this characteristic structure, while a wave conductor which is a linear conductor with a cross-sectional shape having directionality and is shaped into a substantially rectangular waveform is intermittently transferred, the connecting portion bending unit can appropriately bend the target connecting portion, which is at least one of the one-side connecting portions and the other-side connecting portions constituting the wave conductor. Further, the wave conductor that is bent by the connecting portion bending unit can be wound on the bobbin appropriately while rotating the bobbin. Thus, a substantially cylindrical wave wound coil in which a plurality of side portions are aligned and positioned at appropriate positions and in appropriate directions can be manufactured. At this time, one sequential linear conductor can be shaped sequentially from one end side to form a substantially cylindrical wave wound coil. Further, with this characteristic structure, there is provided the connecting portion bending unit which bends the target connecting portion at one position to shape the target connecting portion into a substantially V shape. Thus, the target connecting portion can be bent with a relatively small shaping load, and a space required for the bending can be suppressed relatively small. Therefore, bending can be performed appropriately when a linear material length of the target connecting portion is relatively short and a large space for bending is difficult to be secured, such as when the target connecting portion is located more inside in the coil radial direction than the side portions, for example.

Further the connecting portion bending unit may include a bend tool having an inner peripheral die and an outer peripheral die which each have an arc face on a portion contacting the target connecting portion and are arranged to face each other, the outer peripheral die being swingable about an arc center of the arc face of the inner peripheral die, and the bend tool may be structured to be movable in a direction to approach or depart from the bobbin, and structured such that the target connecting portion is inserted between the inner peripheral die and the outer peripheral die in a state of being moved toward the bobbin side.

With this structure, by a further simple unit which just swings the bend tool having the inner peripheral die and the outer peripheral die, the target connecting portion can be appropriately shaped entirely into a substantially V shape.

Further, by bending using such an inner peripheral die and an outer peripheral die, the target connecting portion can be shaped with a smaller shaping load compared to the case where processing is performed by pressing a substantially V shaped mold against the linear conductor. Furthermore, while allowing bending of the target connecting portion by moving the bend tool toward the side to approach the bobbin when bending the target connecting portion, transfer of the wave conductor including the target connecting portion can be facilitated by moving the bend tool toward the side to depart from the bobbin when bending of the target connecting portion is not performed.

Further, a direction substantially orthogonal to a face of the wave conductor before shaped into a substantially cylindrical shape may be taken as a reference direction related to a direction of cross-sectional shapes of the side portions, and the connecting portion bending unit may bend the target connecting portion so that the reference direction is in a direction along the coil radial direction.

With this structure, when a linear conductor with a cross-sectional shape having directionality is used, with a direction substantially orthogonal to a face of the wave conductor before shaped into a substantially cylindrical shape being a reference, bending can be performed appropriately so that all of the plurality of side portions to be arranged in a coil circumferential direction are in the same direction with respect to the coil radial direction after the substantially cylindrical wave wound coil is shaped.

A coil formed by shaping a linear conductor with a cross-sectional shape having directionality into a substantially rectangular waveform and then into a substantially cylindrical shape according to a third aspect of the present invention has a characteristic structure including: a plurality of straight side portions extending in a coil axis direction; one-side connecting portions sequentially connecting every other pair of side portions adjacent in a coil circumferential direction at ends on a one axial direction side; and other-side connecting portions sequentially connecting pairs of side portions adjacent in the coil circumferential direction that are not connected by the one-side connecting portions at ends on an other axial direction side, in which the plurality of side portions are arranged along the coil circumferential direction with directions of cross-sectional shapes of the side portions being in a constant direction with respect to a coil radial direction, and at least either of the one-side connecting portions and the other-side connecting portions are V-shaped connecting portions each bent at one position and shaped into a substantially V shape so as to project outward in the coil radial direction.

With this characteristic structure, since the plurality of side portions are arranged along the coil circumferential direction with directions of cross-sectional shapes of the side portions being in a constant direction with respect to a coil radial direction, it is particularly suitable for structuring an armature by inserting the plurality of side portions respectively in a plurality of slots provided in the circumferential direction of a cylindrical armature core. Further, in this coil, to achieve arrangement and directions of such side portions, at least either of the one-side connecting portions and the other-side connecting portions are the V-shaped connecting portions each bent at one position and shaped into a substantially V shape so as to project outward in the coil radial direction. Such a V-shaped connecting portion can be shaped by simple bending to just bend at least either of the one-side connecting portions and the other-side connecting portions at one position into a substantially V shape. Further, such bending of the V-shaped connecting portion can be performed with a relatively small shaping load, and a space required for bending can be suppressed relatively small. Accordingly, bending can be performed appropriately even when a linear material length of the V-shaped connecting portion is relatively short and a large space for bending is difficult to be secured, such as when at least either of the one-side connecting portions and the other-side connecting portions are located more inside in the coil radial direction than the side portions, for example, thereby forming the V-shaped connecting portion. Therefore, the coil is easy to manufacture and has a suitable structure for mass production.

Here, the structure of the coil according to the third aspect of the present invention is particularly suitable for a structure in which a portion in the wave width direction of a wave conductor including the V-shaped connecting portions is bent inward in the coil radial direction to be substantially in parallel with a plane orthogonal to the coil axis direction. Specifically in such a structure, at least either of the one-side connecting portions and the other-side connecting portions to be V-shaped connecting portions are located more inside in the coil radial direction than the side portions, and linear material lengths of the V-shaped connecting portions are relatively short, resulting in a difficulty to secure a large space for bending. However, the structure of the coil according to the third aspect of the present invention allows bending with a relatively small shaping load in a relatively small space. Further, with this structure, the V-shaped connecting portions are located more inside in the coil radial direction than the side portions. Therefore, for example, the wave wound coil can have a shape that can be inserted easily in groove-shaped slots extending in an axial direction of an armature core, when the wave wound coil is inserted in the slots provided on an inner peripheral face of a cylindrical armature core to form an armature.

Further, at least either of the one-side connecting portions and the other-side connecting portions may have a bent portion shaped into a substantially arc shape in a portion in a linear material length direction, and may be entirely in a substantially V shape having straight portions which extend linearly on both sides of the bent portion.

With this structure, for at least ones of the one-side connecting portions and the other-side connecting portions, by simple processing to bend a substantially straight linear conductor at one position in a linear material length direction in a substantially arc shape, at least either of the one-side connecting portions and the other-side connecting portions can be shaped into a substantially V shape. Therefore, the bending can be performed with a relatively small shaping load, and a space required for bending can be suppressed relatively small. Thus, it is possible to reduce manufacturing costs for the coil.

Further, either of the one-side connecting portions and the other-side connecting portions may be shaped into a substantially V shape that is bent at one position so as to project outward in the coil radial direction, and the remaining of the one-side connecting portions and the other-side connecting portions may be shaped substantially entirely into a substantially arc shape so as to project outward in the coil radial direction.

With this structure, since the remaining of the one-side connecting portions and the other-side connecting portions are shaped into a substantially arc shape so as to project outward in the coil radial direction, and thus have a shape that can be arranged along an outer periphery of the coil. On the other hand, either of the one-side connecting portions and the other-side connecting portions can be shaped by simple processing of just bending at one position to project outward in the coil radial direction. Such bending of the other-side connecting portions can be performed with a relatively small shaping load, and a space required for bending can be suppressed relatively small. Therefore, this structure is particularly suitable when the linear material lengths of either of the one-side connecting portions and the other-side connecting portions are relatively short and a large space for bending is difficult to be secured, such as when either of the one-side connecting portions and the other-side connecting portions are located more inside in the coil radial direction than the side portions, for example.

The structure of the coil according to the present invention is also suitable for a coil having a plurality of winding layers of two or more windings. Such a coil having a plurality of winding layers can have a structure in which the side portions, the one-side connecting portions, and the other-side connecting portions are wound for a plurality of windings so that the side portions, the one-side connecting portions, and the other-side connecting portions are plurally arranged in the coil radial direction.

Further, when the cross-sectional shape of the linear conductor is rectangular, two sides in parallel with each other in a rectangular cross section of the side portions may be in a direction along the coil radial direction.

With this structure, the coil can be made suitable for inserting in a plurality of slots arranged at predetermined intervals in a circumferential direction on an inner peripheral face of a cylindrical armature core, particularly in groove-shaped slots extending in an axial direction of the armature core and arranged radially along a radial direction of the armature core.

BRIEF DESCRIPTION OF THE DRAWINGS

FIG. 5 is a perspective view showing the manufacturing processes of the wave conductor in stages according to the embodiment of the present invention;

FIG. 13 is a perspective view showing the entire structure of the coil manufacturing apparatus according to the embodiment of the present invention;

FIG. 16 is an explanatory view of the wave conductor forming process and the wave conductor forming unit according to the embodiment of the present invention;

DETAILED DESCRIPTION OF THE EMBODIMENTS

A coil manufacturing method and a coil manufacturing apparatus 1 (see FIG. 13) and a wave wound coil 3C (see FIG. 11) that is a coil manufactured by the method and the apparatus according to an embodiment of the present invention will be described based on the drawings. The coil manufacturing method and the coil manufacturing apparatus 1 are the method and the apparatus for manufacturing a substantially cylindrical wave wound coil 3C by shaping a linear conductor 3L with a cross-sectional shape having directionality (see FIG. 2). In this embodiment, one sequential linear conductor 3L is shaped from one end side sequentially to produce a substantially cylindrical wave wound coil 3C. Such a substantially cylindrical wave wound coil 3C is preferably used as, for example, an armature coil for rotary electrical machine. Here, the "rotary electrical machine" is used as a concept including all of a motor (electric motor), a generator (power generator), and a motor-generator which serves both functions of a motor and a generator if required. Hereinafter, the coil manufacturing method according to this embodiment will be described schematically, and thereafter details of the structure of the coil manufacturing apparatus 1 and manufacturing processes performed using the coil manufacturing apparatus 1 will be described in order.

1. Overview of the Coil Manufacturing Method

Figure 1:
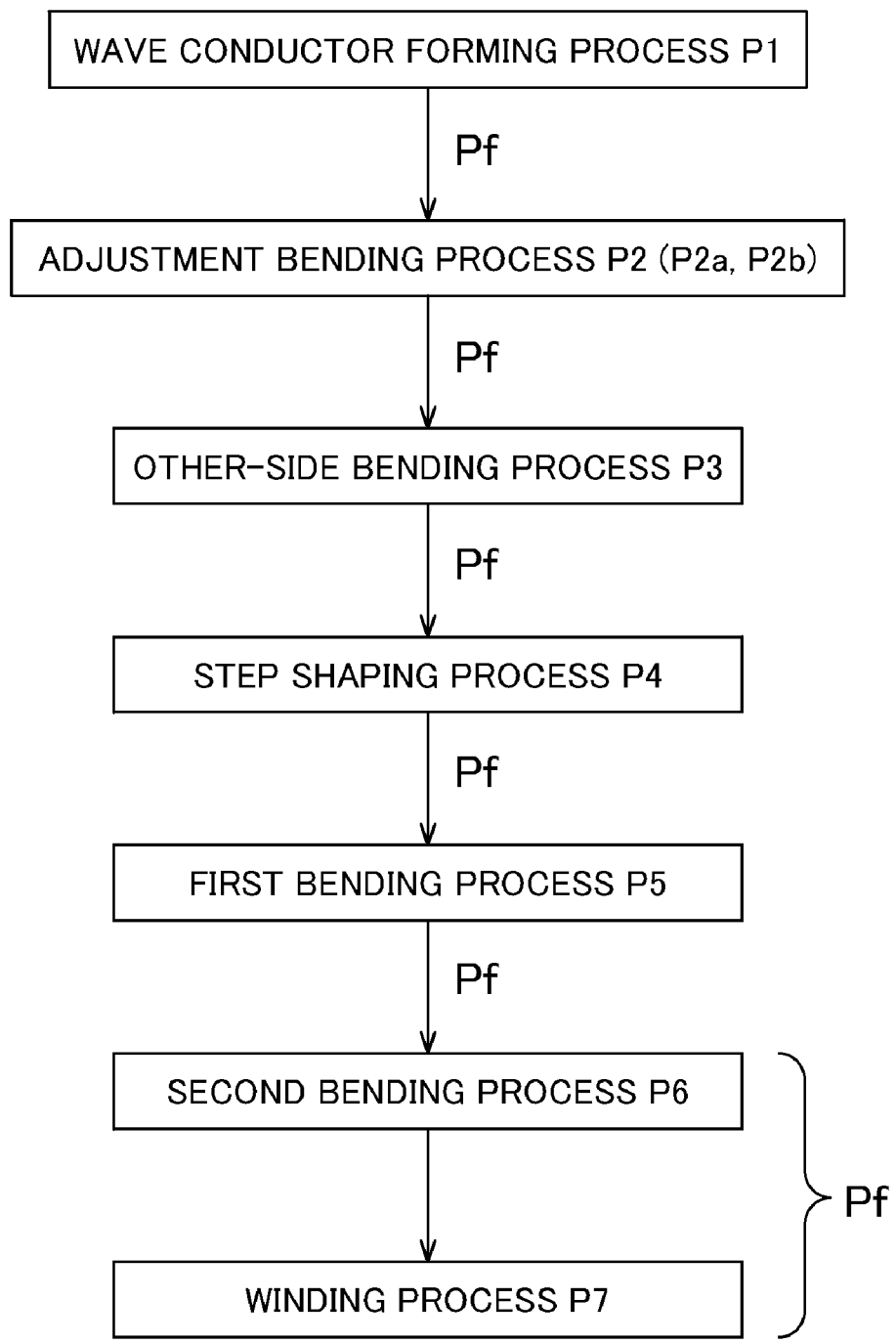
FIG. 1 is an explanatory chart showing the order of processes of a coil manufacturing method according to an embodiment of the present invention.

The coil manufacturing method according to the embodiment of the present invention has a wave conductor forming process P1, an adjustment bending process P2, an other-side bending process P3, a step shaping process P4, a first bending process P5, a second bending process P6, and a winding process P7 as shown in FIG. 1. Further, this coil manufacturing method also has a transfer process Pf to transfer the wave conductor 3 as the linear conductor 3L formed in a substantially rectangular waveform, between the processes or simultaneously with the start of one of the processes. From FIG. 2 to FIG. 11, manufacturing processes are illustrated in stages, through which a wave conductor 3 formed of the linear conductor 3L, which is formed in a substantially rectangular waveform in the wave conductor forming process P1, undergoes each process from the adjustment bending process P2 to the winding process P7, and finally becomes the substantially cylindrical wave wound coil 3C. Note that, in the following description, a coil circumferential direction CC means a circumferential direction of the substantially cylindrical wave wound coil 3C to be formed finally, and a coil radial direction CR means a radial direction of this wave wound coil 3C.

In this embodiment, as the linear conductor 3L with a cross-sectional shape having directionality, one having a rectangular cross section is used. Specifically, this linear conductor 3L has a rectangular or square cross-sectional shape, and is a linear conductor having an even cross-sectional shape in a linear material length direction LL. This linear conductor 3L is formed of a conductive material capable of being plastically processed, such as copper or aluminum, and has a surface on which an insulating film made of resin, ceramic, or the like is formed. Then the substantially straight linear conductor 3L is supplied to the wave conductor forming process P1.

Figure 2:
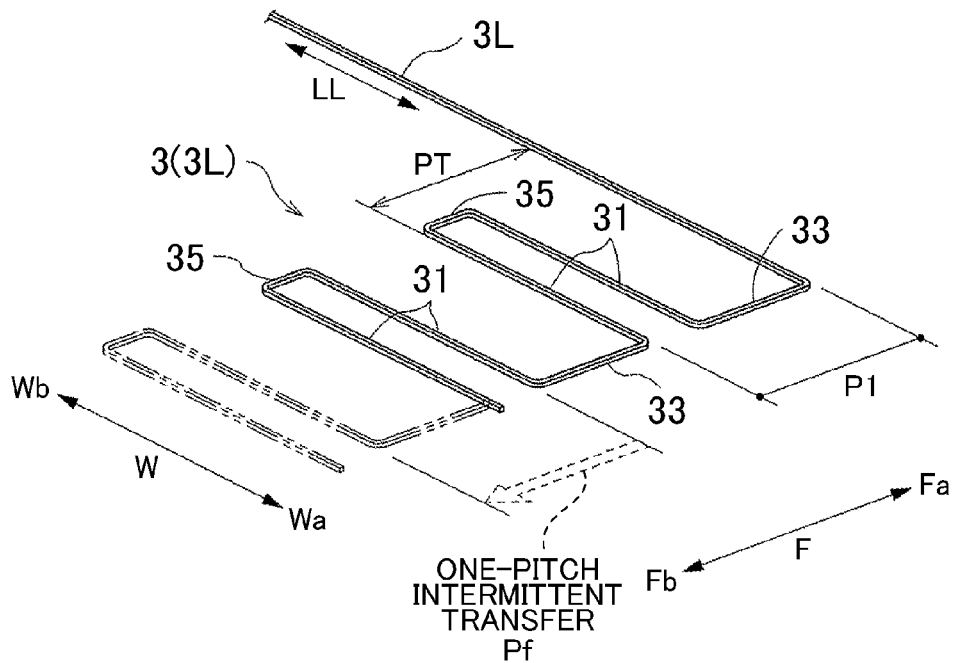
FIG. 2 is a perspective view showing manufacturing processes of a wave conductor in stages according to the embodiment of the present invention.

The wave conductor forming process P1 is a process of forming the substantially straight linear conductor 3L in a substantially rectangular waveform, as shown in FIG. 2. Here, the linear conductor 3L shaped in a substantially rectangular waveform will be referred to as a wave conductor 3. The wave conductor 3 has a plurality of straight side portions 31 extending in a wave width direction W, one-side connecting portions 33 sequentially connecting every other pair of adjacent side portions 31 at ends on a one wave width direction side Wa of the side portions 31, and other-side connecting portions 35 sequentially connecting pairs of adjacent side portions 31 that are not connected by the one-side connecting portions 33 at ends on the other wave width direction side Wb. In this embodiment, the one-side connecting portions 33 and the other-side connecting portions 35 after this wave conductor forming process P1 is performed are each formed in a substantially straight form extending in a direction substantially orthogonal to the side portions 31. Here, the wave width direction W is an amplitude direction of the wave conductor 3 having a substantially rectangular waveform. This wave width direction W is substantially in parallel with a coil axis direction in a state that the wave conductor 3 is finally shaped as the substantially cylindrical wave wound coil 3C.

Figure 4:
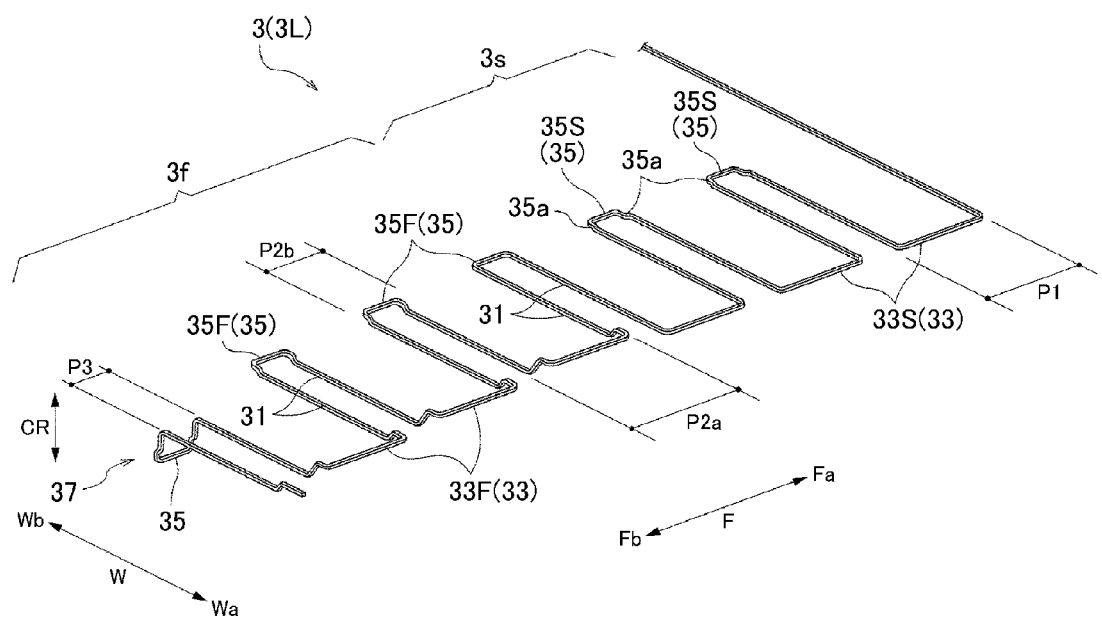
FIG. 4 is a perspective view showing the manufacturing processes of the wave conductor in stages according to the embodiment of the present invention.

Further, in this embodiment, the substantially straight linear conductor 3L is bent to form a portion of one wave cycle PT of the wave conductor 3 in one time of the wave conductor forming process P1. That is, in the wave conductor forming process P1, four positions of the substantially straight linear conductor 3L are bent substantially perpendicularly in one process to form a substantially S shape, thereby forming a portion of one wave cycle PT of the wave conductor 3. The portion of one wave cycle PT of the wave conductor 3 includes two side portions 31, as well as the one-side connecting portion 33 and the other-side connecting portion 35. As will be described later, in this embodiment, it is arranged that two windings of the wave conductor 3 are wound on a bobbin 71 (see FIG. 13). Accordingly, as shown in FIG. 4 and FIG. 5, in the wave conductor forming process P1, a first winding section 3f of the wave conductor 3 to be radially inside in a state of being wound on the bobbin 71 and a second winding section 3s of the wave conductor 3 to be radially outside thereof are bent to have different shapes from each other. Here, particularly the shape of the other-side connecting portion 35 is different. Specifically, in the first winding section 3f, the other-side connecting portions 35 (first winding other-side connecting portions 35F) are formed to only bend substantially orthogonally with respect to the side portions 31. On the other hand, in the second winding section 3s, the other-side connecting portions 35 (second winding other-side connecting portions 35S) are formed by being bent twice in a crank shape and then bent substantially orthogonally with respect to the side portions 31. Thus, at connections to the side portions 31 at both ends in the linear material length direction LL of the other-side connecting portions 35, recessed portions 35a which are recessed on the one wave width direction side Wa are formed.

The wave conductor 3 formed in a substantially rectangular waveform by the wave conductor forming process P1 is transferred intermittently in the transfer process Pf. In this embodiment, the intermittent transfer is performed with a portion of one wave cycle PT of the wave conductor 3 being one pitch. In this transfer process Pf, the wave conductor 3 is transferred with a direction substantially orthogonal to the wave width direction W within a plane including plural side portions 31 being a transfer direction F. In this embodiment, the intermittent transfer of the wave conductor 3 by the transfer process Pf and the wave conductor forming process P1 are carried out alternately. That is, the portion of one wave cycle PT of the wave conductor 3 formed by the wave conductor forming process P1 is transferred in the transfer direction F every time the wave conductor forming process P1 is performed.

Figure 3:
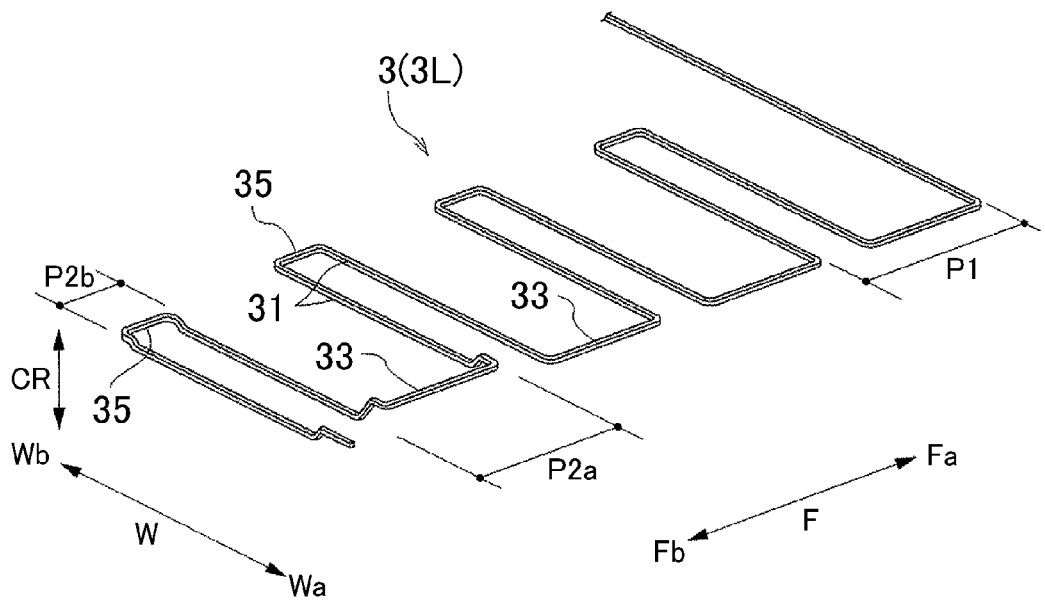
FIG. 3 is a perspective view showing the manufacturing processes of the wave conductor in stages according to the embodiment of the present invention.

As a post process of the wave conductor forming process P1, the adjustment bending process P2 is performed. In this embodiment, as shown in FIG. 3, the adjustment bending process P2 is performed from a position at three pitches (three wave cycles) on a transfer direction downstream side Fb with respect to the wave conductor forming process P1. FIG. 3 shows a state that intermittent transfer by two pitches with respect to FIG. 2 is performed. In this embodiment, the adjustment bending process P2 has a one-side adjustment bending process P2a and an other-side adjustment bending process P2b. In this embodiment, the one-side adjustment bending process P2a and the other-side adjustment bending process P2b are performed substantially simultaneously on the one-side connecting portion 33 and the other-side connecting portion 35 respectively, which are adjacent to each other in the transfer direction F. The one-side adjustment bending process P2a is a process of bend shaping the vicinity of the one-side connecting portion 33, and the other-side adjustment bending process P2b is a process of bend shaping the vicinity of the other-side connecting portion 35. These adjustment bending processes P2 are processes of bend shaping the vicinity of the one-side connecting portion 33 or the vicinity of the other-side connecting portion 35 so that positions of the one-side connecting portion 33 and the other-side connecting portion 35 in the coil radial direction CR are located appropriately in a state that the wave conductor 3 is finally shaped as the cylindrical wave wound coil 3C. In this embodiment, as will be described later, it is structured that two windings of the wave conductor 3 are wound on the bobbin 71 (see FIG. 13). Accordingly, particularly in the other-side adjustment bending process P2b, the vicinity of the other-side connecting portion 35 of the wave conductor 3 is bent and shaped into a different shape in each winding so that the other-side connecting portion 35 is at a different position in the coil radial direction CR in each winding.

Specifically, in the one-side adjustment bending process P2a, the one-side connecting portion 33 is bent and shaped to be offset outward in the coil radial direction CR from side portions 31. In this embodiment, on a transfer direction upstream side Fa with respect to the bending position of the first bending process P5 which will be described later, the wave conductor 3 is transferred in a direction such that the outside in the coil radial direction CR in a state of being shaped as the wave wound coil 3C is a vertically upper side. Therefore, in this one-side adjustment bending process P2a, the one-side connecting portion 33 is bent and shaped so as to rise vertically upward with respect to the side portions 31. Here, the side portions 31 in the vicinity of the one-side connecting portion 33 are bent twice in a crank shape to form a step portion, and thereby the one-side connecting portion 33 is offset vertically upward from the side portions 31. Note that upper sides in the diagrams of FIG. 2 to FIG. 11 match the vertically upper side. In this one-side adjustment bending process P2a, bend shaping into a common shape is performed for the first winding section 3f and the second winding section 3s, which become different windings of the wave conductor 3.

On the other hand, in the other-side adjustment bending process P2b, the vicinity of the other-side connecting portion 35 of the wave conductor 3 is bent and shaped into a different shape in each winding. In this embodiment, the other-side connecting portion 35 constituting the second winding section 3s (hereinafter referred to as a "second winding other-side connecting portion 35S") is not bent and shaped, and only the other-side connecting portion 35 constituting the first winding section 3f (hereinafter referred to as a "first winding other-side connecting portion 35F") is bent and shaped. Specifically, the first winding other-side connecting portion 35F is bent and shaped to be offset outward in the coil radial direction CR from the side portions 31. That is, in this other-side adjustment bending process P2b, the other-side connecting portion 35 is bent and shaped so as to rise vertically upward with respect to the side portions 31. The offset amount of the other-side connecting portion 35 from the side portions 31 at this time is set equal to a linear material width of the linear conductor 3L forming the wave conductor 3. Note that the linear material width of the linear conductor 3L here is the width (thickness) in the coil radial direction CR of the linear material forming the linear conductor 3L. Here, the side portions 31 in the vicinity of the other-side connecting portion 35 are bent twice in a crank shape to form a step portion, and thereby the other-side connecting portion 35 is offset vertically upward from the side portions 31.

As a post process of the adjustment bending process P2, the other-side bending process P3 is performed. In this embodiment, as shown in FIG. 4, the other-side bending process P3 is performed from a position at two pitches (two wave cycles) on the transfer direction downstream side Fb with respect to the other-side adjustment bending process P2b. FIG. 4 shows a state that intermittent transfer by two pitches with respect to FIG. 3 is performed. The other-side bending process P3 is a process in which a portion of the wave conductor 3 on the other wave width direction side Wb including the other-side connecting portion 35 is bent inward in the coil radial direction CR (here, vertically downward). Here, the region of this portion of the wave conductor 3 on the other wave width direction side Wb to be bent in the other-side bending process P3 will be referred to as an other-side end face forming region 37. The other-side end face forming region 37 is structured including the entire other-side connecting portion 35 and portions of the side portions 31 in the vicinity of this other-side connecting portion 35. Further, in this embodiment, the other-side end face forming region 37 includes a step portion formed by bending the side portions 31 in a crank shape in the other-side adjustment bending process P2b. Then in this other-side bending process P3, the other-side end face forming region 37 is bent at a predetermined bending angle from the side portions 31 on the one wave width direction side Wa with respect to the other-side end face forming region 37. In this embodiment, this bend angle is set to a substantially right angle, which is the same for the first winding section 3f and the second winding section 3s.

Figure 9:
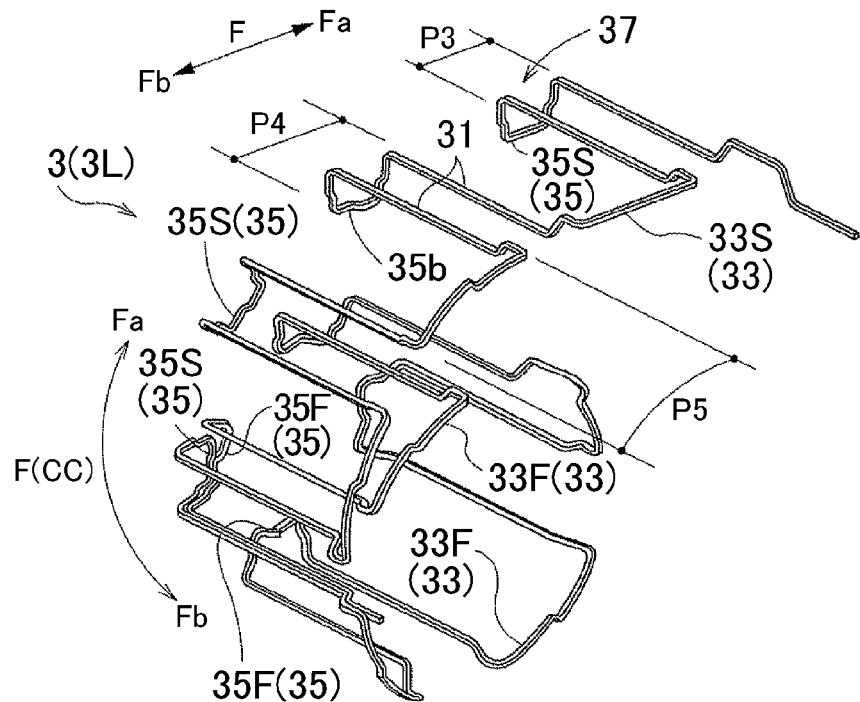
FIG. 9 is a perspective view showing the manufacturing processes of the wave conductor in stages according to the embodiment of the present invention.

As a post process of the other-side bending process P3, the step shaping process P4 is performed. In this embodiment, as shown in FIG. 5, the step shaping process P4 is performed from a position at one pitch (one wave cycle PT) on the transfer direction downstream side Fb from the other-side bending process P3. FIG. 5 shows a state that intermittent transfer by two pitches with respect to FIG. 4 is performed. The step shaping process P4 is a process of forming a step portion 35b at one position in the linear material length direction LL (transfer direction F) of the other-side connecting portion 35. In this embodiment, a step portion 35b on the wave width direction W (coil axis direction) is formed on the other-side connecting portion 35. Specifically, the step portion 35b is formed such that a portion of the other-side connecting portion 35 on the transfer direction downstream side Fb with respect to the step portion 35b is situated on the more other wave width direction side Wb as compared to a portion thereof on the transfer direction upstream side Fa. As shown in FIG. 9, this step portion 35b is formed in both the first winding other-side connecting portions 35F and the second winding other-side connecting portions 35S.

Figure 6:
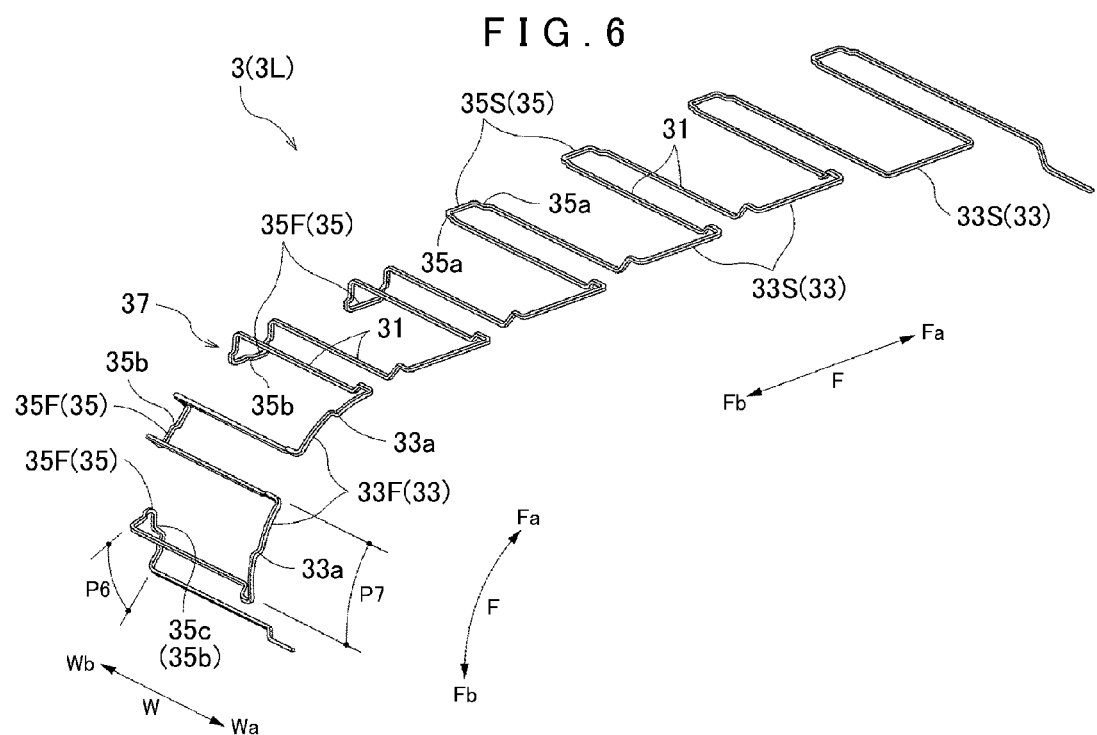
FIG. 6 is a perspective view showing the manufacturing processes of the wave conductor in stages according to the embodiment of the present invention.
Figure 7:
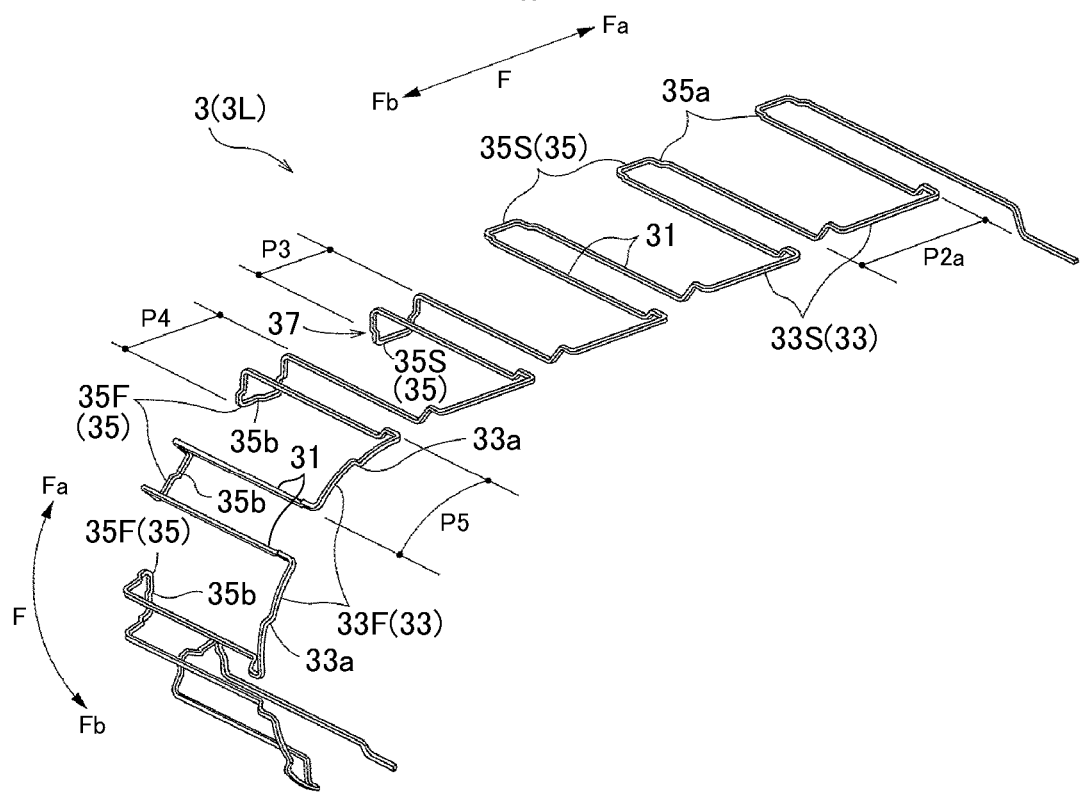
FIG. 7 is a perspective view showing the manufacturing processes of the wave conductor in stages according to the embodiment of the present invention.

As a post process of the step shaping process P4, the first bending process P5 and the second bending process P6 are performed. In this embodiment, as shown in FIG. 5, the first bending process P5 is performed from a position at four pitches (four wave cycles) on the transfer direction downstream side Fb from the one-side adjustment bending process P2a. On the other hand, as shown in FIG. 6, the second bending process P6 is performed from a position at three pitches (three wave cycles) on the transfer direction downstream side Fb from the position in the other-side bending process P3. In comparison with the first bending process P5, the second bending process P6 is performed from a position at 1.5 pitch (1.5 wave cycle) on the transfer direction downstream side Fb from the position in the first bending process P5.

Figure 34:
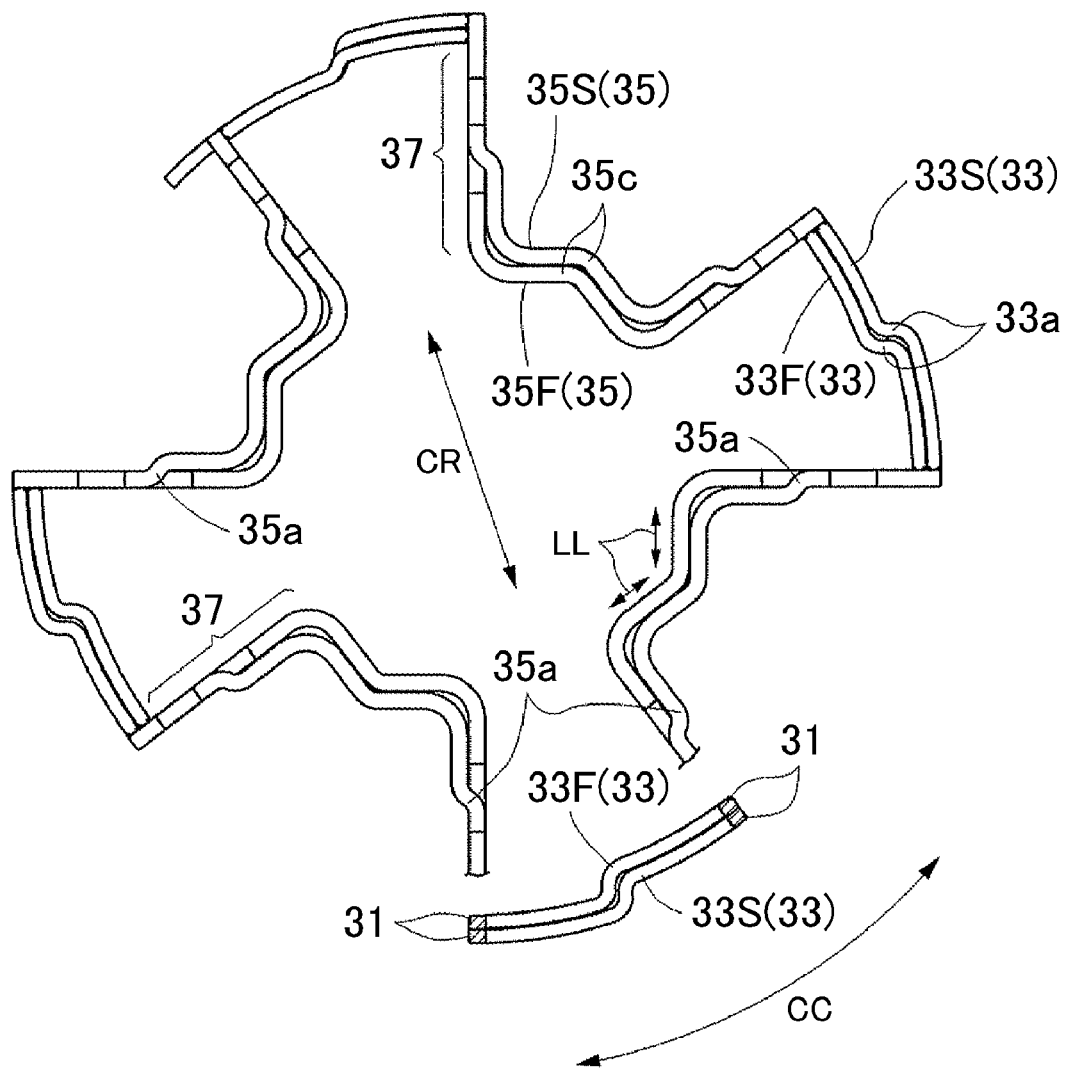
FIG. 34 is a partially cross-sectional plan view of the wave wound coil according to the embodiment of the present invention.
Figure 35A:
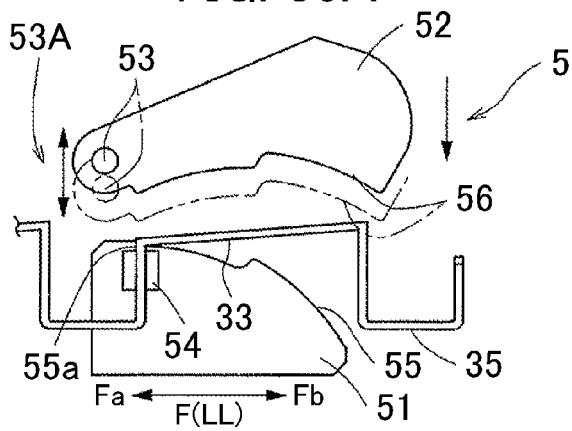
FIGS. 35A to 35E show explanatory views illustrating operation of a first bending process in stages according to another embodiment of the present invention.
Figure 35B:
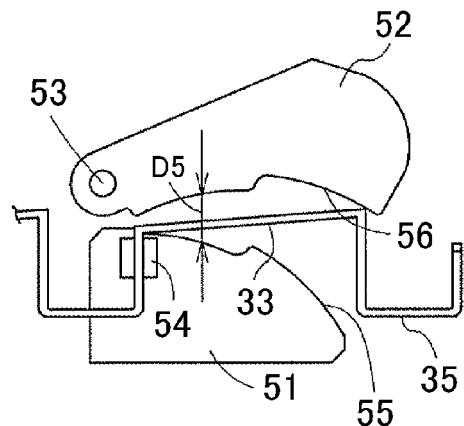
Figure 35C:
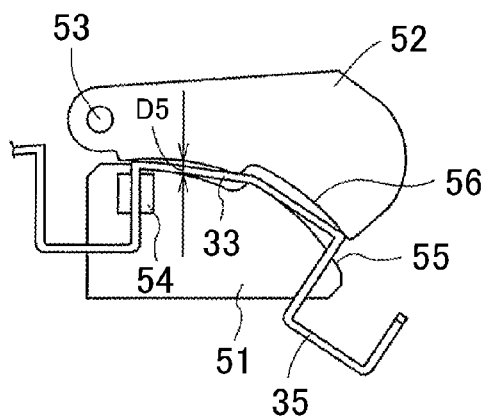
Figure 35D:
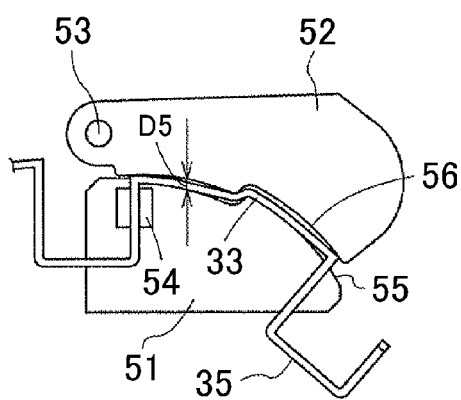
Figure 35E:
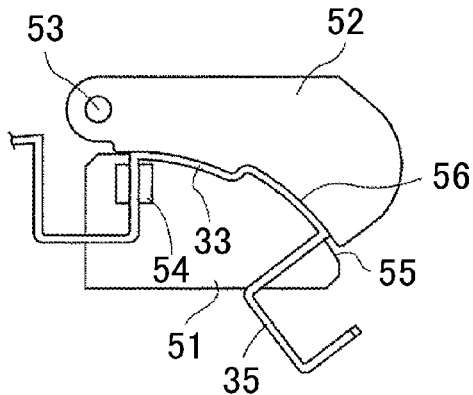

The first bending process P5 and the second bending process P6 are a process of bending, as shown in FIG. 34 and so on, the one-side connecting portion 33 and the other-side connecting portion 35 so that a plurality of side portions 31 are arranged along the coil circumferential direction CC, and directions of cross-sectional shapes of the side portions 31 are in a constant direction with respect to the coil radial direction CR. Accordingly, as shown from FIG. 9 to FIG. 11 and so on, in portions of the wave conductor 3 after the first bending process P5 and the second bending process P6 are finished, a plurality of side portions 31 are arranged in the coil circumferential direction CC along an outer peripheral face of a substantially cylindrical shape of the wave wound coil 3C to be finally formed. In this state, moreover, cross-sectional shapes of the side portions 31 are formed to be in a direction along a radial direction of the substantially cylindrical shape of the wave wound coil 3C. In this embodiment, since the side portion 31 has a rectangular cross-sectional shape, a direction in which two sides in parallel with each other in this rectangular cross section become substantially in parallel with the coil radial direction CR is arranged along the coil radial direction CR. Here, the process of bending the one-side connecting portion 33 is the first bending process P5, and the process of bending the other-side connecting portion 35 is the second bending process P6. In both the first bending process P5 and the second bending process P6, the one-side connecting portion 33 or the other-side connecting portion 35 is bent to project outward in the coil radial direction CR. The second bending process P6 is performed as a post process of the first bending process P5.

In this embodiment, the first bending process P5 is a process of shaping the substantially entire one-side connecting portion 33 into a substantially arc shape, as shown in FIG. 5. In this first bending process P5, the one-side connecting portion 33 is shaped into a substantially arc shape which curves to project outward in the coil radial direction CR. This shaping is performed so that the one-side connecting portion 33 in a substantially arc shape after shaped in this first bending process P5 has a radius of curvature equal to a radius of the outer peripheral face formed by the one-side connecting portion 33 in the substantially cylindrical wave wound coil 3C that is formed finally. Note that in this embodiment, the one-side connecting portion 33 after shaped in this first bending process P5 has a step portion 33a at one position on this one-side connecting portion 33 in the linear material length direction LL (transfer direction F). This step portion 33a is in the coil radial direction CR. Specifically, the step portion 33a is formed such that a portion of the one-side connecting portion 33 on the transfer direction downstream side Fb with respect to the step portion 33a is located outside in the coil radial direction CR as compared to a portion thereof on the transfer direction upstream side Fa. This step portion 33a is formed in both the one-side connecting portions 33 constituting the first winding section 3f (hereinafter referred to as "first winding one-side connecting portions 33F") and the one-side connecting portions 33 constituting the second winding section 3s (hereinafter referred to as "second winding one-side connecting portions 33S"). However, the position of the step portion 33a in the linear material length direction LL (transfer direction F) of the one-side connecting portion 33 is different between the first winding section 3f and the second winding section 3s. Specifically, the step portion 33a formed in a second winding one-side connecting portion 33S is formed to be situated on the more transfer direction upstream side Fa than the step portion 33a formed in a first winding one-side connecting portion 33F. Thus, the one-side connecting portions 33 are shaped into a different shape in each winding in the first bending process P5, and thereby the one-side connecting portions 33 in different windings of the wave conductor 3 are plurally arranged in parallel appropriately in the coil radial direction CR, as shown in FIG. 10 and FIG. 11.

In this embodiment, the second bending process P6 is a process of bending the other-side connecting portion 35 at one position into a substantially V shape, as shown in FIG. 6. In this second bending process P6, the other-side connecting portion 35 is shaped in a substantially V shape that is bent to project outward in the coil radial direction CR. As also shown in FIG. 34, the other-side connecting portion 35 after shaped in this second bending process P6 is shaped so that a linear material length direction LL of a straight portion forming the substantially V shape is in a direction substantially orthogonal to the coil radial direction CR. Incidentally, in this embodiment, a bent portion 35c by the second bending process P6 is set at substantially the same position as the step portion 35b in the other-side connecting portion 35. As shown in FIG. 10, by this second bending process P6, both the first winding other-side connecting portions 35F and the second winding other-side connecting portions 35S are shaped in a substantially V shape. However, the bent shape of the other-side connecting portion 35 is different between the first winding section 3f and the second winding section 3s.

Figure 10:
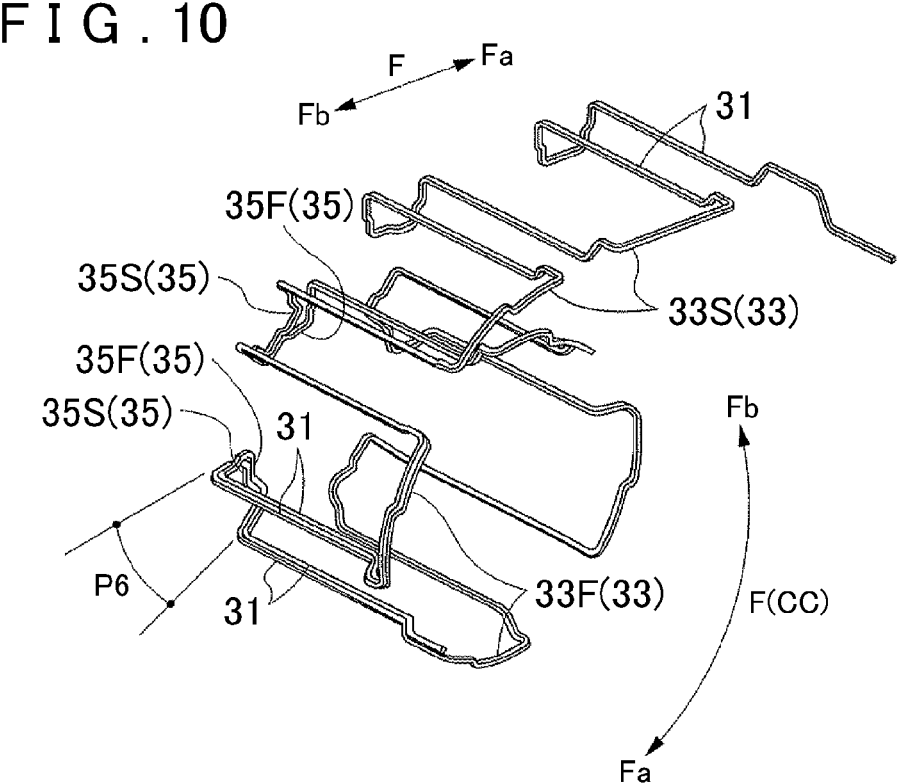
FIG. 10 is a perspective view showing the manufacturing processes of the wave conductor in stages according to the embodiment of the present invention.
Figure 11:
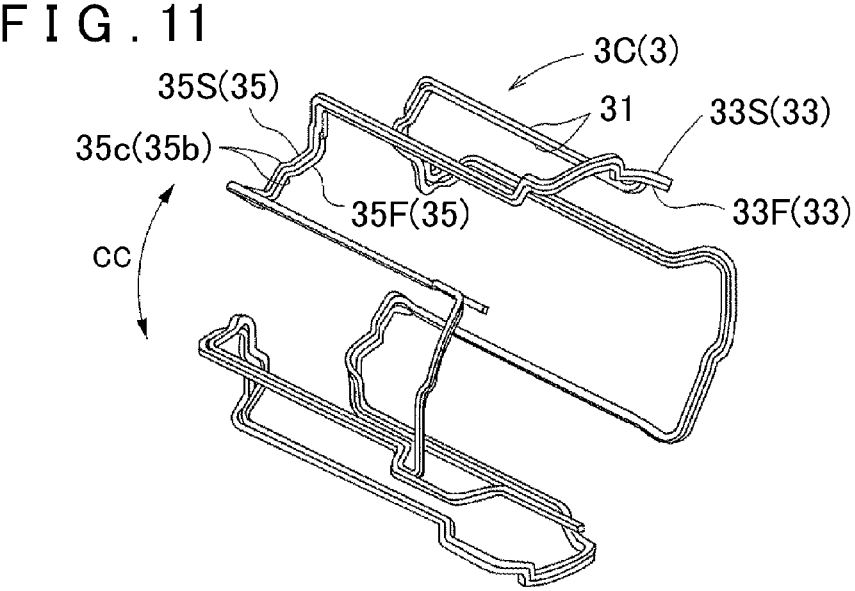
FIG. 11 is a perspective view showing the manufacturing processes of the wave conductor in stages according to the embodiment of the present invention.
Figure 12:
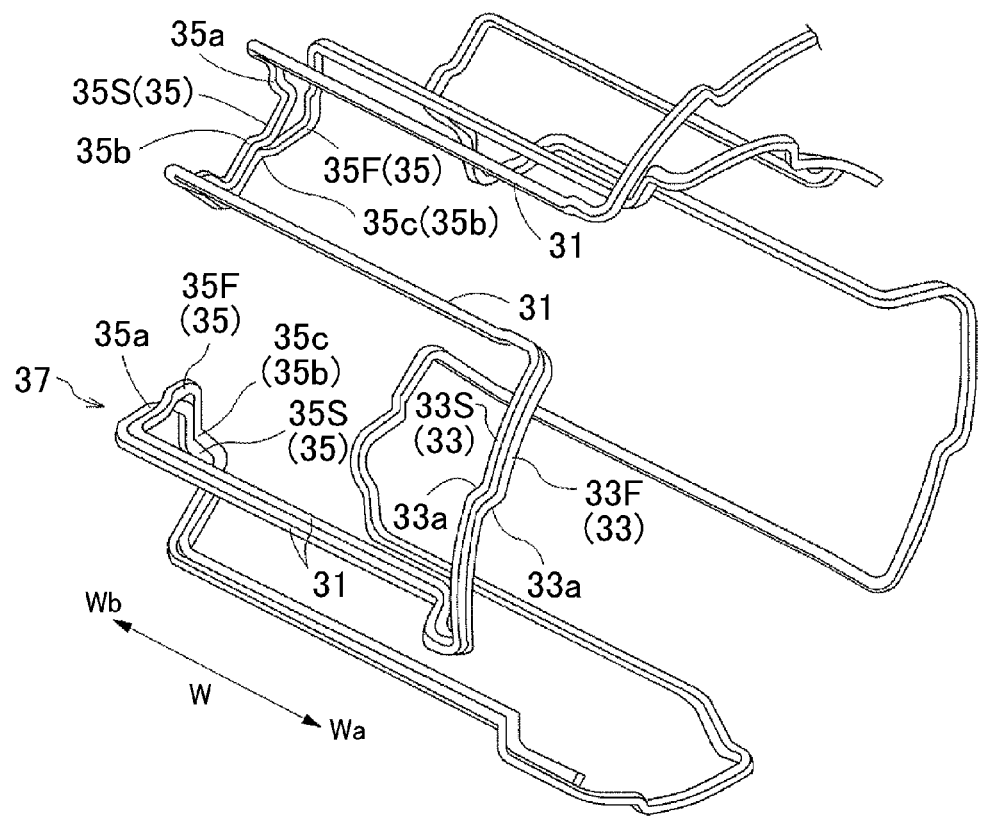
FIG. 12 is a partially enlarged view of FIG. 10.

Specifically, as shown in FIG. 10 and FIG. 11, in a state of the substantially cylindrical wave wound coil 3C that is finally formed, the first winding other-side connecting portion 35F and the second winding other-side connecting portion 35S are arranged adjacent to each other in the coil radial direction CR. Such an arrangement structure is achieved by that, as shown in FIG. 12 that is a partially enlarged view of FIG. 10, the recessed portions 35a are formed in the second winding other-side connecting portion 35S in the wave conductor forming process P1, and the first winding other-side connecting portion 35F is bent and shaped to be offset toward the other wave width direction side Wb from the side portions 31 in the other-side adjustment bending process P2b. That is, the portion of the first winding other-side connecting portion 35F that is offset toward the other wave width direction side Wb fits in the recessed portions 35a of a second winding other-side connecting portion 35S, and thereby the first winding other-side connecting portion 35F and the second winding other-side connecting portion 35S are arranged at the same position in the wave width direction W (coil axis direction). In this state, the second winding other-side connecting portion 35S is arranged outside in the coil radial direction CR adjacent to the first winding other-side connecting portion 35F. In addition, bend shaping of the second winding other-side connecting portion 35S in the second bending process P6 is performed in a state that the second winding other-side connecting portion 35S is arranged outside in the coil radial direction CR with respect to the first winding other-side connecting portion 35F already bent and shaped in a substantially V shape. Accordingly, in this embodiment, the second winding other-side connecting portion 35S is bent at one position abutting on the already bent first winding other-side connecting portion 35F, and is thereby shaped into a substantially V shape abutting on the first winding other-side connecting portion 35F. Thus, the other-side connecting portions 35 are shaped into a different shape in each winding in the second bending process P6, and thereby the other-side connecting portions 35 in different windings of the wave conductor 3 are plurally arranged in parallel appropriately in the coil radial direction CR, as shown in FIG. 10 to FIG. 12.

Figure 8:
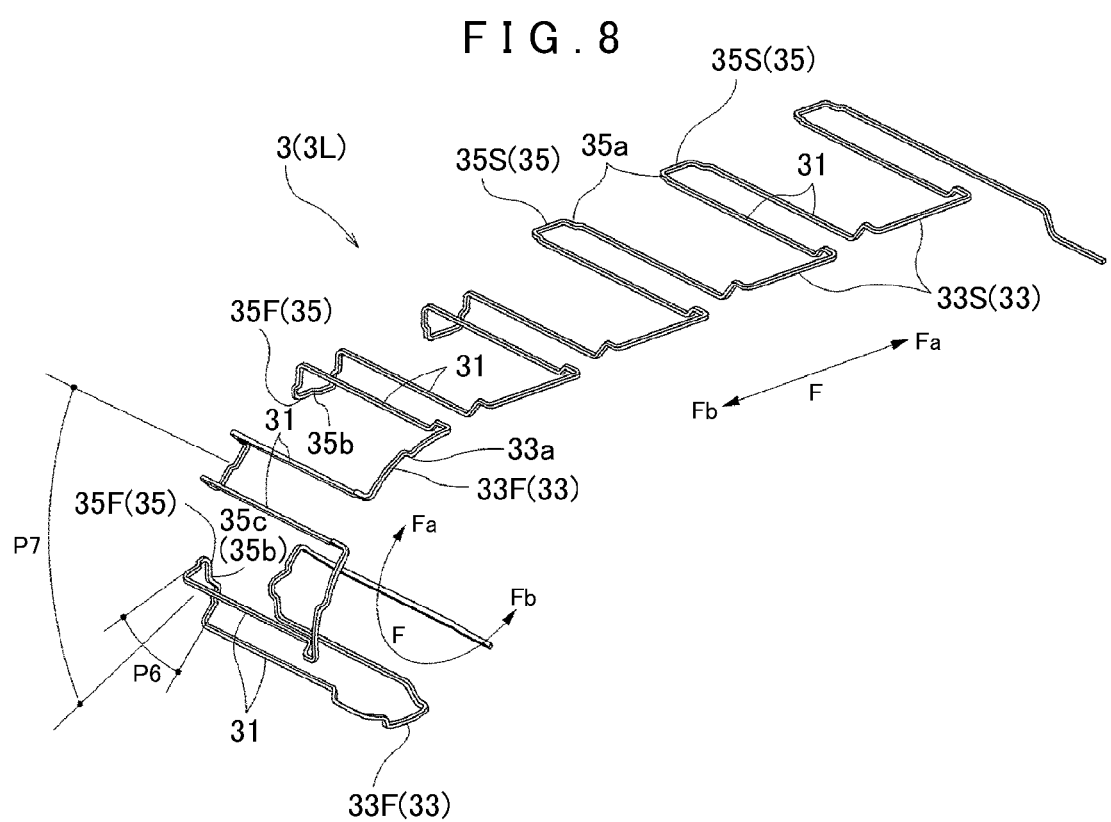
FIG. 8 is a perspective view showing the manufacturing processes of the wave conductor in stages according to the embodiment of the present invention.

The winding process P7 is a process of winding the wave conductor 3 bend processed in the first bending process P5 and the second bending process P6 on the bobbin 71 (see FIG. 13). Although the bobbin 71 is omitted in FIG. 2 to FIG. 12, the portion of the wave conductor 3 on which both the first bending process P5 and the second bending process P6 are finished are formed in the substantially cylindrical shape of the wave wound coil 3C to be formed finally, as shown in FIG. 6 to FIG. 11. In the winding process P7, the portion of the wave conductor 3 thus shaped in the substantially cylindrical shape is wound on the bobbin 71. Specifically, in the state shown in FIG. 6, the first bending process P5 and the second bending process P6 are finished on both the other-side connecting portion 35 and the one-side connecting portion 33 on the most downstream side in the transfer direction F, and a portion of the wave conductor 3 including the three side portions 31 connected to both ends of these other-side connecting portion 35 and one-side connecting portion 33 is formed in a substantially cylindrical shape and wound on the bobbin 71. Thereafter, when the second bending process P6 is performed as shown in FIG. 8 after being through the first bending process P5 shown in FIG. 7, the next portion of one wave cycle PT of the wave conductor 3 is wound on the bobbin 71 in the winding process P7. Thereafter, by performing the first bending process P5 and the second bending process P6 in a similar manner, the wave conductor 3 is wound on the bobbin 71 by each one wave cycle PT in the winding process P7.

In this embodiment, the second bending process P6 is a post process of the first bending process P5. At the point when the second bending process P6 is finished, the wave conductor 3 on the transfer direction downstream side Fb with respect to the processed position by the second bending process P6 is finally formed in the substantially cylindrical shape of the wave wound coil 3C. Therefore, in this embodiment, the winding process P7 is performed in synchronization with the second bending process P6. At the same time as the second bending process P6 is finished, the winding process P7 of a portion of one wave cycle PT of the wave conductor 3 is finished. The wave conductor 3 and operation of the bobbin 71 when performing the second bending process P6 and the winding process P7 simultaneously will be described in detail later. As shown in FIG. 9 to FIG. 11, in this winding process P7, finally two windings of the wave conductor 3 are wound on the bobbin 71, and after the two windings are wound, two side portions 31 in different windings of the wave conductor 3 are arranged in the coil radial direction CR.

2. Overall Structure of the Coil Manufacturing Apparatus

Next, the overall structure of the coil manufacturing apparatus 1 for carrying out the coil manufacturing method according to this embodiment will be described schematically. The coil manufacturing apparatus 1 according to this embodiment has, as shown in FIG. 13, a wave conductor forming unit 11 for performing the wave conductor forming process P1, a one-side adjustment bending unit 12 for performing the one-side adjustment bending process P2a, an other-side adjustment bending unit 13 for performing the other-side adjustment bending process P2b, an other-side bending unit 14 for performing the other-side bending process P3, a step shaping unit 15 for performing the step shaping process P4, a first bending unit 5 for performing the first bending process P5, a second bending unit 6 for performing the second bending process P6, a winding unit 7 for performing the winding process P7, and a transfer unit 4 for performing the transfer process Pf.

In this embodiment, these units are arranged along the transfer direction F of the wave conductor 3 in the following order. Specifically, as shown in FIG. 13, the wave conductor forming unit 11 is arranged on the most upstream side in the transfer direction F. Further, the one-side adjustment bending unit 12, the other-side adjustment bending unit 13, the other-side bending unit 14, and the step shaping unit 15 are arranged in order toward the transfer direction downstream side Fb from the wave conductor forming unit 11. Then the first bending unit 5, the second bending unit 6, and the winding unit 7 are arranged on the transfer direction downstream side Fb with respect to the step shaping unit 15.

In this embodiment, the first bending unit 5 bends the wave conductor 3 so as to curve the wave conductor 3 downward. Therefore, as shown in FIG. 6 to FIG. 10, on the transfer direction downstream side Fb with respect to the bending position of the first bending unit 5, the transfer direction F of the wave conductor 3 gradually curves downward. The second bending unit 6 is arranged on the transfer direction downstream side Fb with respect to the bending position of the first bending unit 5 along the transfer direction F of the wave conductor 3 thus curving downward. Specifically, the second bending unit 6 is arranged at a position separated by one or more wave cycles PT (here 1.5 wave cycle) of the wave conductor 3 on the transfer direction downstream side Fb, with respect to the bending position of the first bending unit 5. The second bending unit 6 then bends the wave conductor 3 in the same direction as that by the first bending unit 5, so as to form the wave conductor 3 in a substantially cylindrical shape. Accordingly, the wave conductor 3 is bent so as to roll inward in the coil radial direction CR, and a portion of the wave conductor 3 on the transfer direction downstream side Fb with respect to the bending position of the second bending unit 6 is formed in a substantially cylindrical shape. The bobbin 71 constituting the winding unit 7 is arranged lower than the bending position of the first bending unit 5, and is structured to be capable of appropriately winding the wave conductor 3 which is bent by the first bending unit 5 and the second bending unit 6 in a substantially cylindrical shape. Therefore, on the transfer direction downstream side Fb with respect to the bending position of the second bending unit 6, the transfer direction F of the wave conductor 3 curves along a direction of winding the wave conductor 3 on the bobbin 71 (the rotational direction of the bobbin 71).

The transfer unit 4 is a unit for performing the transfer process Pf to transfer the wave conductor 3. For this purpose, the transfer unit 4 includes a conveyor 41 and a transfer drive unit 42 for driving this conveyor 41. The conveyor 41 accepts a wave conductor 3 to be placed on its transfer surface, and transfers this wave conductor 3 toward the transfer direction downstream side Fb. Here the conveyor 41 transfers the wave conductor 3 from the wave conductor forming unit 11 to the first bending unit 5. The transfer drive unit 42 drives the conveyor 41. In this embodiment, the transfer unit 4 performs intermittent transfer with one wave cycle PT of the wave conductor 3 being one pitch. Therefore, the transfer drive unit 42 repeats driving and stopping the conveyor 41 by the transfer amount corresponding to one wave cycle PT of the wave conductor 3 at predetermined time intervals. Structures of these units constituting this coil manufacturing apparatus 1 and details of respective manufacturing processes performed by these units will be described below.

3. The Wave Conductor Forming Process and Wave Conductor Forming Unit

Figure 14:
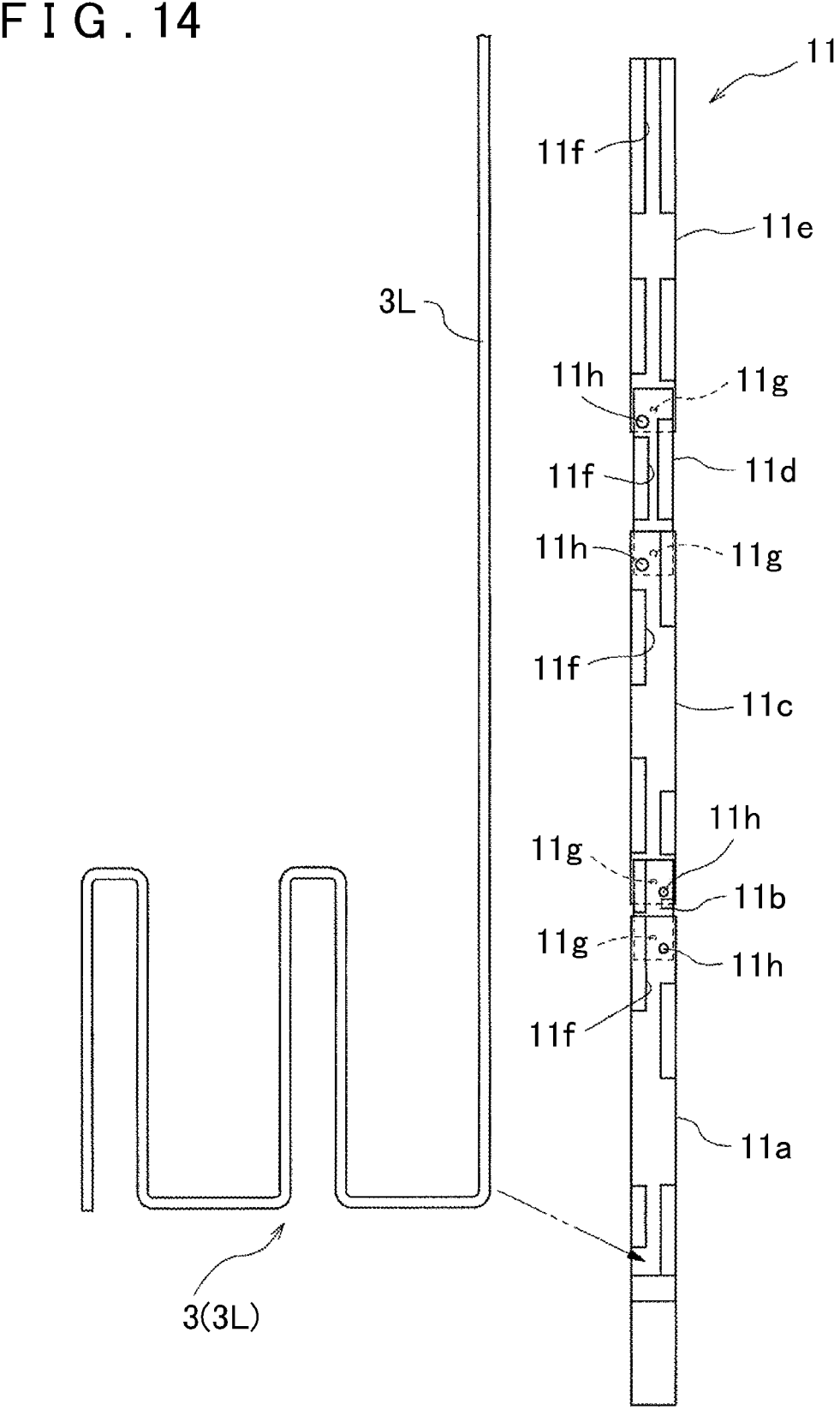
FIG. 14 is an explanatory view of a wave conductor forming process and a wave conductor forming unit according to the embodiment of the present invention.
Figure 15:
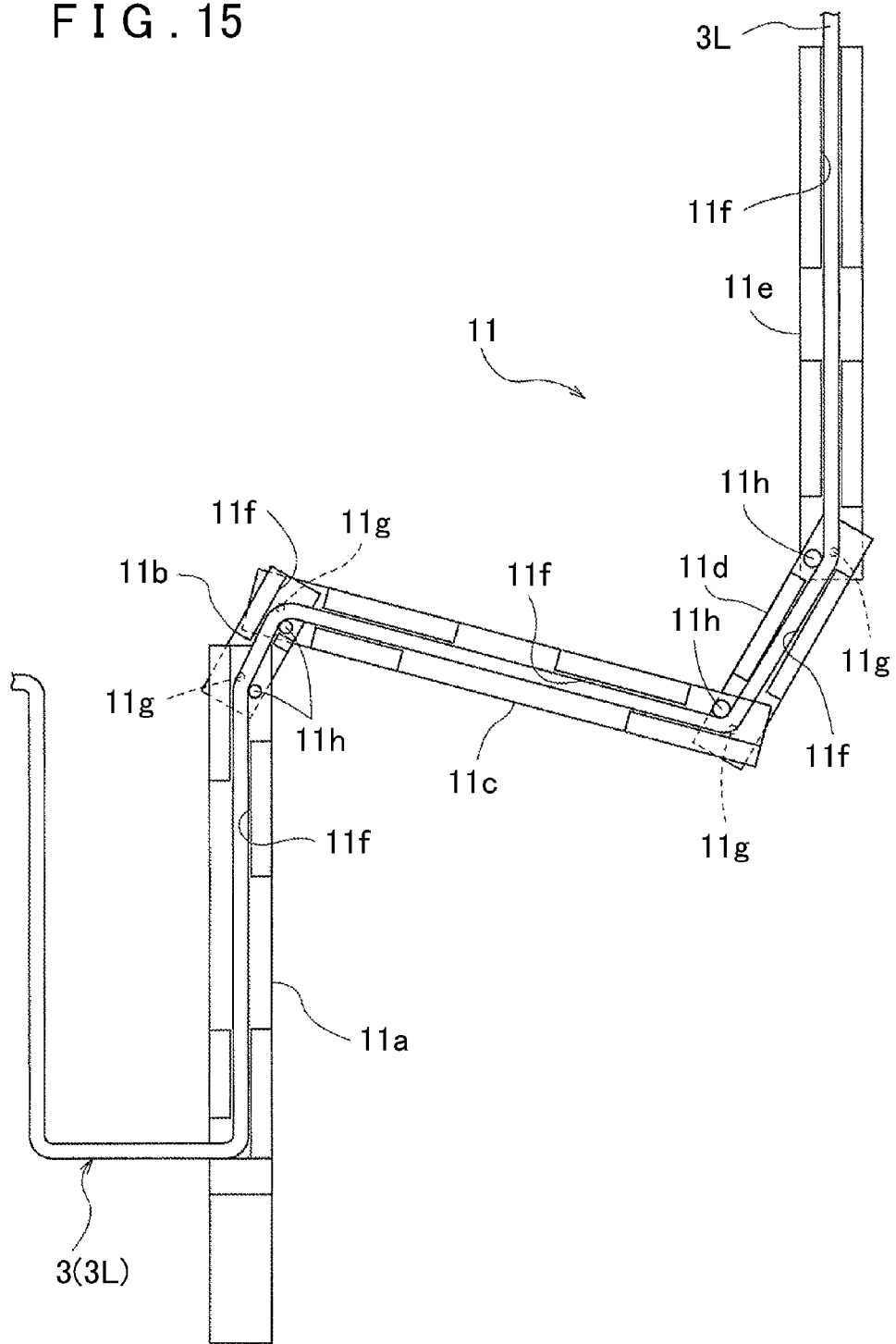
FIG. 15 is an explanatory view of the wave conductor forming process and the wave conductor forming unit according to the embodiment of the present invention.

First, the wave conductor forming process P1 and the wave conductor forming unit 11 will be described. The wave conductor forming unit 11 is a unit for performing the wave conductor forming process P1, and bends and shapes the substantially straight linear conductor 3L into a substantially rectangular waveform. As shown in FIG. 14 to FIG. 16, the wave conductor forming unit 11 is structured having five retainers, first retainer 11a to fifth retainer 11e, for retaining portions of the linear conductor 3L. These five retainers 11a to 11e each include a linear groove 11f in which the straight linear conductor 3L is fitted and retained, and are coupled in series from the first retainer 11a to the fifth retainer 11e in this order. Two adjacent retainers are coupled relatively pivotally via a pivot 11g.

These five retainers 11a to 11e are structured such that the grooves 11f of all the retainers can be aligned in a straight line, as shown in FIG. 14. All centers of pivots 11g each coupling two retainers are arranged along the grooves 11f, which are arranged in a straight line. As shown in FIG. 15 and FIG. 16, the five retainers 11a to 11e pivot relatively in a predetermined direction about the respective pivots 11g, so as to bend and shape the linear conductor 3L retained in the grooves 11f between two retainers. At this point, the two retainers are structured to be capable of bending at substantially right angles in a predetermined direction. Here, in plan views shown in FIG. 14 to FIG. 16, bending occurs clockwise between the first retainer 11a and the second retainer 11b and between the second retainer 11b and the third retainer 11c, and bending occurs counterclockwise between the third retainer 11c and the fourth retainer 11d and between the fourth retainer 11d and the fifth retainer 11e. Further, between these two retainers, a columnar bend die 11h (bend pin) is provided inside in the bending direction with respect to the pivot 11g. Therefore, as shown in FIG. 15 and FIG. 16, by bending two adjacent retainers, the linear conductor 3L retained in the respective grooves 11f of the retainers 11a to 11e is bent along outer peripheral faces of the bend dies 11h in the retainers. Incidentally, as shown in FIG. 4 and so on, to form the recessed portions 35a in connecting portions with side portions 31 on the second winding other-side connecting portions 35S, a wave conductor forming unit 11 for the second winding section 3s is used that is different from the shown unit in arrangement of the bend dies 11h, which are arranged on the peripheries of the pivots 11g, and so on.

In the wave conductor forming process P1, the wave conductor forming unit 11 as described above is used to bend the straight linear conductor 3L at substantially right angles at four positions in the linear material length direction LL, so as to form a portion of one wave cycle PT of the wave conductor 3 in a substantially S shape. At this point, the linear conductor 3L is bent along the outer peripheral faces of the columnar bend dies 11h, and thus each bent portion of the wave conductor 3 is shaped into a substantially arc shape. Note that the shape of the bend die 11h is not limited to a columnar shape, and any die in a shape having an arc face at least on a portion contacting the linear conductor 3L can be used preferably. Therefore, for example, a member in which only a portion contacting the linear conductor 3L is formed as an arc face and other portions have an outer face formed of a combination of one or more flat faces may preferably be used as the bend die 11h.

4. The Adjustment Bending Processes and Adjustment Bending Units, and the Other-Side Bending Process and Other-Side Bending Unit Next, the one-side adjustment bending process P2a, the other-side adjustment bending process P2b, and the other-side bending process P3, as well as the one-side adjustment bending unit 12, the other-side adjustment bending unit 13, and the other-side bending unit 14 for performing these processes will be described.

The one-side adjustment bending unit 12 is a unit for performing the one-side adjustment bending process P2a, and bends the side portions 31 in the vicinity of the one-side connecting portion 33 so that the position of the one-side connecting portion 33 in the coil radial direction CR is located appropriately. In this embodiment, as shown by the shape of the wave conductor 3 at the bending position of the one-side adjustment bending process P2a in FIG. 3, the one-side adjustment bending unit 12 bends the side portions 31 in the vicinity of the one-side connecting portion 33 twice in a crank shape to form a step portion, so that the one-side connecting portion 33 is offset vertically upward from the side portions 31 (outward in the coil radial direction CR).

The other-side adjustment bending unit 13 is a unit for performing the other-side adjustment bending process P2b, and bends the side portions 31 in the vicinity of the other-side connecting portion 35 so that the position of the other-side connecting portion 35 in the coil radial direction CR is located appropriately. In this embodiment, as shown by the shape of the wave conductor 3 at the bending position of the other-side adjustment bending process P2b in FIG. 3, the other-side adjustment bending unit 13 bends the side portions 31 in the vicinity of the other-side connecting portion 35 twice in a crank shape to form a step portion so that the other-side connecting portion 35 is offset vertically upward from the side portions 31 (outward in the coil radial direction CR).

The other-side bending unit 14 is a unit for performing the other-side bending process P3, and bends the other-side end face forming region 37 including the other-side connecting portion 35 inward in the coil radial direction CR. In this embodiment, as shown by the shape of the wave conductor 3 at the bending position of the other-side bending process P3 in FIG. 4, the other-side bending unit bends the other-side end face forming region 37 at a predetermined bending angle (here at a substantially right angle) with respect to the side portions 31 on the one wave width direction side Wa with respect to the other-side end face forming region 37.

The one-side adjustment bending unit 12, the other-side adjustment bending unit 13, and the other-side bending unit 14 all bend side portions 31 in the coil radial direction CR. Since these units are merely different in bending direction and bending angle, the bending units 12 to 14 can be formed using a similar unit. Accordingly, as a specific structural example of such bending units 12 to 14, an example of the other-side adjustment bending unit 13 shown in FIG. 17 and FIG. 18 is used for explanation, and descriptions of the one-side adjustment bending unit 12 and the other-side bending unit 14 are omitted.

Figure 17:
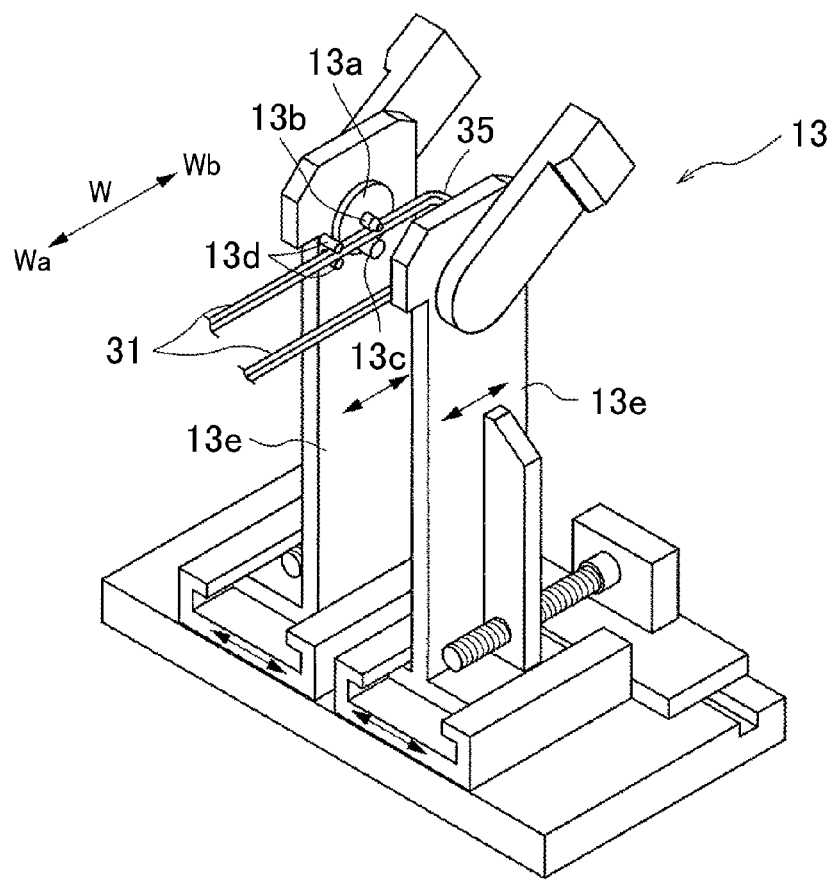
FIG. 17 is an explanatory view of an other-side adjustment bending process and an other-side adjustment bending unit according to the embodiment of the present invention.
Figure 18:
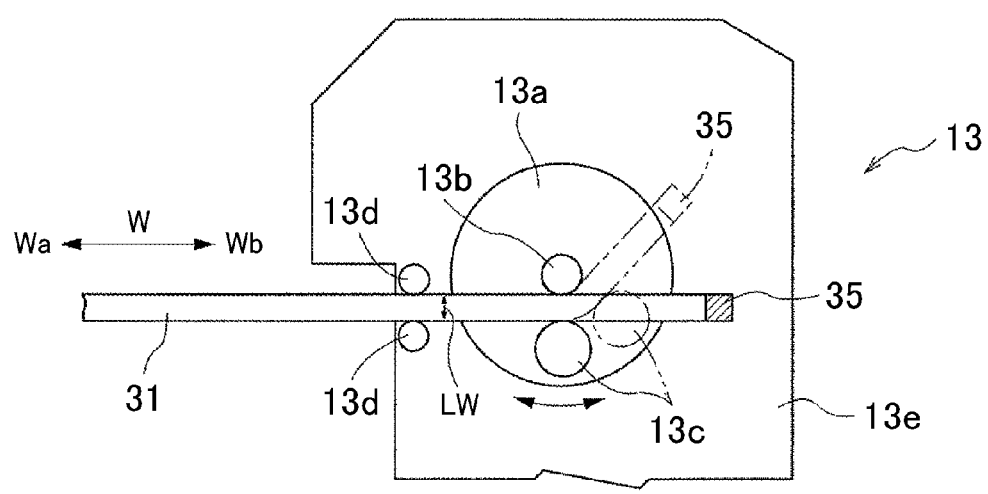
FIG. 18 is an explanatory view of the other-side adjustment bending process and the other-side adjustment bending unit according to the embodiment of the present invention.

As shown in FIG. 17 and FIG. 18, the other-side adjustment bending unit 13 includes a bend tool 13a having an inner peripheral die 13b (inner peripheral pin) and an outer peripheral die 13c (outer peripheral pin), which are both columnar and arranged to face each other, the outer peripheral die 13c being swingable about the center axis of the inner peripheral die 13b. In this embodiment, the outer peripheral die 13c swings toward an end side in the wave width direction W (here the other wave width direction side Wb). The other-side adjustment bending unit 13 also includes support members 13d arranged on a center side in the wave width direction W (here the one wave width direction side Wa) with respect to the outer peripheral die 13c and supporting a side portion 31 to inhibit movement of the side portion 31 in a linear material width direction LW when being bent. Here, the support members 13d are formed by two columnar members (support pins) arranged to face each other across the side portion 31.

As shown in FIG. 18, in a state that the side portion 31 is inserted to spaces between the inner peripheral die 13b and the outer peripheral die 13c and between the two columnar members forming the support members 13d, the bend tool 13a is swung so as to swing the outer peripheral die 13c about the center axis of the inner peripheral die 13b, and the side portion 31 is bent at one position along the outer peripheral face of the inner peripheral die 13b. Thus, a portion of the side portion 31 in the linear material length direction LL is bent and shaped into a substantially arc shape. The support members 13d sandwich the side portion 31 on the center side in the wave width direction W (the one wave width direction side Wa) that is opposite to a swing direction of the outer peripheral die 13c with respect to the outer peripheral die 13c, thereby supporting the side portion 31 to inhibit the movement of the side portion 31 toward the outer peripheral die 13c side in the linear material width direction LW. Thus, the support members 13d serve a function to provide support such that a portion of the side portion 31 on the center side in the wave width direction W (the one wave width direction side Wa) with respect to the bending position is prevented from rotating due to a rotation moment that acts on the side portion 31 during bending. Note that shapes of the inner peripheral die 13b and the outer peripheral die 13c are not limited to a columnar shape, and any die in a shape having an arc face at least on a portion contacting the side portion 31 may be used preferably. Therefore, for example, a member in which only a portion contacting the side portion 31 is formed as an arc face and other portions have an outer face formed of a combination of one or more flat faces may preferably be used as the inner peripheral die 13b or outer peripheral die 13c. Further, the support members 13d are not limited to a columnar shape, and members with various shapes such as a rectangular parallelepiped shape may also be used.

Further, the bend tool 13a and the support members 13d are structured to be movable in a direction to approach or depart from the side portion 31 as a process target, here in a direction parallel to the center axes of the inner peripheral die 13b and the outer peripheral die 13c. In a state that the bend tool 13a and the support members 13d are moved to the side portion 31 side, it is structured to insert the side portion 31 to the spaces between the inner peripheral die 13b and the outer peripheral die 13c and between the two columnar members forming the support members 13d. In this embodiment, the bend tool 13a and the support members 13d are supported at a height of a transfer surface of the wave conductor 3 by a common base member 13e. Here, although the support members 13d are fixed to the base member 13e, the bend tool 13a is supported rotatably by the base member 13e. In this embodiment, the bend tool 13a and the support members 13d are structured to be movable together with the base member 13e in a direction to approach or depart from the side portion 31 as a process target. The base member 13e is structured to be movable also in the wave width direction W. Thus, the other-side adjustment bending unit 13 is cable of bending an appropriate position of the side portion 31 by moving the bend tool 13a and the support members 13d in the linear material length direction LL of the side portion 31, and facilitates transfer of the wave conductor 3 when intermittently transferring the wave conductor 3 by moving in a direction to depart from the wave conductor 3 in the wave width direction W. Further, in this embodiment, to simultaneously bend two side portions 31 in parallel with each other, which are connected to both ends of the other-side connecting portion 35, two such other-side adjustment bending units 13 are arranged to face each other. These two other-side adjustment bending units 13 are arranged in a mirror symmetry and operate in a mirror symmetry.

In the other-side adjustment bending process P2b, such an other-side adjustment bending unit 13 is used to bend the side portions 31 in the vicinity of the other-side connecting portion 35 twice in a crank shape to form a step portion, so that the other-side connecting portion 35 is offset vertically upward from the side portions 31, as shown in FIG. 3. Similarly, in the one-side adjustment bending process P2a, the one-side adjustment bending unit 12 having a similar structure to the other-side adjustment bending unit 13 is used to bend the side portions 31 in the vicinity of the one-side connecting portion 33 twice in a crank shape to form a step portion so that the one-side connecting portion 33 is offset vertically upward from the side portions 31, as shown in FIG. 3. In the other-side bending process P3, the other-side bending unit 14 having a similar structure to the other-side adjustment bending unit 13 is used to bend the other-side end face forming region 37 including the other-side connecting portion 35 once to form a predetermined bending angle (here a substantially right angle) with the side portions 31 on the one wave width direction side Wa with respect to the other-side end face forming region 37, as shown in FIG. 4.

5. The Step Shaping Process and Step Shaping Unit

Figure 19:
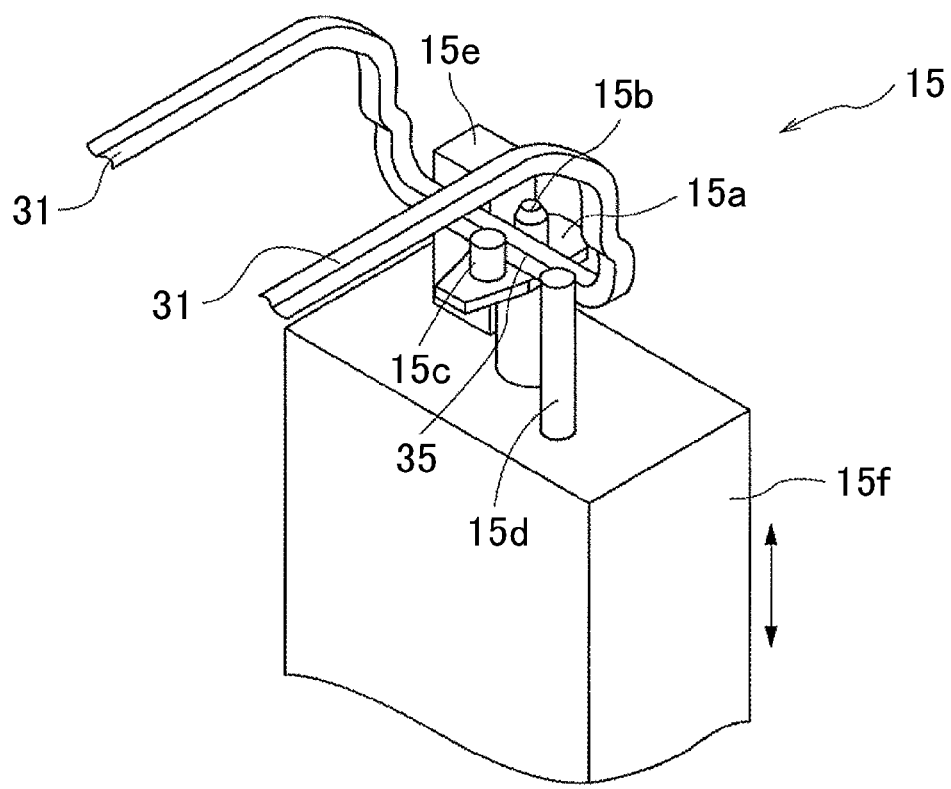
FIG. 19 is an explanatory view of a step shaping process and a step shaping unit according to the embodiment of the present invention.
Figure 20:
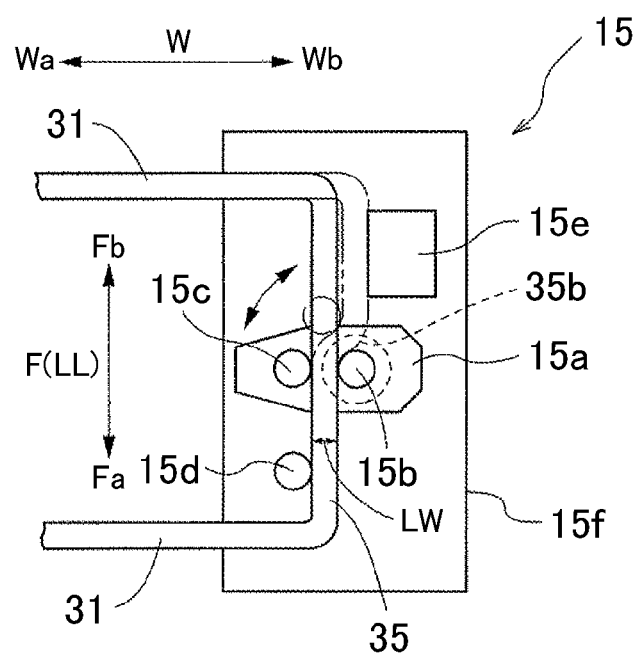
FIG. 20 is an explanatory view of the step shaping process and the step shaping unit according to the embodiment of the present invention.

Next, the step shaping process P4 and the step shaping unit 15 will be described. The step shaping unit 15 is a unit for performing the step shaping process P4, and performs bending to form a step portion 35b at one position of the other-side connecting portion 35 in the linear material length direction LL (transfer direction F). As shown in FIG. 19 and FIG. 20, the step shaping unit 15 includes a bend tool 15a having an inner peripheral die 15b (inner peripheral pin) and an outer peripheral die 15c (outer peripheral pin), which are both columnar and arranged to face each other, the outer peripheral die 15c being swingable about the center axis of the inner peripheral die 15b. In this embodiment, the outer peripheral die 15c swings toward one side in the linear material length direction LL (here the transfer direction downstream side Fb) of the other-side connecting portion 35. The step shaping unit 15 also includes a support member 15d that is arranged on a side opposite to a swing direction of the outer peripheral die 15c (here the transfer direction upstream side Fa) with respect to the outer peripheral die 15c and that supports the other-side connecting portion 35 to inhibit movement of the other-side connecting portion 35 in the linear material width direction LW when being bent. Here, the support member 15d is formed of one columnar member (support pin) arranged on the outer peripheral die 15c side in the linear material width direction LW of the other-side connecting portion 35 with respect to the other-side connecting portion 35. Furthermore, the step shaping unit 15 also includes an abutting die 15e arranged on the outer peripheral die 15c side in the swing direction (here the transfer direction downstream side Fb) with respect to the outer peripheral die 15c to provide support by abutment such that a portion of the other-side connecting portion 35 on the swing direction side of the outer peripheral die 15c when being bent becomes parallel to the linear material length direction LL of the other-side connecting portion 35 before being bent. Here, the abutting die 15e is formed of one rectangular column member arranged on the inner peripheral die 15b side in the linear material width direction LW of the other-side connecting portion 35 with respect to the other-side connecting portion 35.

Then as shown in FIG. 20, in a state that the other-side connecting portion 35 is inserted between the inner peripheral die 15b and the outer peripheral die 15c, swinging the bend tool 15a causes the outer peripheral die 15c to swing about the center axis of the inner peripheral die 15b, thereby bending the other-side connecting portion 35 at one position along the outer peripheral face of the inner peripheral die 15b. At this point, the portion of the other-side connecting portion 35 on the swing direction side of the outer peripheral die 15c attempts to pivot toward the inner peripheral die 15b side. However, the portion abuts on the abutting die 15e, thereby preventing the portion from pivoting. Thus, the portion of the other-side connecting portion 35 on the swing direction side of the outer peripheral die 15c is retained in parallel with the linear material length direction LL of the other-side connecting portion 35 before being bent, thereby forming a step portion 35b at one position of the other-side connecting portion 35 in the linear material length direction LL (transfer direction F). Specifically, the step portion 35b is formed such that a portion of the other-side connecting portion 35 on the transfer direction downstream side Fb with respect to the step portion 35b is situated on the more other wave width direction side Wb (the inner peripheral die 15b side) as compared to a portion thereof on the transfer direction upstream side Fa. The support member 15d supports the other-side connecting portion 35 to inhibit movement of the other-side connecting portion 35 toward the outer peripheral die 15c side in the linear material width direction LW on the side opposite to the swing direction of the outer peripheral die 15c (here the transfer direction upstream side Fa) with respect to the outer peripheral die 15c. Thus, the support member 15d serves a function to provide support such that a portion of the other-side connecting portion 35 on the side opposite to the swing direction of the outer peripheral die 15c with respect to the bending position is prevented from rotating due to a rotation moment that acts on the other-side connecting portion 35 during bending. Note that shapes of the inner peripheral die 15b and the outer peripheral die 15c are not limited to a columnar shape, and any die in a shape having an arc face at least on a portion contacting the other-side connecting portion 35 may be used preferably. Therefore, for example, a member in which only a portion contacting the other-side connecting portion 35 is formed as an arc face and other portions have an outer face formed of a combination of one or more flat faces may preferably be the inner peripheral die 15b or outer peripheral die 15c. Further, shapes of the support members 15d and the abutting die 15e are not limited to the above examples, and members with various shapes may also be used.

Further, the bend tool 15a, the support member 15d, and the abutting die 15e are structured to be movable in a direction to approach or depart from the other-side connecting portion 35 as a process target, here in a direction parallel to the center axes of the inner peripheral die 15b and the outer peripheral die 15c. In a state that the bend tool 15a, the support member 15d, and the abutting die 15e are moved to the other-side connecting portion 35 side, it is structured to insert the other-side connecting portion 35 to a space between the inner peripheral die 15b and the outer peripheral die 15c. In this embodiment, the bend tool 15a, the support member 15d, and the abutting die 15e are supported by a common base member 15f. Here, although the support member 15d and the abutting die 15e are fixed to the base member 15f, the bend tool 15a is supported rotatably by the base member 15f. In this embodiment, the bend tool 15a, the support member 15d, and the abutting die 15e are structured to be movable together with the base member 15f in a direction to approach or depart from the other-side connecting portion 35 as a process target.

6. The First Bending Process and First Bending Unit

Next, the first bending process P5 and the first bending unit 5 will be described. The first bending unit 5 is a unit for performing the first bending process P5, and bends the one-side connecting portion 33 to form a shape projecting outward in the coil radial direction CR. In this embodiment, as shown by the shape of the wave conductor 3 at the bending position of the first bending process P5 in FIG. 5, the first bending unit 5 curves the substantially entire one-side connecting portion 33 into a substantially arc shape.

As shown in FIG. 21 to FIG. 24, the first bending unit 5 includes a fixed die 51 having a fixed shaping face 55 in a substantially arc shape, and a movable die 52 having a movable shaping face 56 in a substantially arc shape opposing the fixed shaping face 55 and structured to be swingable about a predetermined swing fulcrum 53. The transfer unit 4 (see FIG. 13) feeds the one-side connecting portion 33 of the wave conductor 3 to a space between the fixed shaping face 55 and the movable shaping face 56. Here, the transfer unit 4 is structured to transfer the one-side connecting portion 33 of the wave conductor 3 along a transfer line 57 set to substantially match a tangent of a transfer direction upstream side end portion 55a of the fixed shaping face 55. Then the swing fulcrum 53 of the movable die 52 is arranged on the movable die 52 side with respect to the transfer line 57 and on the transfer direction upstream side Fa with respect to the transfer direction upstream side end portion 55a of the fixed shaping face 55. The fixed die 51 and the movable die 52 press the one-side connecting portion 33 between the fixed shaping face 55 and the movable shaping face 56 into a substantially arc shape curving along the coil circumferential direction CC (see FIG. 11). In the first bending process P5 and the first bending unit 5, the one-side connecting portion 33 of the wave conductor 3 is a target connection part as a target of bending. Further, the wave conductor 3 (linear conductor 3L) including the one-side connecting portion 33 as this target connection part is a linear material. When an apparatus for shaping this linear material into a substantially arc shape is a linear material shaping apparatus 2, the first bending unit 5 and the transfer unit 4 constitute the linear material shaping apparatus 2.

The fixed die 51 is fixed on the base member 59, and has the fixed shaping face 55 in a substantially arc shape. This fixed die 51 is arranged where the tangent of the transfer direction upstream side end portion 55a of the fixed shaping face 55 substantially matches the transfer line 57 on which the one-side connecting portion 33 of the wave conductor 3 is transferred. The fixed shaping face 55 is a substantially arc shape projecting toward the movable die 52 side (movable shaping face 56). The radius of curvature of the fixed shaping face 55 is set approximately equal to a radius of an outer peripheral face formed by the one-side connecting portion 33 on the substantially cylindrical wave wound coil 3C to be formed finally. However, in this embodiment, the fixed shaping face 55 has a step portion 55b in an extending direction of this face. Therefore, here the radius of curvature of the arc shaped face excluding the step portion 55b of the fixed shaping face 55 is set as described above. In addition, the step portion 55b is set such that a portion on the transfer direction downstream side Fb is located more outside in the radial direction compared to a portion on the transfer direction upstream side Fa therefrom.

The first bending unit 5 includes a retaining unit 54 retaining the wave conductor 3 in the vicinity of the transfer direction upstream side end portion 55a of the fixed shaping face 55. In this embodiment, the retaining unit 54 has a recessed groove 54a formed in a face opposing the transfer line 57 side, and is formed by a columnar retaining member fixed integrally to the fixed die 51. Inserting a side portion 31 of the wave conductor 3 in the recessed groove 54a causes this side portion 31 of the wave conductor 3 to be retained so as not to move in the transfer direction F. Therefore, when the one-side connecting portion 33 is processed by the first bending unit 5, the wave conductor 3 on the transfer direction upstream side Fa with respect to the retaining unit 54 is prevented from being pulled to the first bending unit 5 side (the transfer direction downstream side Fb), thereby effectively suppressing the first bending process P5 from affecting each process on the transfer direction upstream side Fa.

Figure 24:
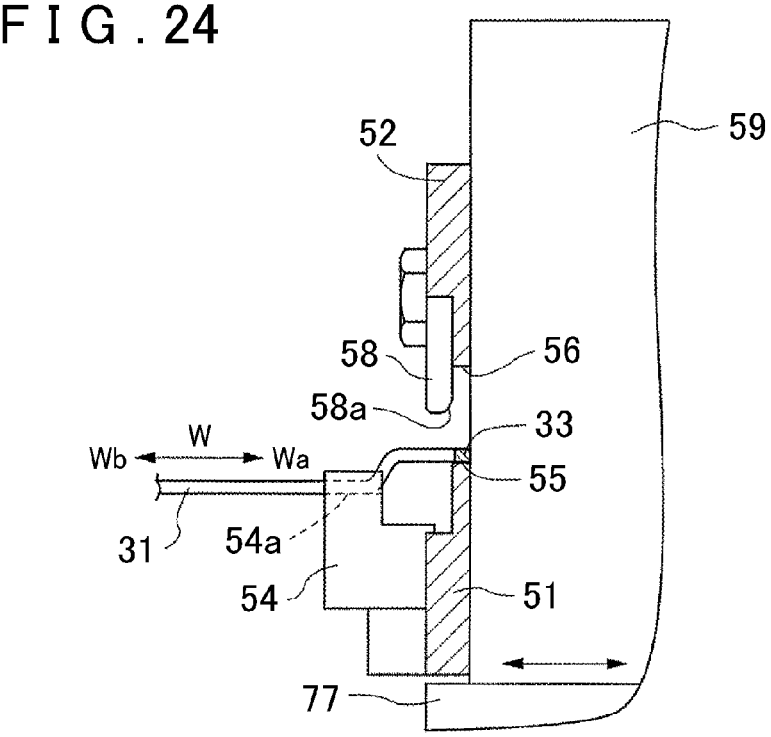
FIG. 24 is a vertical cross-sectional view showing the structure of the first bending unit according to the embodiment of the present invention.
Figure 25A:
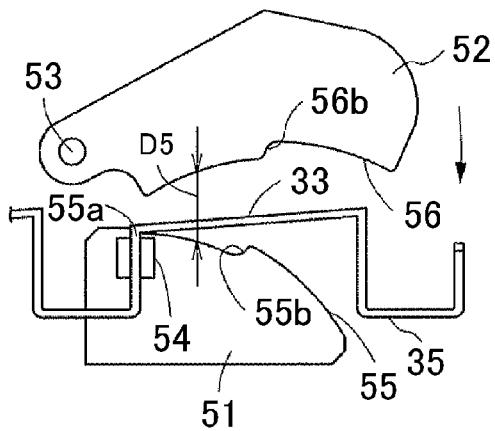
FIGS. 25A to 25E show explanatory views illustrating operation of a first bending process in stages according to the embodiment of the present invention.
Figure 25B:
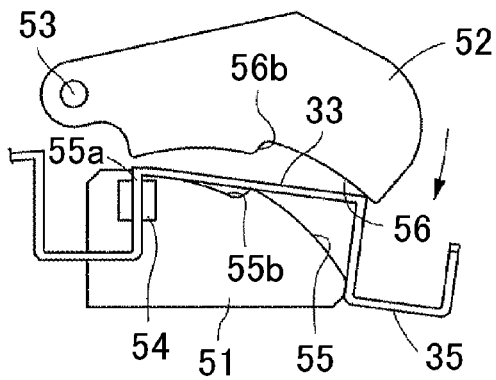
Figure 25C:
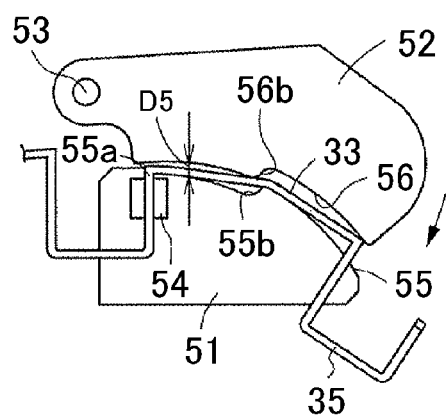
Figure 25D:
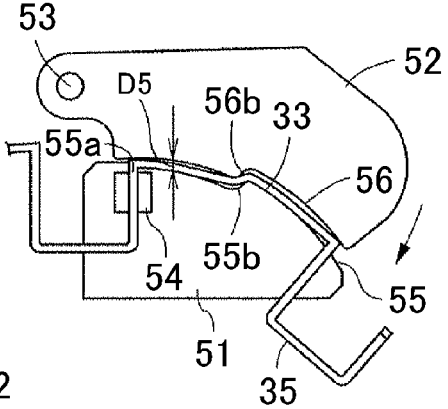
Figure 25E:
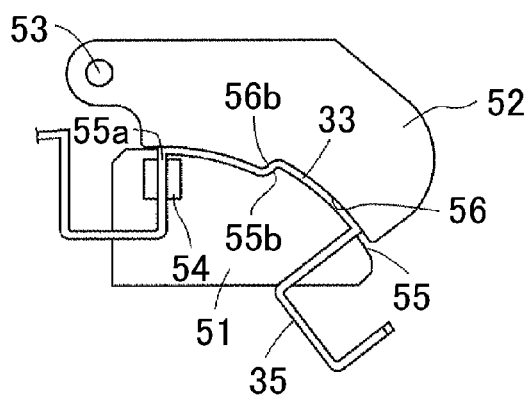

The movable die 52 is structured to be swingable about the swing fulcrum 53 supported by the base member 59, and has the movable shaping face 56 in a substantially arc shape opposing the fixed shaping face 55. The movable shaping face 56 has a shape corresponding to the shape of the fixed shaping face 55, specifically, a shape opposing the fixed shaping face 55 with a constant gap between the fixed shaping face 55 and the movable shaping face 56 in a state that the movable die 52 is swung to the fixed die 51 side, the gap being approximately the same as the linear material width of the one-side connecting portion 33. Therefore, the movable shaping face 56 is in a substantially arc shape that is recessed toward the fixed die 51 (fixed shaping face 55) side. Similarly to the above-described fixed shaping face 55, the radius of curvature of the movable shaping face 56 is set approximately equal to the radius of the outer peripheral face formed by the one-side connecting portion 33 on the substantially cylindrical wave wound coil 3C to be formed finally. However, in this embodiment, the movable shaping face 56 has the step portion 56b in an extending direction of this face. Therefore, here the radius of curvature of the arc shaped face excluding the step portion 56b of the movable shaping face 56 is set as described above. In addition, the step portion 56b is set such that a portion on the transfer direction downstream side Fb is located more outside in the radial direction compared to a portion on the transfer direction upstream side Fa therefrom. In this embodiment, there is also provided guide parts 58 on a side face of the movable die 52 opposite to the side thereof in contact with the base member 59. The guide part 58 has an inclined guide face 58a inclined toward the side to depart from the movable die 52 toward the fixed die 51 side, as shown in FIG. 24. Thus, when the one-side connecting portion 33 protrude toward the other wave width direction side Wb from the fixed shaping face 55, the guide part 58 serves a function such that the inclined guide face 58a contact the one-side connecting portion 33 to push the one-side connecting portion 33 toward the fixed shaping face 55 side when the movable die 52 swings toward the fixed die 51 side.

Figure 23:
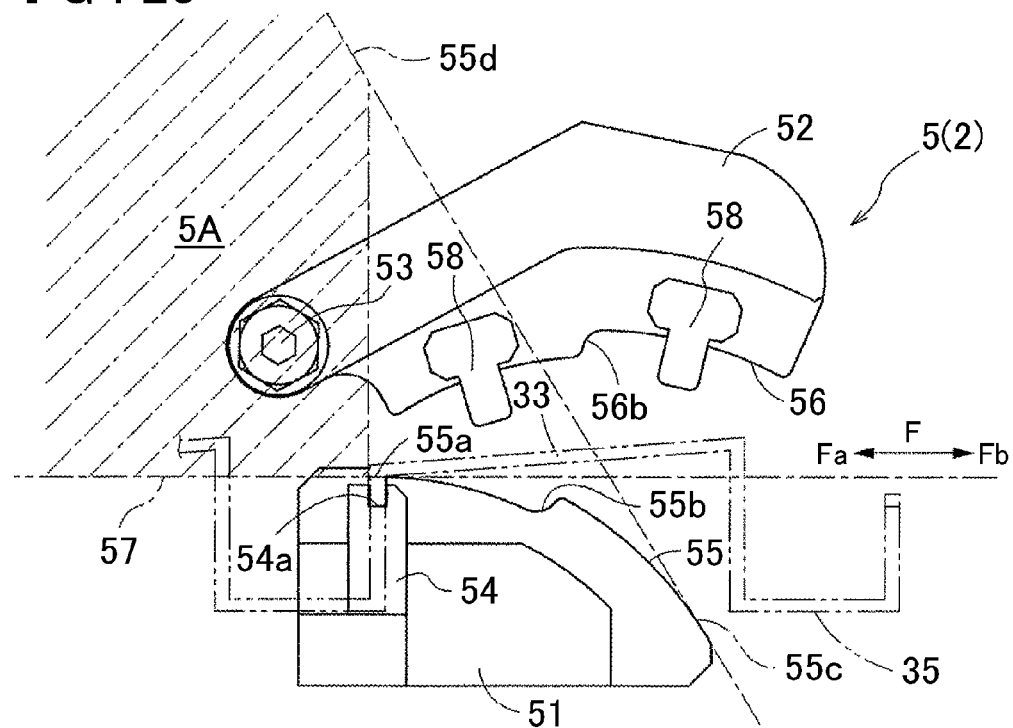
FIG. 23 is a front view showing the structure of a first bending unit according to the embodiment of the present invention.

The swing fulcrum 53 of the movable die 52 is arranged within an area on the movable die 52 side with respect to the transfer line 57 and on the transfer direction upstream side Fa with respect to the transfer direction upstream side end portion 55a of the fixed shaping face 55. In this embodiment, moreover, the swing fulcrum 53 is arranged on the fixed die 51 side with respect to a fixed shaping face downstream side tangent 55d that is a tangent on a transfer direction downstream side end portion 55c of the fixed shaping face 55. That is, the swing fulcrum 53 here is arranged in an area between the transfer line 57 and the fixed shaping face downstream side tangent 55d on the transfer direction upstream side Fa with respect to the transfer direction upstream side end portion 55a of the fixed shaping face 55. FIG. 23 shows this area as a fulcrum arrangement possible area 5A. The swing fulcrum 53 of the movable die 52 is arranged in any position within this fulcrum arrangement possible area 5A. Arranging the swing fulcrum 53 in such a fulcrum arrangement possible area 5A allows the movable die 52 and the movable shaping face 56 to swing in a positional relationship as shown by (a) to (e) in FIG. 25 with respect to the fixed die 51 and the fixed shaping face 55. As is clear from these drawings, when the swing fulcrum 53 is arranged within the fulcrum arrangement possible area 5A, a distance D5 between the movable shaping face 56 and the fixed shaping face 55 is set to be shortest in the transfer direction upstream side end portion 55a. Therefore, as represented by (c) and (d) in FIG. 25, the distance D5 between the movable shaping face 56 and the fixed shaping face 55 just before an end position of the fixed die 51 side in the swing direction of the movable die 52 is also set to be shortest in the transfer direction upstream side end portion 55a. This creates a state that, when the one-side connecting portion 33 is processed by the first bending unit 5, an end portion of the one-side connecting portion 33 on the transfer direction upstream side Fa is sandwiched between the fixed die 51 and the movable die 52 earlier than a portion on the more transfer direction downstream side Fb, and hence, is hard to move. Therefore, when the first bending process P5 is performed, the wave conductor 3 on the transfer direction upstream side Fa with respect to the first bending unit 5 is prevented from being pulled to the first bending unit 5 side (the transfer direction downstream side Fb), thereby effectively suppressing the first bending process P5 from affecting each process on the transfer direction upstream side Fa. Further, when the swing fulcrum 53 is arranged within such a fulcrum arrangement possible area 5A, movement of the movable shaping face 56 in a direction to slide on the surface of the one-side connecting portion 33 is suppressed to be very small, thereby allowing suppressing scratching or the like on an insulating film formed on the surface of the one-side connecting portion 33.

In the first bending process P5, as shown in (a) to (e) of FIG. 25, the movable die 52 swings to the fixed die 51 side so that the one-side connecting portion 33 of the wave conductor 3 fed to the space between the fixed shaping face 55 and the movable shaping face 56 is pressed between the fixed shaping face 55 and the movable shaping face 56, and is curve shaped into a substantially arc shape along the shape of the gap between the fixed shaping face 55 and the movable shaping face 56. At this point, the fixed shaping face 55 and the movable shaping face 56 each have the step portions 55b, 56b as described above. Therefore, a step portion 33a as shown in FIG. 5 is formed in the one-side connecting portion 33 conforming the shape of these step portions 55b, 56b.

Figure 22:
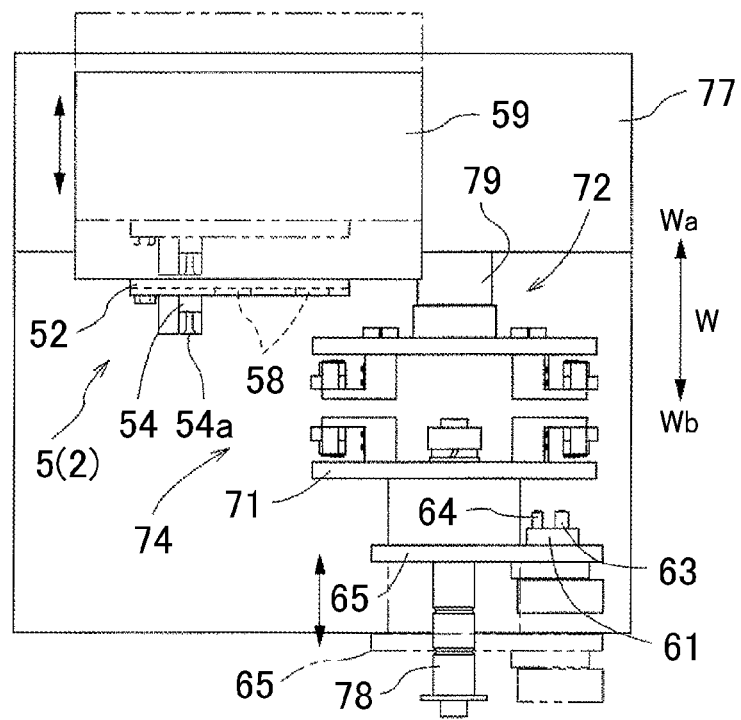
FIG. 22 is a plan view showing the positional relationship of the first bending unit, the second bending unit, and the winding unit according to the embodiment of the present invention.

The first bending unit 5 is movable in a direction to approach or depart from the one-side connecting portion 33 of the wave conductor 3, here the wave width direction W, and is structured to insert the one-side connecting portion 33 to the space between the fixed die 51 and the movable die 52 in a state that the first bending unit 5 is moved to the one-side connecting portion 33 side. In this embodiment, as shown in FIG. 22, the base member 59 supporting the parts of the first bending unit 5 is relatively movable in the wave width direction W with respect to a support frame 77 supporting the transfer unit 4 and the bobbin 71. Thus, the fixed die 51, the movable die 52, and the retaining unit 54 constituting the first bending unit 5 are integrally movable in the wave width direction W. The first bending unit 5 is structured to move in a direction to depart from the wave conductor 3 (the one wave width direction side Wa) in synchronization with intermittent transfer of the wave conductor 3 by the transfer unit 4 during this intermittent transfer, and move in a direction to approach the wave conductor 3 (the other wave width direction side Wb) when the wave conductor 3 is stopped after the intermittent transfer.

Further, in this embodiment, in the first bending process P5, the one-side connecting portion 33 is shaped into a different shape in each winding. Specifically, as described above, the one-side connecting portion 33 is shaped such that the position of the step portion 33a in the linear material length direction LL (transfer direction F) of the one-side connecting portion 33 is different between the first winding one-side connecting portions 33F constituting the first winding section 3f and the second winding one-side connecting portions 33S constituting the second winding section 3s. This is for plurally arranging the one-side connecting portions 33 of the wave conductor 3 in different windings in parallel appropriately in the coil radial direction CR, as shown in FIG. 10 and FIG. 11. Accordingly, although omitted from illustration, the first bending unit 5 is structured including a plurality of shaping dies for bending the one-side connecting portions 33 in different shapes, in a manner interchangeable in each winding. Specifically, there are provided a plurality of couples of fixed dies 51 and movable dies 52, which are structured to be interchangeable in each winding. For example, the base member 59 may be supported to be rotatable about an axis orthogonal to the transfer surface of the wave conductor 3, and that the first bending unit 5 including the fixed die 51 and the movable die 52 be provided on each of plural faces of this base member 59.

Figure 26A:
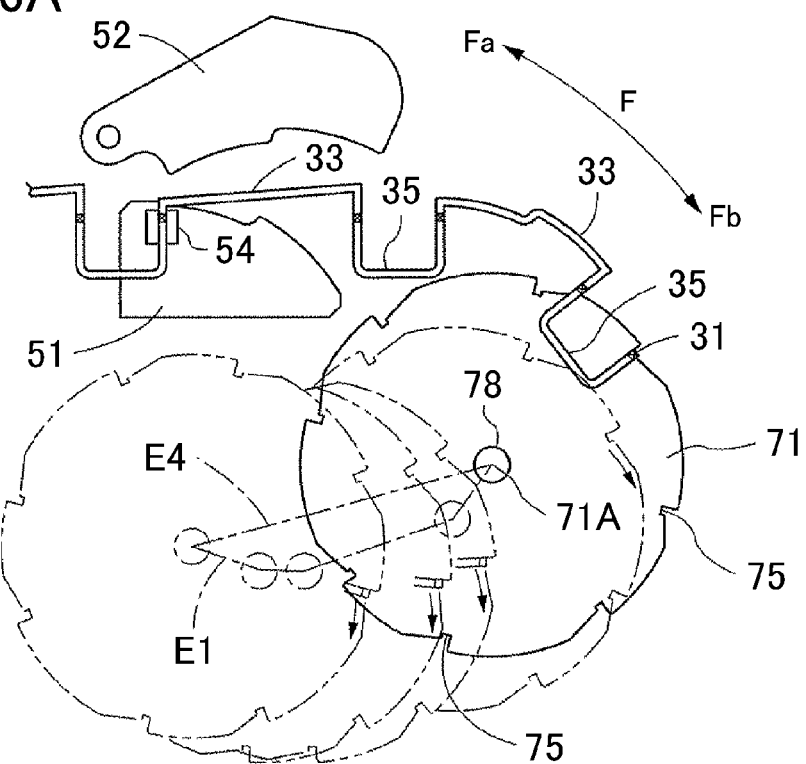
FIGS. 26A and 26B show views illustrating operation of a bobbin before and after bending in the first bending process according to the embodiment of the present invention.
Figure 26B:
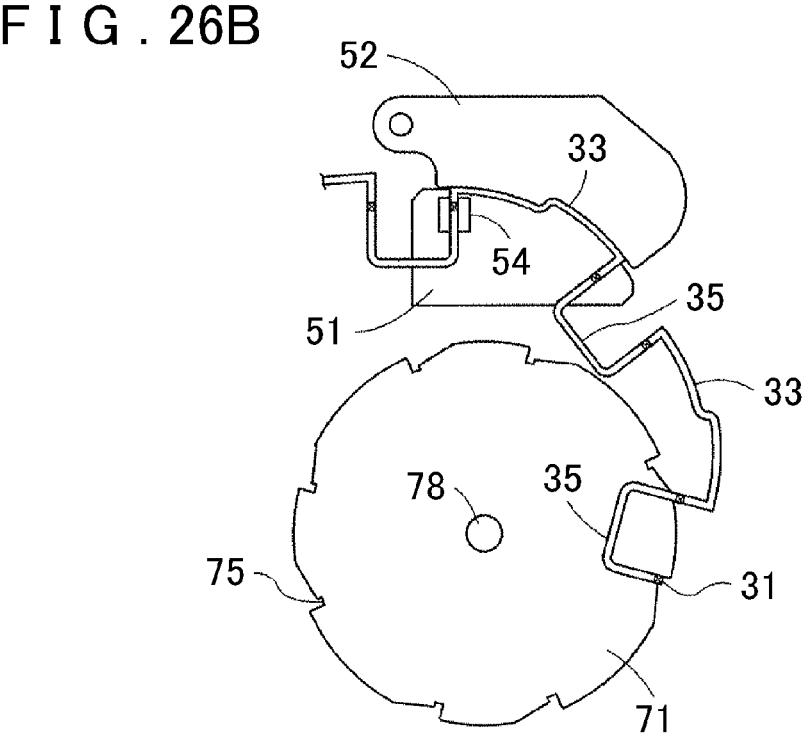

FIG. 26A shows a state prior to bending in the first bending process P5 and a movement trace of the bobbin 71 during bending, and FIG. 26B shows a state after bending in the first bending process P5. As shown in FIG. 26, in the first bending process P5, bending is performed such that a portion of the wave conductor 3 on the transfer direction downstream side Fb pivots about the bending position in the first bending process P5. Here, the actually bent position of the one-side connecting portion 33 that is processed in the first bending process P5 corresponds to the bending position in the first bending process P5. In this embodiment, as described above, as the one-side connecting portion 33 is pressed between the fixed shaping face 55 and the movable shaping face 56, parts of the one-side connecting portion 33 are curved gradually and finally formed in a substantially arc shape. At this time, the bending position of the first bending process P5 moves in the linear material length direction LL of the one-side connecting portion 33 depending on a state of abutment of the fixed shaping face 55 and the movable shaping face 56 on the one-side connecting portion 33. In the first bending process P5, the portion of the wave conductor 3 on the transfer direction downstream side Fb from the bending position pivots inward in the coil radial direction CR about the bending position of the first bending process P5 that moves in this manner.

The wave conductor 3 is wound and retained on the bobbin 71 on the transfer direction downstream side Fb from the bending position in the first bending process P5. Specifically, side portions 31 in part on the transfer direction downstream side Fb from the bending position in the first bending process P5 are inserted and retained in insertion grooves 75 provided in an outer peripheral face 71C of the bobbin 71. Accordingly, when performing the first bending process P5, a center axis 71A of the bobbin 71 is moved according to the movement trace of the portion of the wave conductor 3 wound on such a bobbin 71. FIG. 26A shows an ideal movement trace of the center axis 71A of such a bobbin 71 as a first ideal movement trace E1 by a dot and dash line. When the center axis 71A of the bobbin 71 is moved along this first ideal movement trace E1, the first bending process P5 can be performed in a state that the wave conductor 3 on the transfer direction downstream side Fb from the bending position of the first bending process P5 barely deforms elastically. However, in this embodiment, to simplify the bobbin movement unit 73, the center axis 71A of the bobbin 71 is moved along a straight movement trace E4 that is a linear movement trace. This straight movement trace E4 is a linear trace set to approximate the first ideal movement trace E1, and is set herein as a linear trace connecting a start point and an end point of the first ideal movement trace E1 in a substantially arc shape. The wave conductor 3 has a relatively high elasticity, and a displacement of the straight movement trace E4 from the first ideal movement trace E1 falls within the elastic deformation region of the wave conductor 3 on the transfer direction downstream side Fb from the bending position of the first bending process P5. Therefore, the wave conductor 3 would not be deformed plastically when the center axis 71A of the bobbin 71 is moved along such a straight movement trace E4.

7. The Second Bending Process and Second Bending Unit, and the Winding Process Next, the second bending process P6 and the second bending unit 6 will be described. The second bending unit 6 is a unit for performing the second bending process P6, and bends the other-side connecting portion 35 so as to project outward in the coil radial direction CR. In this embodiment, as shown by the shape of the wave conductor 3 at the bending position in the second bending process P6 in FIG. 6, the second bending unit 6 bends the other-side connecting portion 35 at one position so as to shape the other-side connecting portion 35 into a substantially V shape. For the second bending process P6 and the second bending unit 6, the other-side connecting portion 35 of the wave conductor 3 is a target connecting portion as a target of bending. Further, the second bending process P6 to bend and shape the other-side connecting portion 35 as this target connecting portion into a substantially V shape is a connecting portion bending process, and the second bending unit 6 is a connecting portion bending unit for this process.

Figure 21:
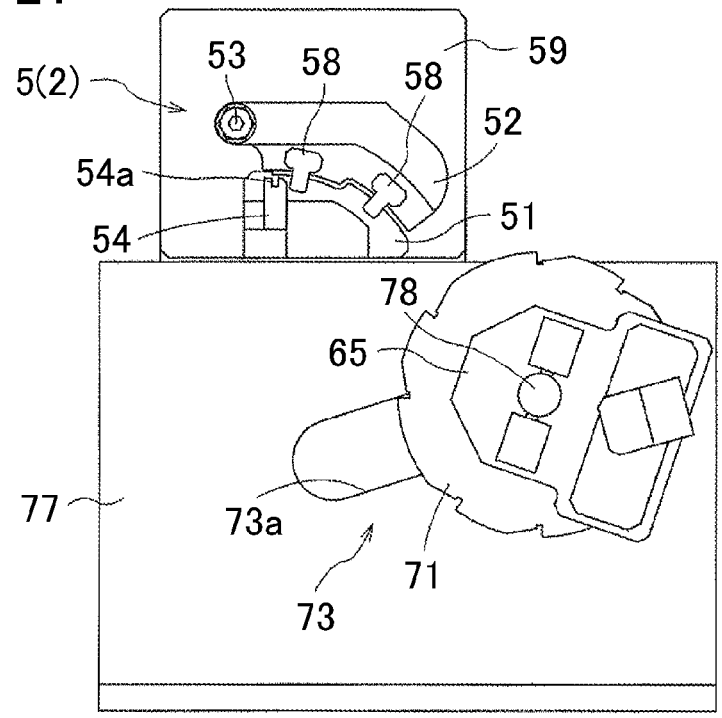
FIG. 21 is a front view showing a positional relationship of a first bending unit, a second bending unit, and a winding unit according to the embodiment of the present invention.
Figure 27:
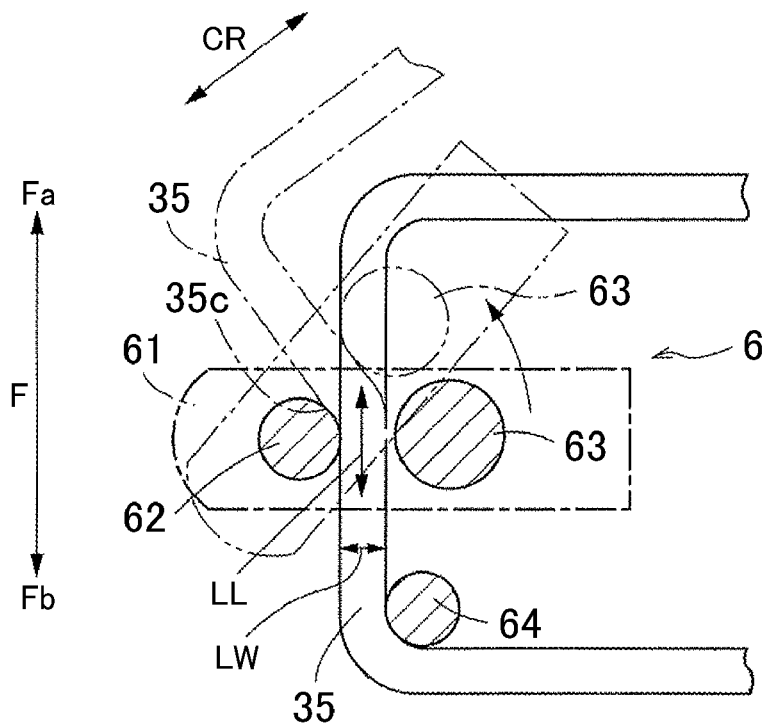
FIG. 27 is an explanatory view of a second bending process according to the embodiment of the present invention.

As shown in FIG. 21, FIG. 22, and FIG. 27, in this embodiment, the second bending unit 6 includes a bend tool 61 having an inner peripheral die 62 (inner peripheral pin) and an outer peripheral die 63 (outer peripheral pin), which are both columnar and arranged to face each other, the outer peripheral die 63 being swingable about the center axis of the inner peripheral die 62. In the second bending process P6, bend shaping is performed such that the other-side connecting portion 35 is bent at one position along the inner peripheral die 62 to shape a portion of the other-side connecting portion 35 in the linear material length direction LL into a substantially arc shape, thereby turning the entire other-side connecting portion 35 into a substantially V shape. At this point, the outer peripheral die 63 arranged to face the inner peripheral die 62 across the other-side connecting portion 35 is swung about the center axis of the inner peripheral die 62 to thereby bend the other-side connecting portion 35. In this embodiment, the outer peripheral die 63 swings toward the transfer direction upstream side Fa (the other side in the linear material length direction LL). Further, the second bending unit 6 includes a support member 64 for supporting a portion of the other-side connecting portion 35 on the transfer direction downstream side Fb (one side in the linear material length direction LL) with respect to the outer peripheral die 63 to inhibit movement of the portion toward at least the outer peripheral die 63 side in the linear material width direction LW. That is, this support member 64 is arranged to support a side opposite to the swing direction of the outer peripheral die 63 in the linear material length direction LL, that is, the outer peripheral die 63 side in the linear material width direction LW. Here, the support member 64 is formed of a columnar member (support pin) arranged to contact the other-side connecting portion 35.

As shown in FIG. 27, in the second bending process P6, by swinging the bend tool 61 in a state that the other-side connecting portion 35 is inserted to a space between the inner peripheral die 62 and the outer peripheral die 63, the outer peripheral die 63 swings about the center axis of the inner peripheral die 62, thereby bending the other-side connecting portion 35 at one position along the outer peripheral face of the inner peripheral die 62. Thus, a portion of the other-side connecting portion 35 in the linear material length direction LL is bent and shaped into a substantially arc shape. On the transfer direction downstream side Fb opposite to the swing direction of the outer peripheral die 63 with respect to the outer peripheral die 63, the support member 64 abuts on a side face of the other-side connecting portion 35 on the outer peripheral die 63 side, so that the other-side connecting portion 35 does not move toward the outer peripheral die 63 side in the linear material width direction LW. Thus, the support members 64 serves a function to provide support such that a portion of the other-side connecting portion 35 on the transfer direction downstream side Fb with respect to the bending position is prevented from rotating due to a rotation moment that acts on the other-side connecting portion 35 during bending. Note that shapes of the inner peripheral die 62 and the outer peripheral die 63 are not limited to a columnar shape, and any die in a shape having an arc face at least on a portion contacting the other-side connecting portion 35 may be used preferably. Therefore, for example, a member in which only a portion contacting the other-side connecting portion 35 is formed as an arc face and other portions have an outer face formed of a combination of one or more flat faces may preferably be used as the inner peripheral die 62 or outer peripheral die 63. Further, the support member 64 is not limited to a columnar shape, and a member with a various shape such as a rectangular parallelepiped shape may also be used.

Further, the bend tool 61 and the support member 64 are structured to be movable in a direction to approach or depart from the other-side connecting portion 35 as a process target, here in a direction parallel to the center axes of the inner peripheral die 62 and the outer peripheral die 63 (here the wave width direction W). In a state that the bend tool 61 and the support member 64 are moved to the other-side connecting portion 35 side, it is structured that the other-side connecting portion 35 is inserted to the space between the inner peripheral die 62 and the outer peripheral die 63, and the support member 64 contacts the other-side connecting portion 35. In this embodiment, as shown in FIG. 21 and FIG. 22, the bend tool 61 and the support member 64 are supported by a common base member 65. In this embodiment, the base member 65 is supported by a second bending unit support shaft 78 supported by the bobbin 71. Here, although the support member 64 is fixed to the base member 65, the bend tool 61 is supported rotatably by the base member 65. In this embodiment, the bend tool 61 and the support member 64 are structured to be movable together with the base member 65 in a direction to approach or depart from the other-side connecting portion 35 as a process target, specifically the wave width direction W. In this embodiment, the base member 65 is structured to be movable in an axial direction of the second bending unit support shaft 78 along the second bending unit support shaft 78. Then the second bending unit 6 is structured to move in a direction to depart from the wave conductor 3 (the other wave width direction side Wb) when the bobbin 71 moves as shown in FIG. 26A by bending in the first bending process P5 in synchronization with the first bending process P5, and move in a direction to approach the wave conductor 3 (the one wave width direction side Wa) after the first bending process P5 is finished. Since the second bending process P6 is performed in synchronization with intermittent transfer in the transfer process Pf as will be described later, this intermittent transfer is performed in a state that the second bending unit 6 is moved in the direction to approach the wave conductor 3. Since the base member 65 of the second bending unit 6 is supported on the bobbin 71 via the second bending unit support shaft 78, the second bending unit 6 moves together with the bobbin 71 in any situation.

As shown in FIG. 9 to FIG. 12, in this embodiment, the wave conductor 3 is wound for two windings on the bobbin 71 (see FIG. 21). Accordingly, in the second bending process P6, the other-side connecting portion 35 is shaped into a different shape in each winding. Specifically, as described above, the bent portion 35c bent into a substantially arc shape is shaped to have a different radius of curvature in the first winding other-side connecting portions 35F constituting the first winding section 3f and the second winding other-side connecting portions 35S constituting the second winding section 3s. This is for plurally arranging the other-side connecting portions 35 of the wave conductor 3 in different windings in parallel appropriately in the coil radial direction CR, as shown in FIG. 12 and so on. Accordingly, the second bending unit 6 is structured including shaping dies for performing the second bending process P6 on the other-side connecting portion 35, in a manner interchangeable in each winding. Specifically, there are provided a plurality of couples of bend tools 61 and support members 64, which are structured to be interchangeable in each winding. For example, although omitted from illustration, it is preferable that two couples of bend tools 61 and support members 64 be provided on the base member 65, and the different couples of bend tools 61 and support members 64 move to the position where the other-side connecting portion 35 is bent by rotating the base member 65 about the second bending unit support shaft 78.

Figure 28:
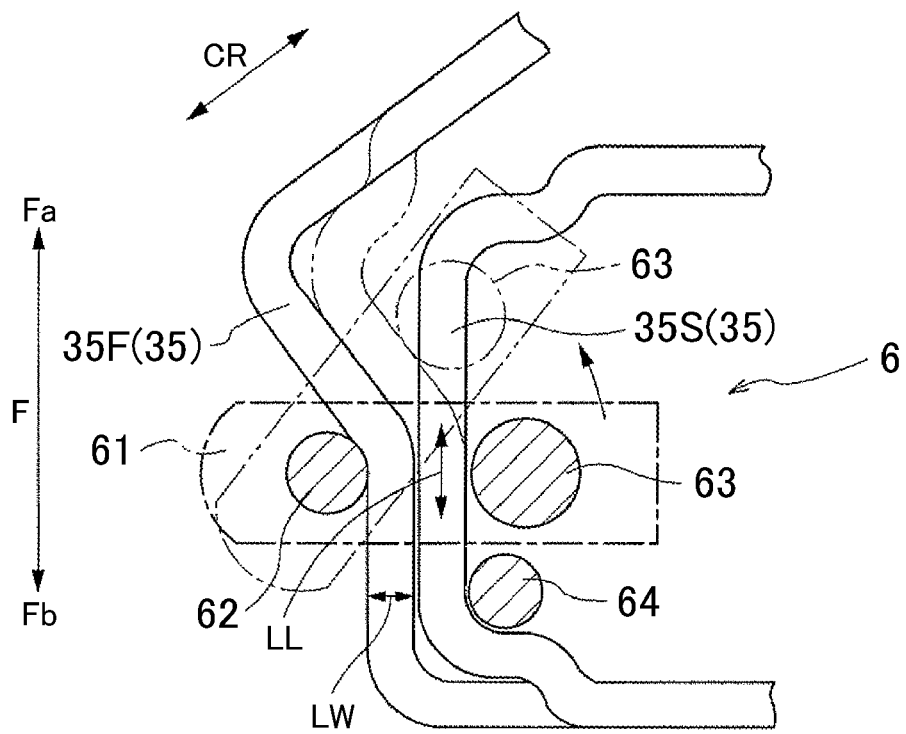
FIG. 28 is an explanatory view of a second bending process on a second winding section according to the embodiment of the present invention.

FIG. 28 shows structures of the bend tool 61 and the support member 64 as a shaping die for performing the second bending process P6 on the second winding other-side connecting portion 35S. The bend tool 61 and the support member 64 are different in arrangement of the inner peripheral die 62, the outer peripheral die 63, and the support member 64 from the shaping die for performing the second bending process P6 on the first winding other-side connecting portion 35F shown in FIG. 27. That is, in the bend tool 61 shown in FIG. 28, a gap between the inner peripheral die 62 and the outer peripheral die 63 is twice as wide as that in the bend tool 61 shown in FIG. 27 such that two other-side connecting portions 35 can be inserted to the space between the inner peripheral die 62 and the outer peripheral die 63. Further, the support member 64 is arranged at a position in contact with a side face on the outer peripheral die 63 side of the second winding other-side connecting portion 35S arranged outside in the coil radial direction CR adjacent to the first winding other-side connecting portion 35F. When bending the second winding other-side connecting portion 35S in the second bending process P6, the outer peripheral die 63 arranged to face the inner peripheral die 62 across the other-side connecting portions 35 of two windings (the first winding other-side connecting portion 35F and the second winding other-side connecting portion 35S) is swung about the center axis of the inner peripheral die 62, so as to bend the second winding other-side connecting portion 35S at one position along the first winding other-side connecting portion 35F that is already bent. Thus, the first winding other-side connecting portion 35F and the second winding other-side connecting portion 35S are arranged in parallel appropriately in the coil radial direction CR.

Figure 29A:
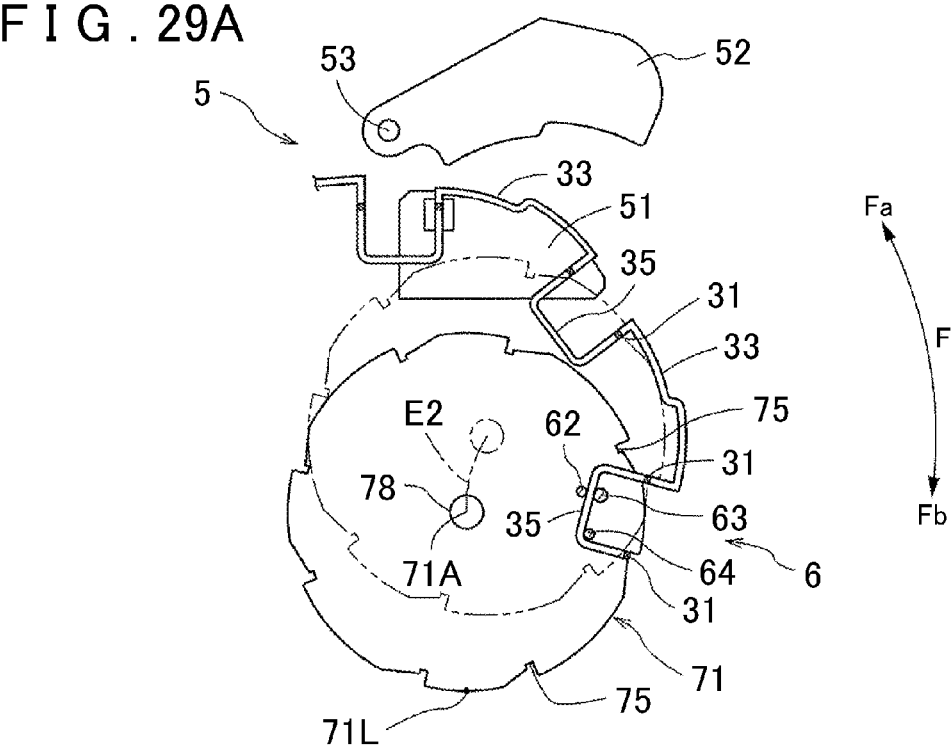
FIGS. 29A and 29B show views illustrating operation of the bobbin before and after bending in the second bending process according to the embodiment of the present invention.
Figure 29B:
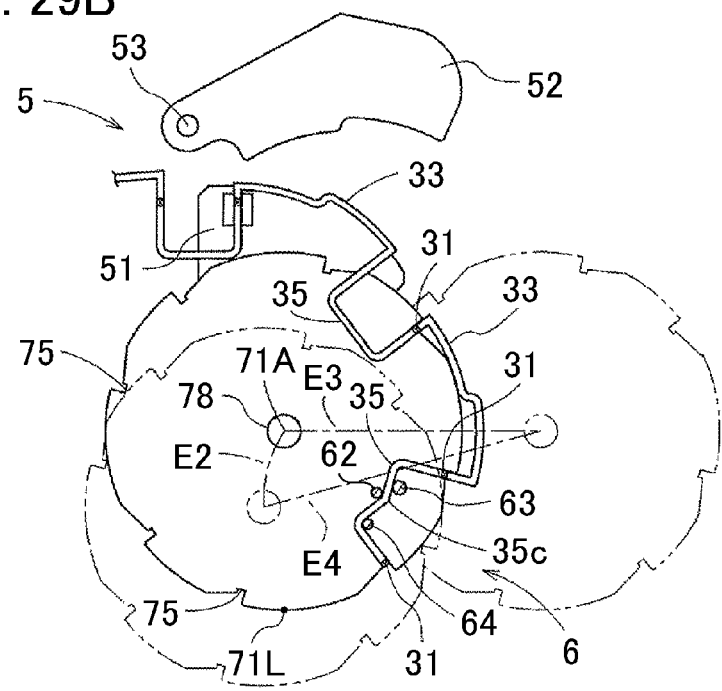

As shown in FIG. 29, in this embodiment, when the other-side connecting portion 35 is bent and shaped in the second bending process P6, the winding process P7 in which the bobbin 71 is rotated and moved to wind the wave conductor 3 on the bobbin 71 is performed in synchronization with the second bending process P6. At this point, intermittent transfer of the wave conductor 3 in the transfer process Pf is also performed in synchronization therewith. FIG. 29A shows a state prior to bending in the second bending process P6 and a movement trace of the bobbin 71 during bending, and FIG. 29B shows a state after bending in the second bending process P6 as well as a movement trace of the bobbin 71 accompanying the second bending process P6 and intermittent transfer of the transfer process Pf. As shown in FIG. 29, in the second bending process P6, the other-side connecting portion 35 is processed to bend by swinging the outer peripheral die 63 arranged facing the inner peripheral die 62 across the other-side connecting portion 35 toward the transfer direction upstream side Fa about the center axis of the inner peripheral die 62. Thus, in the second bending process P6, when seen with reference to the inner peripheral die 62 of the second bending unit 6, a portion of the other-side connecting portion 35 on the transfer direction upstream side Fa pivots inward in the coil radial direction CR about this inner peripheral die 62. However, in this embodiment, by the bobbin 71 rotating and moving in synchronization with the second bending process P6 as shown in FIG. 29A, a portion of the other-side connecting portion 35 on the transfer direction downstream side Fb moves to pivot inward in the coil radial direction CR about the inner peripheral die 62 when seen with reference to the stationary first bending unit 5.

Now, the wave conductor 3 is wound and retained on the bobbin 71 on the transfer direction downstream side Fb with respect to the bending position of the second bending process P6 (one side in the linear material length direction LL of the other-side connecting portion 35). Specifically, the side portions 31 on the transfer direction downstream side Fb from the bending position of the second bending process P6 are inserted and retained in the insertion grooves 75 provided in the outer peripheral face 71C of the bobbin 71. Then by rotating and moving the bobbin 71 in synchronization with bending of the other-side connecting portion 35 in the second bending process P6, the side portion 31 adjacent on the transfer direction upstream side Fa with respect to the bending position of the second bending process P6 (the other side in the linear material length direction LL of the other-side connecting portion 35) is inserted and retained in the insertion groove 75 of the bobbin 71. Thus, the winding process P7 to wind the wave conductor 3 on the bobbin 71 is performed.

In FIG. 29A, an ideal movement trace of the center axis 71A of the bobbin 71 when bending the other-side connecting portion 35 in the second bending process P6 and the winding process P7 is shown as a second ideal movement trace E2 by a dot and dash line. The second ideal movement trace E2 is a trace when the center axis 71A of the bobbin 71 is moved so that the position of the wave conductor 3 on the transfer direction upstream side Fa with respect to the bending position of the second bending process P6 does not change when performing the second bending process P6. This second ideal movement trace E2 is in an arc shape having a center in the vicinity of the center axis of the inner peripheral die 62. When the center axis 71A of the bobbin 71 is moved along this second ideal movement trace E2, the second bending process P6 can be performed in a state that the wave conductor 3 on the transfer direction upstream side Fb from the bending position of the of the second bending process P6 barely deforms elastically. Further, rotation of the bobbin 71 is also performed in the second bending process P6. The angle of rotation of the bobbin 71 at this time is almost equal to the bending angle of the other-side connecting portion 35 in the second bending process P6. By such rotation of the bobbin 71, as shown in FIG. 29A and FIG. 29B, the side portion 31 adjacent on the transfer direction upstream side Fa to the bending position of the second bending process P6 is inserted and retained in the insertion groove 75 of the bobbin 71 while the side portions 31 on the transfer direction downstream side Fb from the bending position of the second bending process P6 are retained in the insertion grooves 75 of the bobbin 71. Here, since the one-side connecting portion 33 adjacent to the other-side connecting portion 35 of the process target on the transfer direction upstream side Fa is in a state of being already curve processed in the first bending process P5, the two side portions 31 adjacent to the bending position of the second bending process P6 on the transfer direction upstream side Fa are inserted and retained in the insertion grooves 75 of the bobbin 71 almost simultaneously by performing the second bending process P6.

Further, in this embodiment, intermittent transfer of the wave conductor 3 in the transfer process Pf is performed in synchronization with the second bending process P6 and the winding process P7. Accordingly, movement of the bobbin 71 corresponding to the amount of movement of the wave conductor 3 by this intermittent transfer is also performed in synchronization with this intermittent transfer. Here, the bobbin 71 is moved so that an amount of movement in a direction parallel to the transfer direction of the wave conductor 3 prior to bending in the first bending process P5 corresponds to the amount of transfer by this intermittent transfer. In FIG. 29B, an ideal movement trace of the center axis 71A of the bobbin 71 when the bobbin 71 is moved corresponding to this intermittent transfer is shown as an intermittent transfer trace E3 by a chain line. This intermittent transfer trace E3 is a linear trace in parallel with the transfer direction of the wave conductor 3 prior to bending in the first bending process P5. When the center axis 71A of the bobbin 71 is moved along this intermittent transfer trace E3, intermittent transfer of the wave conductor 3 in the transfer process Pf can be performed with the wave conductor 3 in the state that the wave conductor 3 barely deforms elastically.

In this embodiment, the second bending process P6, the winding process P7, and intermittent transfer of the wave conductor 3 in the transfer process Pf are performed in synchronization. An ideal movement trace of center axis 71A of the bobbin 71 when performing these processes at the same time is a trace combining the second ideal movement trace E2 and the intermittent transfer trace E3 described above. However, in this embodiment, to simplify the bobbin movement unit 73, the center axis 71A of the bobbin 71 is moved along a straight movement trace E4 that is a linear movement trace. This straight movement trace E4 is a linear trace set to approximate the trace combining the second ideal movement trace E2 and the intermittent transfer trace E3, and is set as a linear trace connecting a start point of the second ideal movement trace E2 and an end point of the intermittent transfer trace E3. This trace matches the straight movement trace E4 approximating to the first ideal movement trace E1 when performing the first bending process P5. The wave conductor 3 has a relatively high elasticity, and a displacement of the straight movement trace E4 from the trace combining the second ideal movement trace E2 and the intermittent transfer trace E3 falls within the elastic deformation region of the wave conductor 3 on the transfer direction upstream side Fa from the bending position of the second bending process P6. Therefore, the wave conductor 3 would not be deformed plastically when the center axis 71A of the bobbin 71 is moved along such a straight movement trace E4.

Figure 30A:
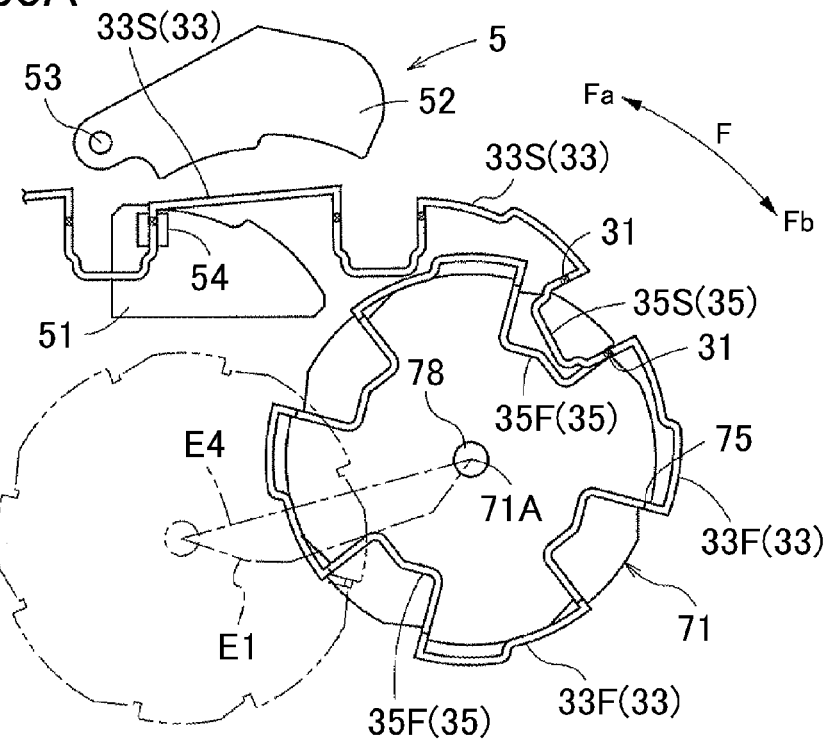
FIGS. 30A and 30B show views illustrating operation of the bobbin before and after bending in the first bending process on the second winding section according to the embodiment of the present invention.
Figure 30B:
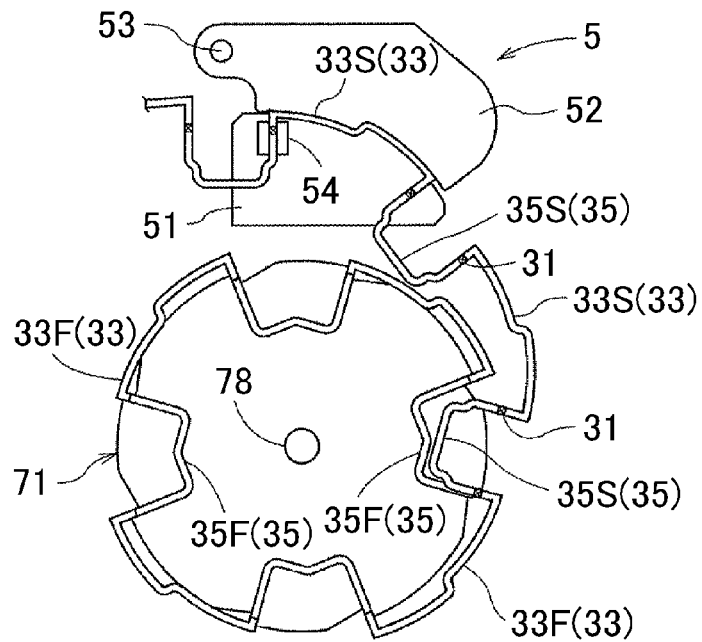

Here, in this embodiment, two windings of the wave conductor 3 are wound on the bobbin 71, and the first bending process P5 and the second bending process P6 are performed on each of the one-side connecting portions 33 and the other-side connecting portions 35 constituting the second winding section 3s of the wave conductor 3, similarly to the first winding section 3f. FIG. 30 shows states of the wave conductor 3 and movement traces of the bobbin 71 when performing the first bending process P5 for the second winding section 3s, similarly to FIG. 26 related to the first winding section 3f. As shown in FIG. 30A, in the first bending process P5, also on the second winding one-side connecting portions 33S constituting the second winding section 3s, bending is performed such that a portion of the wave conductor 3 on the transfer direction downstream side Fb pivots about the bending position of the first bending process P5, similarly to the first winding one-side connecting portions 33F constituting the first winding section 3f. At this time, the wave conductor 3 has the side portions 31 on the transfer direction downstream side Fb from the bending position of the second bending process P6 inserted and retained in the insertion grooves 75 of the bobbin 71. When performing the first bending process P5, as described above, the center axis 71A of the bobbin 71 is moved along the straight movement trace E4 set approximating to the first ideal movement trace E1. Thus, as shown in FIG. 30B, the second winding other-side connecting portions 35S constituting the second winding section 3s are arranged outside in the coil radial direction CR adjacent to the first winding other-side connecting portions 35F constituting the first winding section 3f. At this time, the first winding other-side connecting portion 35F has a bent portion 35c that has been bent and shaped already in the second bending process P6, but the second winding other-side connecting portion 35S has no bent portion 35c and is still in a substantially straight shape when seen in the direction of the bobbin axis.

Figure 31A:
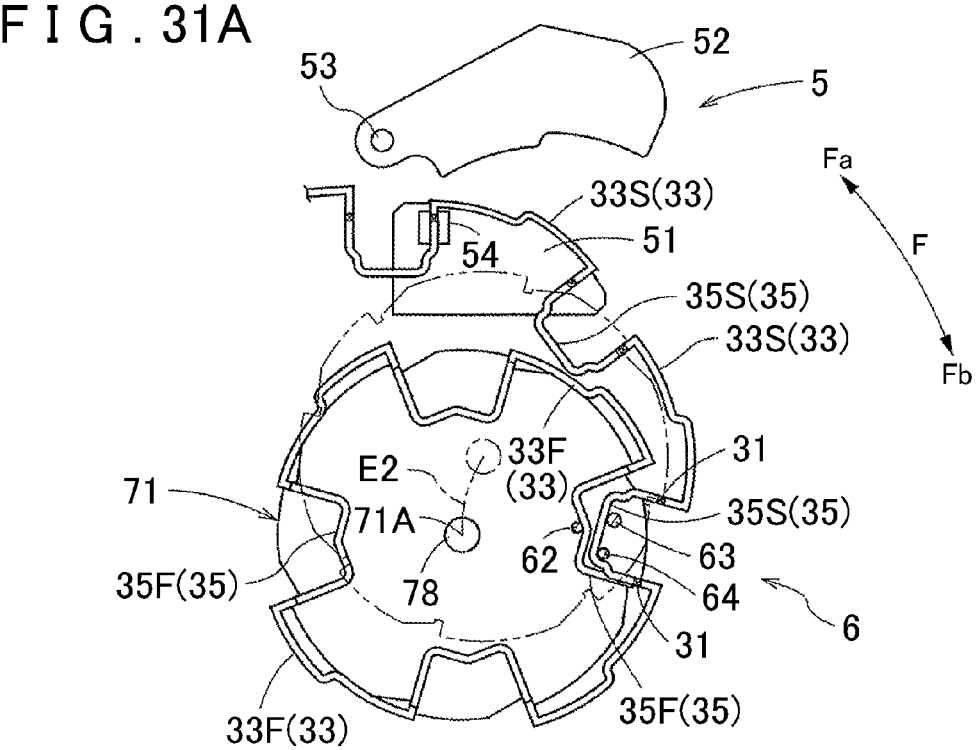
FIGS. 31A and 31B show views illustrating operation of the bobbin before and after bending in the second bending process on the second winding section according to the embodiment of the present invention.
Figure 31B:
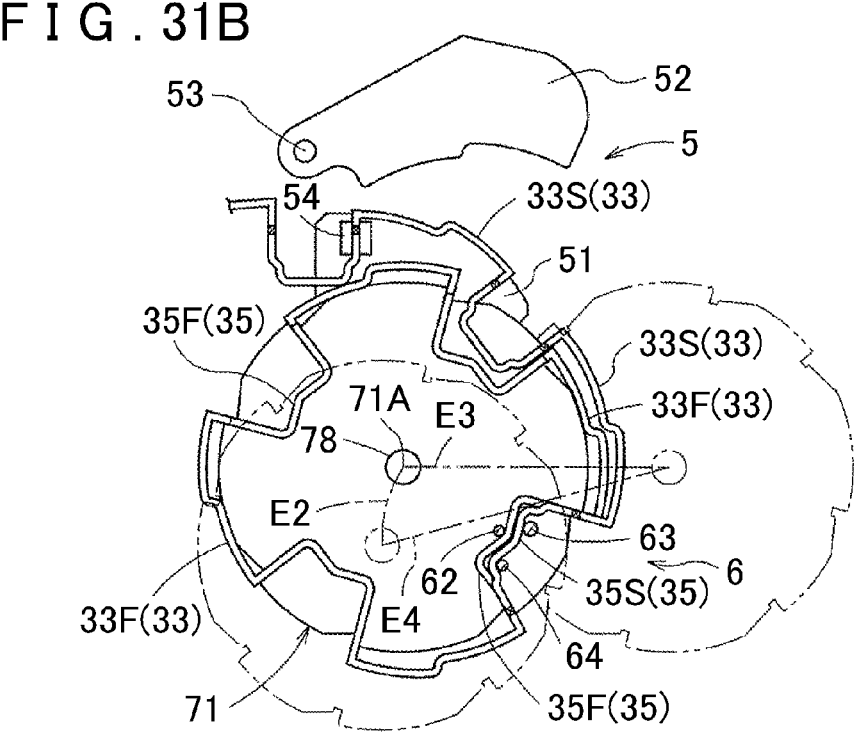

FIG. 31 shows states of the wave conductor 3 and movement traces of the bobbin 71 when performing the second bending process P6, the winding process P7, and intermittent transfer in the transfer process Pf for the second winding section 3s in synchronization, similarly to FIG. 29 related to the first winding section 3f. As shown in FIG. 31, in the second bending process P6 for the second winding section 3s, the outer peripheral die 63 is swung toward the transfer direction upstream side Fa about the center axis of the inner peripheral die 62 in a state that the first winding other-side connecting portion 35F which is already bent and the substantially straight second winding other-side connecting portion 35S are sandwiched between the inner peripheral die 62 and the outer peripheral die 63. Thus, the second winding other-side connecting portion 35S is bent at one position along the first winding other-side connecting portion 35F which has been already bent. By rotating and moving the bobbin 71 in synchronization with this second bending process P6, two side portions 31 of the second winding section 3s adjacent on the transfer direction upstream side Fa to the bending position of the second bending process P6 are inserted and retained in insertion grooves 75 of the bobbin 71. In this manner, the winding process P7 to wind the wave conductor 3 on the bobbin 71 is performed. By this winding process P7 of the second winding section 3s, two windings of the wave conductor 3 are wound on the bobbin 71, and the two side portions 31 are arranged in the coil radial direction CR in the insertion grooves 75 of the bobbin 71.

Here, as shown in FIG. 29 to FIG. 31, the bobbin 71 is arranged lower than the first bending unit 5. The second bending unit 6 is arranged at a position separated by one or more wave cycles PT of the wave conductor 3 on the transfer direction downstream side Fb, with respect to the first bending unit 5 along the transfer direction F of the wave conductor 3, which is in a direction gradually curving downward on the transfer direction downstream side Fb with respect to the bending position of the first bending unit 5. Specifically, the second bending unit 6 is arranged at a position of 1.5 pitch (1.5 wave cycle) on the transfer direction downstream side Fb with respect to the first bending unit 5. Further, in this embodiment, the second bending unit 6 is located on the transfer direction upstream side Fa with respect to a bottom end position 71L of the bobbin 71 along the transfer direction F of the wave conductor 3.

8. The Winding Process and Winding Unit

Next, the winding process P7 and the winding unit 7 will be described. The winding unit 7 is a unit for performing the winding process P7 so as to wind on the bobbin 71 the wave conductor 3 that has been bent in the first bending process P5 and the second bending process P6 described above. As described above, the bobbin 71 is rotated and moved in synchronization with the first bending process P5, the second bending process P6, and the transfer process Pf (see FIG. 26 and FIG. 29 to FIG. 31). Accordingly, in this embodiment, the winding unit 7 has the bobbin 71 to wind the wave conductor 3 that has been bent in the first bending process P5 and the second bending process P6, a bobbin rotation unit 72 capable of rotating the bobbin 71 about the center axis 71A, and a bobbin movement unit 73 capable of moving the center axis 71A of the bobbin 71 along a predetermined movement trace, as shown in FIG. 21 and FIG. 22. In this embodiment, the bobbin 71 is structured by coupling two disc members to have a positional relationship of being concentric and in parallel with each other.

The bobbin rotation unit 72 is structured having a bobbin support shaft 79 rotatably supporting the bobbin 71 and a not-shown rotation drive unit, such as a stepping motor, for rotating the bobbin 71 by a predetermined angle in synchronization with the first bending process P5 and the second bending process P6. In addition, the center axis of the bobbin support shaft 79 is the center axis 71A of the bobbin 71. The bobbin support shaft 79 is supported on a support frame 77. Here, the bobbin support shaft 79 is supported on the support frame 77 to be in parallel with the wave width direction W. The bobbin movement unit 73 in this embodiment is structured as a unit to enable movement of the center axis 71A of the bobbin 71 along the straight movement trace E4. Accordingly, the bobbin movement unit 73 is structured having a bobbin movement groove 73a provided on the support frame 77 and a not-shown direct drive unit, such as a unit combining a stepping motor and a ball screw, for moving the bobbin support shaft 79 along this bobbin movement groove 73a. The bobbin movement groove 73a is provided in parallel with the above-described straight movement trace E4. As described above, the structure to move the center axis 71A of the bobbin 71 along the straight movement trace E4 in both the first bending process P5 and the second bending unit 6 allows forming the bobbin movement groove 73a provided on the support frame 77 in a linear shape, thereby simplifying the bobbin movement unit 73.

As shown in FIG. 32, on the outer peripheral face 71C of the bobbin 71, a plurality of side portion retaining units 74 in which side portions 31 of the wave conductor 3 are retained are provided along a circumferential direction of the bobbin 71. Each side portion retaining unit 74 has an insertion groove 75 that is formed on an outer peripheral face 71C of the bobbin 71 and in which the side portion 31 of the wave conductor 3 is inserted, and a lock member 76 to lock the side portion 31 inserted in the insertion groove 75. A plurality (eight in this embodiment) of insertion grooves 75 are provided at regular intervals along the circumferential direction on the outer peripheral face 71C of the bobbin 71. For each insertion groove 75, an inclined guide face 75a is formed on the transfer direction downstream side Fb (winding direction side of the bobbin 71) of this groove. This inclined guide face 75a is an inclined face for guiding the side portion 31 to facilitate insertion in the insertion groove 75 in the winding process P7 performed in synchronization with the second bending process P6. Note that in this embodiment, the insertion grooves 75 are formed on the outer peripheral face 71C of each of the two disc members forming the bobbin 71.

Figure 32A:
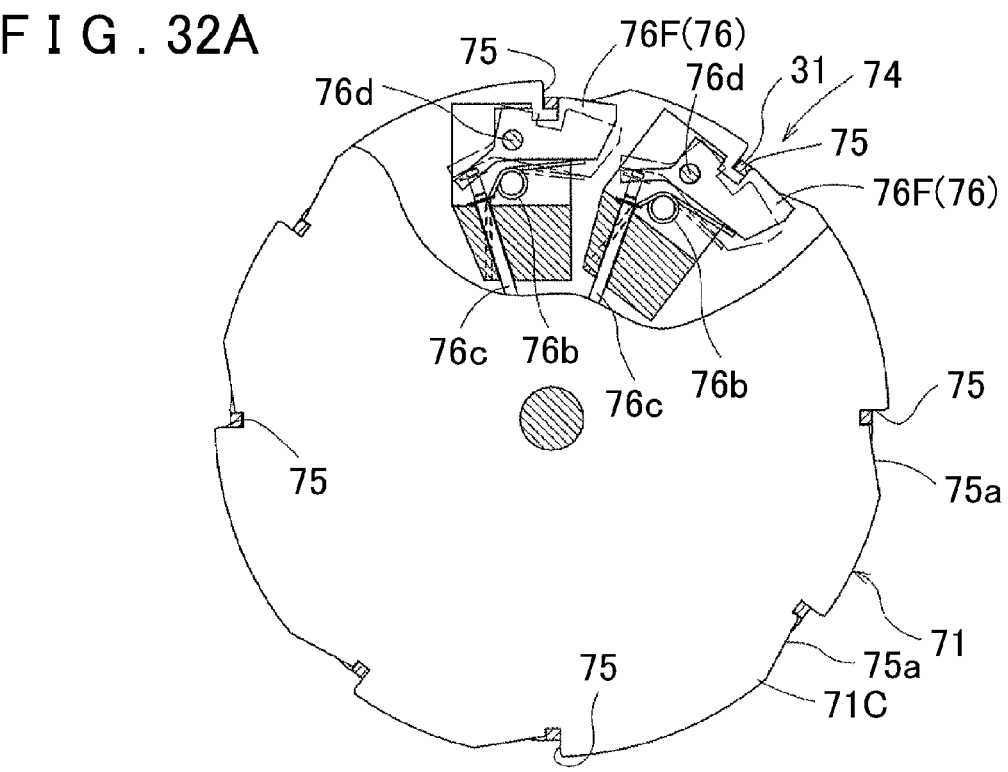
FIGS. 32A and 32B show front views illustrating the structure of a side portion retaining unit according to the embodiment of the present invention.
Figure 32B:
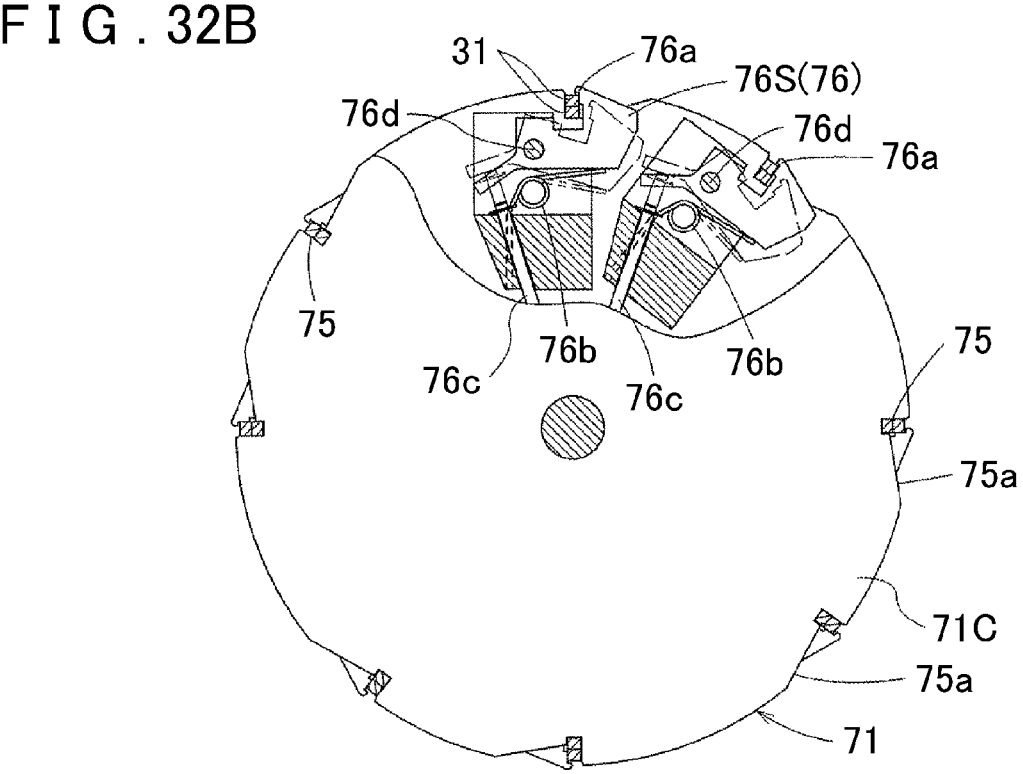
Figure 33:
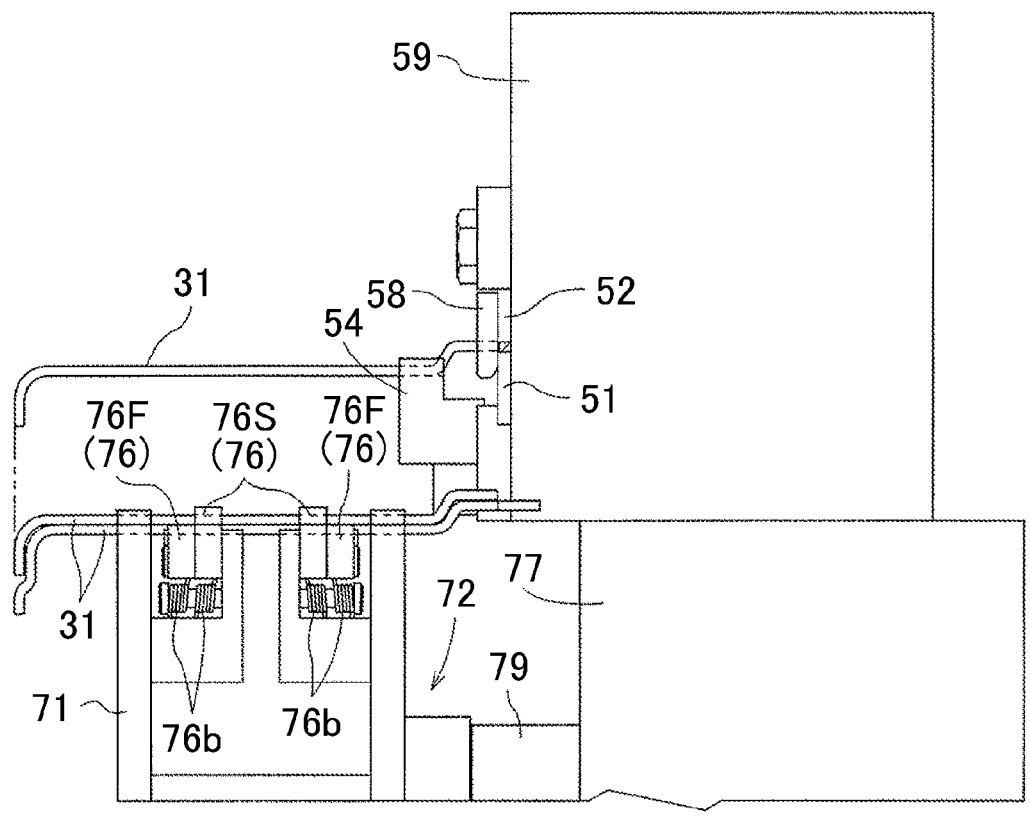
FIG. 33 is a side view showing the structure of the side portion retaining unit according to the embodiment of the present invention.

In this embodiment, the lock member 76 presses and locks the side portion 31 inserted in the guide groove 75 from the inclined guide face 75a side (the transfer direction downstream side Fb). The face on a side of the insertion groove 75 where the inclined guide face 75a is not provided is in parallel with the radial direction of the bobbin 71, and thus the lock member 76 sandwiches and locks the side portion 31 with this face. Here, there are provided first lock members 76F for locking the side portions 31 constituting the first winding section 3f and second lock members 76S for locking the side portions 31 constituting the second winding section 3s. FIG. 32A shows a structure of the first lock member 76F, and FIG. 32B shows a structure of the second lock member 76S. As shown in FIG. 33, the first lock members 76F and the second lock members 76S are arranged in parallel in the axial direction of the bobbin 71. Note that in this embodiment, two couples of first lock members 76F and second lock members 76S are arranged in the axial direction of the bobbin 71, each couple being structured to lock each side portion 31 at two positions in the linear material length direction LL thereof.

Each first lock member 76F has a pressing surface arranged inward in the bobbin radial direction (inward in the coil radial direction CR) in the insertion groove 75 at a height matching the height of the side portions 31 of the first winding section 3f, and is structured to press only the side portions 31 of the first winding section 3f by this pressing surface. Each second lock member 76S has a pressing surface arranged outward in the bobbin radial direction (outward in the coil radial direction CR) in the insertion groove 75 at a height matching the height of the side portions 31 of the second winding section 3s, and is structured to press only the side portions 31 of the second winding section 3s by this pressing surface. Each second lock member 76S also has a retaining protrusion 76a for preventing the side portions 31 of the second winding section 3s from being pulled off outward in the bobbin radial direction.

As shown in FIG. 32, each lock member 76 (each of the first lock members 76F and the second lock members 76S) includes a biasing member 76b and a lock release unit 76c. Further, each lock member 76 is supported on the bobbin 71 swingably about a predetermined support shaft 76d. The biasing unit 76b biases each lock member 76 in a locking direction, and formed in this embodiment using an elastic member (helical torsion spring in the illustrated example). Here, the locking direction refers to a direction in which the lock member 76 presses the side portion 31. The lock release unit 76c moves (here swings) each lock member 76 in a lock release direction against the biasing force of the biasing unit 76b. In this embodiment, the lock release unit 76c is structured having a lock release shaft performing an operation to press each lock member 76 in a direction to swing in the lock release direction and a not-shown drive mechanism, such as an air cylinder, that drives the lock release shaft in an axial direction.

As described above, the winding process P7 is performed in synchronization with the second bending process P6. That is, the second bending process P6 is performed in a state that the side portions 31 on the transfer direction downstream side Fb from the bending position of the second bending process P6 are retained in the side portion retaining units 74 provided on the bobbin 71. Then by rotating and moving the bobbin 71 in synchronization with bending of the other-side connecting portions 35 in the second bending process P6, two side portions 31 adjacent to the transfer direction upstream side Fa with respect to the bending position in the second bending process P6 are inserted and retained in the side portion retaining units 74 of the bobbin 71, and the winding process P7 is performed. Therefore, each side portion retaining unit 74 retains the side portion 31 by moving the lock member 76 in the lock release direction when the side portion 31 is inserted in the insertion groove 75, and moving the lock member 76 in the locking direction after the side portion 31 is inserted in the insertion groove 75. Here, the side portion retaining units 74 each include two members, the first lock member 76F and the second lock member 76S. Accordingly, the side portion retaining units 74 place both the first lock members 76F and the second lock members 76S into a lock release state when the side portions 31 of the first winding section 3f are inserted in the insertion grooves 75, and place only the first lock members 76F into a lock state after the side portions 31 of the first winding section 3f are inserted in the insertion grooves 75. Thereafter, until the side portions 31 of the second winding section 3s are inserted in the guide grooves 75, the second lock members 76S are kept in the lock release state, and after the side portions 31 of the second winding section 3s are inserted in the insertion grooves 75, the second lock members 76S are placed into the lock state. Thus, when the side portions 31 of the second winding section 3s are inserted in the insertion grooves 75, the side portions 31 of the first winding section 3f that have been already inserted can be restricted from jumping out of the insertion grooves 75.

9. The Shape of the Wave Wound Coil

By performing the processes of the coil manufacturing method as has been described above on the entire wave conductor 3, the wave wound coil 3C formed by shaping the wave conductor 3 into a substantially cylindrical shape is wound on the bobbin 71. Then by removing the bobbin 71, the wave wound coil 3C having a predetermined shape as shown in FIG. 11 and FIG. 34 is obtained. This wave wound coil 3C is made by shaping the linear conductor 3L with a cross-sectional shape having directionality (here a rectangular cross-sectional shape) into a substantially rectangular waveform and then shaping the linear conductor 3L into a substantially cylindrical shape. Further, this wave wound coil 3C has the plurality of straight side portions 31 extending in the coil axis direction, the one-side connecting portions 33 sequentially connecting every other pair of side portions 31 adjacent to each other in the coil circumferential direction CC at ends on the one axial direction side (one wave width direction side Wa), and the other-side connecting portions 35 sequentially connecting pairs of side portions 31 adjacent to each other in the coil circumferential direction CC that are not connected by the one-side connecting portions 33 at ends on the other axial direction side (the other wave width direction side Wb).

Then by performing the first bending process P5 and the second bending process P6 described above, either one side in the linear material length direction LL of each of the one-side connecting portions 33 and the other-side connecting portions 35 is bent in the coil radial direction CR, and is thereby formed to project outward in the coil radial direction CR. In other words, the one-side connecting portions 33 and the other-side connecting portions 35 are formed in a curved shape or bent shape along the coil circumferential direction CC of the wave wound coil 3C in a substantially cylindrical shape. Accordingly, as shown in FIG. 34, the plurality of side portions 31 of the wave conductor 3 are arranged along the coil circumferential direction CC of the substantially cylindrical wave wound coil 3C to be formed finally, and the directions of cross-sectional shapes of the side portions 31 are in a constant direction with respect to the coil radial direction CR. Here, the state that the cross-sectional direction of each side portion 31 is in a constant direction with respect to the coil radial direction CR is a state that all of the plurality of side portions 31 of the wave wound coil 3C arranged in the coil circumferential direction CC are aligned in the same direction with respect to the coil radial direction CR. In other words, it is equivalent to a state that cross sections of the plurality of side portions 31 having directionality are arranged radially with the center axis of the wave wound coil 3C serving as the center. In this embodiment, regarding the direction of the cross-sectional shapes of the side portions 31, a direction substantially orthogonal to the face of the substantially flat wave conductor 3 before being formed into a substantially cylindrical shape is taken as a reference direction, and arrangement is made such that the reference direction matches a direction along the coil radial direction CR. More specifically, arrangement is made such that among four sides constituting an outer edge of the rectangular cross section of each side portion 31, two sides in parallel with each other are in a direction along the coil radial direction CR, that is, a direction substantially in parallel with the coil radial direction CR, and the remaining two sides are in a direction substantially orthogonal to the coil radial direction CR. As described above, when the wave wound coil 3C is an armature coil for rotary electrical machine, positions and directions of cross-sectional shapes of the side portions 31 after bending in the first bending process P5 and the second bending process P6 are determined on the basis of a state that each side portion 31 is inserted in a predetermined slot of an armature core. The arrangement and directions of cross-sectional shapes of the side portions 31 as shown in FIG. 34 are suitable for insertion in a plurality of slots arranged at predetermined intervals in a circumferential direction on an inner peripheral face of a cylindrical armature core, particularly, in groove-shaped slots extending in an axial direction of the armature core and arranged radially along a radial direction of the armature core.

In this wave wound coil 3C, the one-side connecting portion 33 is arc-shaped connecting portion that is substantially entirely shaped into a substantially arc shape so as to project outward in the coil radial direction CR. On the other hand, the other-side connecting portion 35 is V-shaped connecting portion bent at one position and shaped in a substantially V shape so as to project outward in the coil radial direction CR. In each other-side connecting portion 35, only a portion in the linear material length direction LL has the bent portion 35c shaped into a substantially arc shape. The entire connecting portion is in a substantially V shape having straight portions which extend linearly on both sides of this bent portion 35c. The straight portions have a direction substantially orthogonal to the coil radial direction CR being the linear material length direction LL. Further, on this wave wound coil 3C, portions on the other wave width direction side Wb of the wave conductor 3 including the other-side connecting portions 35 form the other-side end face forming regions 37 which are bent inward in the coil radial direction CR. In this embodiment, the other-side end face forming regions 37 are bent inward in the coil radial direction CR to be substantially in parallel with a plane orthogonal to the coil axis direction (wave width direction W). Then ends of such other-side end face forming regions 37 located inside of the coil radial direction CR are formed by the other-side connecting portions 35. That is, the other-side connecting portions 35 are located more inward in the coil radial direction CR as compared to the one-side connecting portions 33, and accordingly, the other-side connecting portions 35 have a shorter linear material length as compared to that of the one-side connecting portions 33. In the structure of this embodiment, the other-side connecting portions 35 thus located inside in the coil radial direction CR and having shorter linear material lengths are formed in V-shape connecting portions, which can be easily processed and requires a processing unit (second bending unit 6) which can be easily reduced in size, thereby enhancing manufacturability.

Further, in this embodiment, the wave conductor 3 constituting the wave wound coil 3C has the first winding section 3f and the second winding section 3s, and two windings of the wave conductor 3 are wound on the bobbin 71. Accordingly, the wave wound coil 3C is structured such that the side portions 31, the one-side connecting portions 33, and the other-side connecting portions 35 are wound for two windings so as to be arranged two each in the coil radial direction CR. Therefore, two side portions 31 in different windings of the wave conductor 3 are arranged adjacent to each other in the coil radial direction CR. The one-side connecting portions 33 and the other-side connecting portions 35 are arranged similarly. Two one-side connecting portions 33 in different windings of the wave conductor 3 are arranged adjacent to each other in the coil radial direction CR, and two other-side connecting portion 35 in different windings of the wave conductor 3 are arranged adjacent to each other in the coil radial direction CR.

10. Other Embodiments (1) The above described embodiment has been described with an example in which the first bending process P5 and the second bending process P6 are performed such that, when the cross-sectional shapes of the side portions 31 are a rectangular shape, two sides in parallel with each other of the rectangular cross sections of the side portions 31 have a direction along the coil radial direction CR in a state that the wave conductor 3 is shaped into a substantially cylindrical wave wound coil 3C. However, embodiments of the present invention are not limited thereto, and the present invention may be applied to other embodiments as long as the directions of the cross-sectional shapes of the side portions 31 are in a constant direction with respect to the coil radial direction CR in a state of being shaped into a substantially cylindrical wave wound coil 3C. In other words, the present invention may be applied as long as all of the plurality of side portions 31 of the wave wound coil 3C arranged in the coil circumferential direction CC are aligned in a constant direction with respect to the coil radial direction CR. Therefore, for example, in another embodiment of the present invention, when the cross-sectional shapes of the side portions 31 are a rectangular shape, two sides in parallel with each other of the rectangular cross section may have a direction inclined at a predetermined angle with respect to the coil radial direction CR.

(2) Further, a cross-sectional shape of the linear conductor 3L having directionality is not limited to a rectangular cross section, and linear conductors 3L with various cross-sectional shapes excluding a circular cross-sectional shape may be used. Therefore, for example, a linear conductor with a cross-sectional shape having a contour formed of straight lines and curves, such as a polygonal shape, an elliptic shape, a shape obtained by linearly cutting a part of a circle, or the like, can be used. Further, in another preferred embodiment of the present invention, a linear conductor with a cross-sectional shape having two sides in parallel with each other may be used, and other portions thereof may be formed of a curved face such as an arc face, a polygonal face, and/or the like. In these linear conductors 3L with various cross-sectional shapes, it is preferable that determination of the directions of the cross-sectional shapes of the side portions 31, which are constant directions with respect to the coil radial direction CR, be made appropriately depending on the purpose of use of the wave wound coil 3C. In any case, all of the plurality of side portions 31 of the wave wound coil 3C are set in the same direction with respect to the coil radial direction CR in a state that the final wave coil 3C is formed. Note that when the cross-sectional shapes are a shape having two sides in parallel with each other, it is particularly preferable that the two parallel sides be in a direction orthogonal to the coil radial direction CR. Further, in this case, in another preferred structure, the two parallel sides may be in a direction in parallel with the coil radial direction CR, or more particularly, the line of symmetry of the two parallel sides may have a direction that matches the coil radial direction CR. Also in this case, the two parallel sides may be arranged to incline at predetermined angles with respect to the coil radial direction CR.

(3) The above described embodiment has been described with an example in which two windings of the wave conductor 3 are wound on the bobbin 71. However, embodiments of the present invention are not limited thereto. Therefore, in another preferred embodiment of the present invention, the wave conductor 3 may be wound just for one winding on the bobbin 71 to produce the wave wound coil 3C of one winding, or the wave conductor 3 may be wound for three or more windings on the bobbin 71 to produce the wave wound coil 3C of three or more windings. When the wave conductor 3 is wound for a plurality of windings, a plurality of side portions 31, a plurality of one-side connecting portions 33, and a plurality of other-side connecting portions 35 may be arranged in the coil radial direction CR.

(4) The order of the processes described in the above embodiment is an example, and can be interchanged appropriately. For example, the order of the one-side adjustment bending process P2a, the other-side adjustment bending process P2b, the other-side bending process P3, and the step shaping process P4 can be interchanged appropriately. Further, in another preferred embodiment of the present invention, the coil manufacturing method may not have a part or all of these four processes. Moreover, in another preferred embodiment of the present invention, the coil manufacturing method may not have the wave conductor forming process P1, and the wave conductor 3 shaped in advance in a rectangular waveform may be supplied to perform predetermined processing on the supplied wave conductor 3. Further, in another preferred embodiment of the present invention, the order of the first bending process P5 and the second bending process P6 may be interchanged. In this manner, when the contents and/or order of the processes of the coil manufacturing method are changed, the arrangement of the units for performing the processes of the coil manufacturing apparatus 1 is changed appropriately.

(5) The above described embodiment has been described with an example in which intermittent transfer in the transfer process Pf is performed in synchronization with the second bending process P6 and the winding process P7. However, the processes P6 and P7 and the transfer process Pf may be performed separately, and it is preferable that the transfer process Pf be performed after the second bending process P6 and the winding process P7 are performed, or the second bending process P6 and the winding process P7 be performed after the transfer process Pf is performed.

(6) The above described embodiment has been described with an example in which the one-side connecting portion 33 is arc shaped connecting portion, which is substantially entirely shaped into a substantially arc shape, and the other-side connecting portion 35 is V-shaped connecting portion, which is shaped in a substantially V shape by bending at one position. However, embodiments of the present invention are not limited thereto. Therefore, in another preferred embodiment of the present invention, both the one-side connecting portions 33 and the other-side connecting portions 35 may be V-shaped connecting portions, or both the one-side connecting portions 33 and the other-side connecting portions 35 may be arc shaped connecting portions. Further, in another preferred embodiment of the present invention, the one-side connecting portions 33 may be V-shaped connecting portions, and the other-side connecting portions 35 may be arc shaped connecting portions. Further, at least either of the one-side connecting portions 33 and the other-side connecting portions 35 may be bent and shaped into a shape other than the substantially arc shape and the substantially V shape.

(7) The above described embodiment has been described with an example in which the swing fulcrum 53 of the movable die 52 of the first bending unit 5 is at a fixed position with respect to the fixed die 51. However, embodiments of the present invention are not limited thereto. Therefore, as shown in FIG. 35, another preferred embodiment of the present invention may be structured to further include a reciprocating unit 53A capable of reciprocating the swing fulcrum 53 in a direction in which the movable shaping face 56 of the movable die 52 approaches or departs from the fixed shaping face 55 of the fixed die 51. In the illustrated example, the reciprocating unit 53A reciprocates the swing fulcrum 53 in a direction (here a substantially orthogonal direction) to cross the linear material length direction LL (here a direction substantially in parallel with the transfer direction F) of the one-side connecting portions 33. As this reciprocating unit 53A, for example, a direct drive unit such as a unit combining a stepping motor and a ball screw, which are not shown, for reciprocating the swing fulcrum 53 may be used. Providing such a reciprocating unit 53A facilitates feeding of the one-side connecting portions 33 to the space between the fixed shaping face 55 and the movable shaping face 56 at a position where the movable die 52 is separated from the fixed die 51. While securing such facility of feeding, at a position where the movable die 52 has approached to the fixed die 51, the distance D5 between the movable shaping face 56 and the fixed shaping face 55 can be set shorter in the transfer direction upstream side end portion 55a. Therefore, as compared to the case where the reciprocating unit 53A is not provided, there is an advantage that it is easy to create a state that, when the one-side connecting portion 33 is processed by the first bending unit 5, an end of the one-side connecting portion 33 on the transfer direction upstream side Fa is sandwiched earlier between the fixed die 51 and the movable die 52 and becomes difficult to move as compared to a portion of the one-side connecting portion 33 on the transfer direction downstream side Fb. In addition, when such a reciprocating unit 53A is provided, it is preferable that in a state that at least the movable shaping face 56 of the movable die 52 has approached the fixed die 51 side, the swing fulcrum 53 be arranged within the above-described fulcrum arrangement possible area 5A.

(8) The above described embodiment has been described with an example in which each of the fixed shaping face 55 and the movable shaping face 56 has one step portion in the extending direction of each shaping face. However, embodiments of the present invention are not limited thereto. Therefore, in another preferred embodiment of the present invention, each of the fixed shaping face 55 and the movable shaping face 56 may be formed as a substantially arc shaped face having no step portion in the extending direction of each shaping face. Further, in another preferred embodiment of the present invention, each of the fixed shaping face 55 and the movable shaping face 56 has a plurality of step portions in the extending direction of each shaping face.

Figure 36:
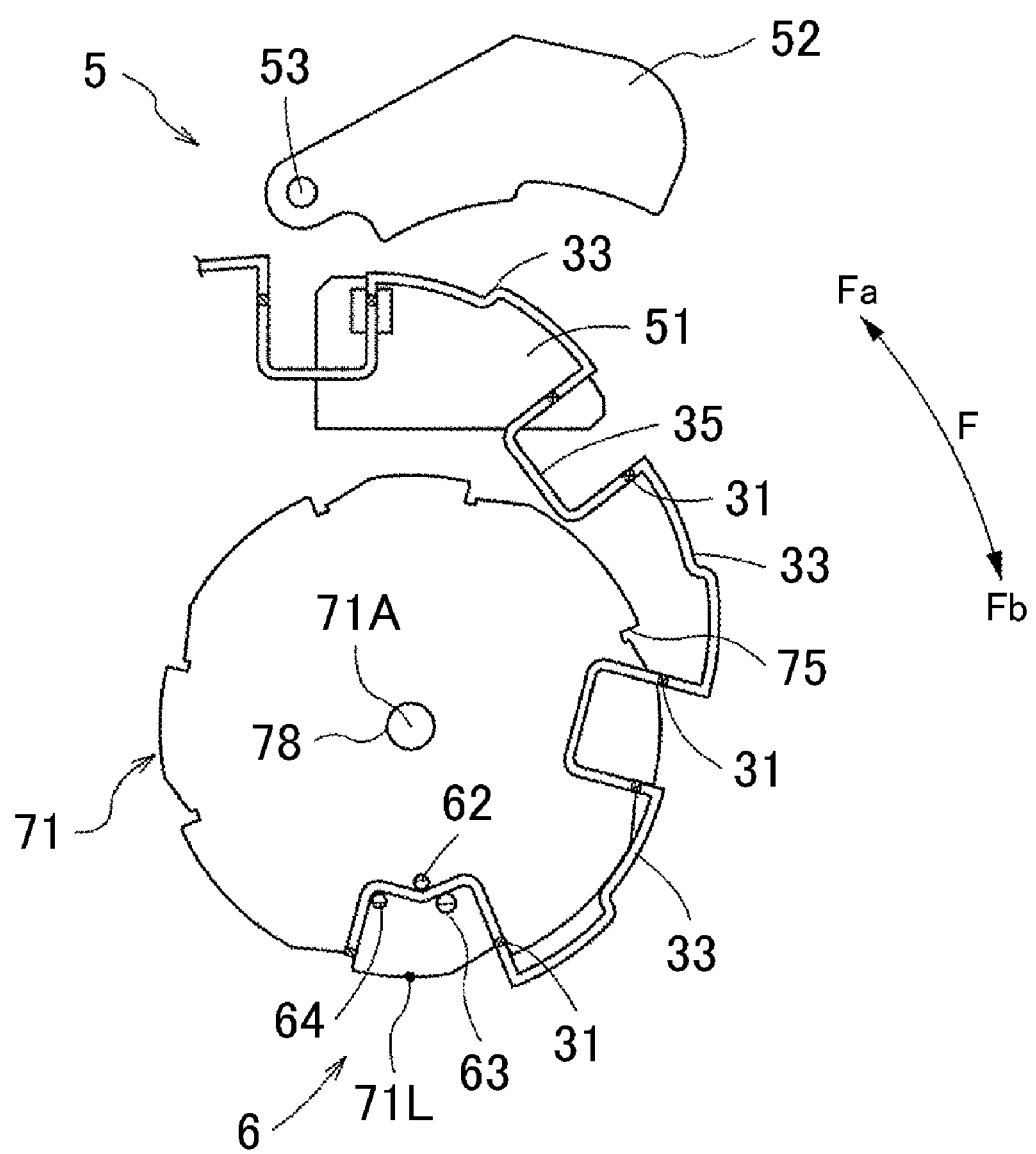
FIG. 36 is an explanatory view showing an example of a bending position of a second bending process according to another embodiment of the present invention.

(9) The above described embodiment has been described with an example in which the bending position of the second bending process P6 (second bending unit 6) is set at a position of 1.5 pitch (1.5 wave cycle) on the transfer direction downstream side Fb from the bending position of the first bending process P5 (first bending unit 5). However, embodiments of the present invention are not limited thereto. However, it is desired that the bending position of the second bending process P6 be set at a position separated by one or more wave cycles PT on the transfer direction downstream side Fb from the bending position of the first bending process P5 along the transfer direction F of the wave conductor 3. Further, when the bobbin 71 is arranged lower than the bending position of the first bending process P5, it is desired that the bending position of the second bending process P6 be at a position on the transfer direction upstream side Fa with respect to the bottom end position 71L of the bobbin 71 along the transfer direction F of the wave conductor 3. As an example of such a bending position of the second bending process P6, FIG. 36 shows a positional relationship of the components when the bending position of the second bending process P6 (second bending unit 6) is set at a position at 2.5 pitches (2.5 wave cycles) on the transfer direction downstream side Fb from the bending position of the first bending process P5 (first bending unit 5).

(10) The configuration of the second bending process P6 is not limited to the structure of the above embodiment. For example, in another preferred embodiment of the present invention, similarly to the first bending process P5, a fixed die and a movable die each having a substantially V shaped shaping face may be used to press the other-side connecting portion 35 between the fixed die and the movable die to bend the other-side connecting portion 35 into a substantially V shape.

(11) The above described embodiment has been described with an example of a structure to move the bobbin 71 along the straight movement trace E4 both when performing the first bending process P5 and when performing the second bending process P6, the winding process P7, and the transfer process Pf. However, embodiments of the present invention are not limited thereto. Therefore, in another preferred embodiment of the present invention, the bobbin 71 may be moved along each of the first ideal movement trace E1, the second ideal movement trace E2, and the intermittent transfer trace E3 described above. In this case, to enable movement of such a bobbin 71, it is preferable that the bobbin movement unit 73 be structured using a unit capable of moving the bobbin 71 to any given position on a plane such as an XY table, for example.

(12) The above described embodiment has been described with an example in which intermittent transfer is performed with one wave cycle PT of the wave conductor 3 being one pitch in the transfer process Pf, but embodiments of the present invention are not limited thereto. Therefore, in another preferred embodiment of the present invention, in the transfer process Pf intermittent transfer may be performed with the length of other than one wave cycle PT, such as 0.5 wave cycle, of the wave conductor 3 being one pitch, for example. Further, the wave conductor 3 may be transferred sequentially at constant speed in the transfer process Pf. In this case, it is preferable that the processes be movable in the transfer direction of the wave conductor 3.

The present invention may preferably be applied to a coil manufacturing method and a coil manufacturing apparatus for manufacturing a substantially cylindrical wave wound coil by shaping a linear conductor with a cross-sectional shape having directionality.

What is claimed is:

1. A coil manufacturing method for manufacturing a wave wound coil in a substantially cylindrical shape by shaping a linear conductor with a cross-sectional shape having directionality, the method comprising:

transferring a wave conductor that is a linear conductor shaped in a substantially rectangular waveform, and has a plurality of straight side portions extending in a wave width direction, one-side connecting portions sequentially connecting every other pair of adjacent side portions at ends on a one wave width direction side, and other-side connecting portions sequentially connecting pairs of adjacent side portions that are not connected by the one-side connecting portions at ends on an other wave width direction side;

bending a target connecting portion, which is at least one of the one-side connecting portions and the other-side connecting portions of the wave conductor, at one position thereof to shape the target connecting portion into a substantially V shape so that the plurality of side portions are arranged along a coil circumferential direction and directions of cross-sectional shapes of the side portions are in a constant direction with respect to a coil radial direction; and winding on a bobbin the wave conductor that is bent in the bending.

2. The coil manufacturing method according to claim 1, wherein in the bending, an inner peripheral die having an arc face on a portion contacting the target connecting portion is used to bend the target connecting portion at one position along the inner peripheral die to shape a portion of the target connecting portion in a linear material length direction into a substantially arc shape, so as to shape the entire target connecting portion into a substantially V shape.

3. The coil manufacturing method according to claim 2, wherein in the bending, an outer peripheral die having an arc face on the portion contacting the target connecting portion is further used, and the outer peripheral die arranged to face the inner peripheral die across the target connecting portion is swung about an arc center of the arc face of the inner peripheral die so as to bend the target connecting portion.

4. The coil manufacturing method according to claim 3, wherein in the bending, in a state that a portion of the target connecting portion on one side in the linear material length direction with respect to the outer peripheral die is supported to inhibit movement of the portion toward at least the outer peripheral die side in a linear material width direction, the outer peripheral die is swung toward the other side in the linear material length direction of the target connecting portion.

5. The coil manufacturing method according to claim 3, wherein in the bending, a bend tool including the inner peripheral die and the outer peripheral die is used, the bend tool being structured to be movable in a direction to approach or depart from the bobbin, and structured such that the target connecting portion is inserted between the inner peripheral die and the outer peripheral die in a state of being moved toward the bobbin side, and the bend tool is moved toward the bobbin side when bending the target connecting portion.

6. The coil manufacturing method according to claim 1, wherein in the winding, the bobbin is rotated and moved in synchronization with the bending so as to wind the wave conductor on the bobbin.

7. The coil manufacturing method according to claim 6, wherein on an outer peripheral face of the bobbin, a plurality of side portion retaining units structured to retain the side portions of the wave conductor are provided along a circumferential direction of the bobbin, the bending is performed in a state that the side portion located on one side in the linear material length direction of the target connecting portion is retained in the side portion retaining units, and in the winding, the side portion located on the other side in the linear material length direction of the target connecting portion is retained in the side portion retaining units by rotating and moving the bobbin in synchronization with the bending.

8. The coil manufacturing method according to claim 1, wherein in the winding, the wave conductor is wound on the bobbin for a plurality of windings, and after the plurality of windings are wound, the target connecting portions of different windings of the wave conductor are plurally arranged in the coil radial direction.

9. The coil manufacturing method according to claim 8, wherein in the bending, the inner peripheral die and the outer peripheral die which each have the arc face on the portion contacting the target connecting portion and are arranged to face each other are used, and when bending the target connecting portion of a second winding and thereafter, the outer peripheral die arranged to face the inner peripheral die across the target connecting portion of a plurality of windings is swung about an arc center of the arc face of the inner peripheral die so as to bend the target connecting portion of a succeeding winding at one position along the target connecting portion of a preceding winding which is already bent.

10. The coil manufacturing method according to claim 1, wherein a direction substantially orthogonal to a face of the wave conductor before shaped into a substantially cylindrical shape is taken as a reference direction related to a direction of cross-sectional shapes of the side portions, and in the bending, the target connecting portion is bent so that the reference direction is in a direction along the coil radial direction.

11. The coil manufacturing method according to claim 1, wherein the linear conductor has a rectangular cross-sectional shape.

12. A coil manufacturing apparatus for manufacturing a wave wound coil in a substantially cylindrical shape by shaping a linear conductor with a cross-sectional shape having directionality, the apparatus comprising:

a transfer unit transferring a wave conductor that is a linear conductor shaped in a substantially rectangular waveform, and has a plurality of straight side portions extending in a wave width direction, one-side connecting portions sequentially connecting every other pair of adjacent side portions at ends on a one wave width direction side, and other-side connecting portions sequentially connecting pairs of adjacent side portions that are not connected by the one-side connecting portions at ends on an other wave width direction side;

a connecting portion bending unit bending a target connecting portion, which is at least one of the one-side connecting portions and the other-side connecting portions of the wave conductor, at one position thereof to shape the target connecting portion into a substantially V shape so that the plurality of side portions are arranged along a coil circumferential direction and directions of cross-sectional shapes of the side portions are in a constant direction with respect to a coil radial direction;

a bobbin winding the wave conductor that is bent by the connecting portion bending unit; and a bobbin rotation unit capable of rotating the bobbin about a center axis.

13. The coil manufacturing apparatus according to claim 12, wherein the connecting portion bending unit includes a bend tool having an inner peripheral die and an outer peripheral die which each have an arc face on a portion contacting the target connecting portion and are arranged to face each other, the outer peripheral die being swingable about an arc center of the arc face of the inner peripheral die, and the bend tool is structured to be movable in a direction to approach or depart from the bobbin, and structured such that the target connecting portion is inserted between the inner peripheral die and the outer peripheral die in a state of being moved toward the bobbin side.

14. The coil manufacturing apparatus according to claim 12, wherein
a direction substantially orthogonal to a face of the wave conductor before shaped into a substantially cylindrical shape is taken as a reference direction related to a direction of cross-sectional shapes of the side portions, and
the connecting portion bending unit bends the target connecting portion so that the reference direction is in a direction along the coil radial direction.

15. The coil manufacturing apparatus according to claim 12, wherein
the linear conductor has a rectangular cross-sectional shape.

16. A coil formed by shaping a linear conductor with a cross-sectional shape having directionality into a substantially rectangular waveform and then into a substantially cylindrical shape, the coil comprising:
a plurality of straight side portions extending in a coil axis direction;
one-side connecting portions sequentially connecting every other pair of side portions adjacent in a coil circumferential direction at ends on a one axial direction side; and
other-side connecting portions sequentially connecting pairs of side portions adjacent in the coil circumferential direction that are not connected by the one-side connecting portions at ends on an other axial direction side, wherein
the plurality of side portions are arranged along the coil circumferential direction with directions of cross-sectional shapes of the side portions being in a constant direction with respect to a coil radial direction, and
at least either of the one-side connecting portions and the other-side connecting portions are V-shaped connecting portions each bent at one position and shaped into a substantially V shape so as to project outward in the coil radial direction.

17. The coil according to claim 16, wherein
a portion in the wave width direction of a wave conductor including the V-shaped connecting portions is bent inward in the coil radial direction to be substantially in parallel with a plane orthogonal to the coil axis direction.

18. The coil according to claim 16, wherein
at least either of the one-side connecting portions and the other-side connecting portions have a bent portion shaped into a substantially arc shape in a portion in a linear material length direction, and are entirely in a substantially V shape having straight portions which extend linearly on both sides of the bent portion.

19. The coil according to claim 16, wherein
either of the one-side connecting portions and the other-side connecting portions are shaped into a substantially V shape that is bent at one position so as to project outward in the coil radial direction, and
the remaining of the one-side connecting portions and the other-side connecting portions are shaped substantially entirely into a substantially arc shape so as to project outward in the coil radial direction.

20. The coil according to claim 16, wherein
the side portions, the one-side connecting portions, and the other-side connecting portions are wound for a plurality of windings so that the side portions, the one-side connecting portions, and the other-side connecting portions are plurally arranged in the coil radial direction.

21. The coil according to claim 16, wherein
the linear conductor has a rectangular cross-sectional shape.

22. The coil according to claim 21, wherein
two sides in parallel with each other in a rectangular cross section of the side portions are in a direction along the coil radial direction.

* * * * *